US012761447B2

(12) United States Patent
Jung

(10) Patent No.: US 12,761,447 B2
(45) Date of Patent: Oct. 13, 2026

(54) OPTICAL SYSTEM

(71) Applicant: LG INNOTEK CO., LTD., Seoul (KR)

(72) Inventor: Jae Wook Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 271 days.

(21) Appl. No.: 18/566,400

(22) PCT Filed: May 31, 2022

(86) PCT No.: PCT/KR2022/007755
§ 371 (c)(1),
(2) Date: Dec. 1, 2023

(87) PCT Pub. No.: WO2022/255780
PCT Pub. Date: Dec. 8, 2022

(65) Prior Publication Data

US 2024/0255733 A1 Aug. 1, 2024

(30) Foreign Application Priority Data

Jun. 1, 2021 (KR) ........................ 10-2021-0071144

(51) Int. Cl.
*G02B 9/62* (2006.01)
*G02B 13/18* (2006.01)

(52) U.S. Cl.
CPC ............... *G02B 9/62* (2013.01); *G02B 13/18* (2013.01)

(58) Field of Classification Search
CPC .................................. G02B 9/62; G02B 13/18
See application file for complete search history.

(56) References Cited

U.S. PATENT DOCUMENTS 10,738,966 B2 8/2020 Woo et al.
11,099,354 B2 8/2021 Deschauer et al.
(Continued)

FOREIGN PATENT DOCUMENTS

JP 2013-101402 A 5/2013
JP 5555927 B2 7/2014
(Continued)

OTHER PUBLICATIONS

Office Action dated Jan. 12, 2026 in Taiwanese Application No. 111120314.
(Continued)

*Primary Examiner* — Wen Huang

(74) *Attorney, Agent, or Firm* — SALIWANCHIK, LLOYD & EISENSCHENK

(57) ABSTRACT

An optical system according to an embodiment includes N lenses sequentially disposed along an optical axis from an object-side toward a sensor-side, wherein a first axis perpendicular to the optical axis is defined and a second axis perpendicular to the optical axis and the first axis is defined in an nth lens which is any one of the N lenses, a shape of a first surface of the nth lens is symmetrical in the first axis direction and the second axis direction, the first surface has a first sag value S1 of a first coordinate (±A,0) and a third sag value S3 of a third coordinate (±B,0) on the first axis, the first surface has a second sag value S2 of a second coordinate (0,±A) and a fourth sag value S4 of a fourth coordinate (0,±B) on the second axis, and the nth lens satisfies Equation 1 below.

$$|S2-S1|>|S4-S3| \quad \text{[Equation 1]}$$

$$|A|>|B|$$

$$|S4-S3|\leq 3\,\mu m$$

19 Claims, 33 Drawing Sheets

(56) References Cited

U.S. PATENT DOCUMENTS

| | | | |
|---|---|---|---|
| 12,238,428 | B2 | 2/2025 | Roulet et al. |
| 2012/0300467 | A1 | 11/2012 | Chen |
| 2014/0063801 | A1 | 3/2014 | Seki et al. |
| 2018/0239132 | A1 | 8/2018 | Vlakhko |
| 2021/0014417 | A1 | 1/2021 | Roulet et al. |
| 2021/0132338 | A1 | 5/2021 | Lin et al. |
| 2025/0203225 | A1 | 6/2025 | Roulet et al. |

FOREIGN PATENT DOCUMENTS

| | | | |
|---|---|---|---|
| KR | 10-2005-0104020 | A | 11/2005 |
| KR | 10-1939550 | B1 | 1/2019 |
| KR | 10-2030406 | B1 | 10/2019 |
| TW | 202006415 | A | 2/2020 |

OTHER PUBLICATIONS

International Search Report dated Sep. 14, 2022 in International Application No. PCT/KR2022/007755.

Office Action dated Oct. 15, 2025 in Korean Application No. 10-2021-0071144.

Fig. 14

| SIZE | SIXTH LENS | |
|---|---|---|
| | ELEVENTH SURFACE(S11) | TWELFTH SURFACE(S12) |
| C1 | -0.12978605376 | -0.98790410052 |
| C2 | 0 | 0 |
| C3 | 0 | 0 |
| C4 | 0.0011351178 | 0.05668333452 |
| C5 | 0.160098282 | -0.76850082504 |
| C6 | 0 | 0 |
| C7 | 0 | 0 |
| C8 | 0 | 0 |
| C9 | 0 | 0 |
| C10 | 0 | 0 |
| C11 | -0.0669799087 | -0.18578702376 |
| C12 | -0.01041001308 | 0.01820038788 |
| C13 | 0.13419421416 | -0.11204087184 |
| C14 | 0 | 0 |
| C15 | 0 | 0 |
| C16 | 0 | 0 |
| C17 | 0 | 0 |
| C18 | 0 | 0 |
| C19 | 0 | 0 |
| C20 | 0 | 0 |
| C21 | 0 | 0 |
| C22 | -0.01344368772 | -0.02395465812 |
| C23 | -0.00505487952 | -0.0576748296 |
| C24 | -0.0093391930 | 0.00201947688 |
| C25 | -0.06802063884 | -0.0282146922 |
| C26 | 0 | 0 |
| C27 | 0 | 0 |
| C28 | 0 | 0 |
| C29 | 0 | 0 |
| C30 | 0 | 0 |
| C31 | 0 | 0 |
| C32 | 0 | 0 |
| C33 | 0 | 0 |
| C34 | 0 | 0 |
| C35 | 0 | 0 |
| C36 | 0 | 0 |
| C37 | 0 | 0 |
| C38 | -0.00199189908 | -0.00509898672 |
| C39 | 0.0023743422 | -0.0130680154 |
| C40 | -0.00365958216 | 0.00045772992 |
| C41 | 0.00312593256 | -0.0273972618 |
| C42 | 0 | 0 |
| C43 | 0 | 0 |
| C44 | 0 | 0 |
| C45 | 0 | 0 |
| C46 | 0 | 0 |
| C47 | 0 | 0 |
| C48 | 0 | 0 |
| C49 | 0 | 0 |
| C50 | 0 | 0 |
| C51 | 0 | 0 |
| C52 | 0 | 0 |
| C53 | 0 | 0 |
| C54 | 0 | 0 |
| C55 | 0 | 0 |
| C56 | 0 | 0 |
| C57 | 0 | 0 |
| C58 | 0 | 0 |
| C59 | 0.00092487852 | -0.00173202732 |
| C60 | -0.000091476 | 0.0010659978 |
| C61 | 0.00124919388 | -0.01562281236 |
| C62 | 0 | 0 |
| C63 | 0 | 0 |
| C64 | 0 | 0 |
| C65 | 0 | 0 |
| C66 | 0 | 0 |

Fig. 15a

| Term | Standard Zernike Polynomial | Description |
|---|---|---|
| 1 | 1 | Piston (constant) |
| 2 | $R\cos\theta$ | Distortion – Tilt (x-axis) |
| 3 | $R\sin\theta$ | Distortion – Tilt (y-axis) |
| 4 | $R^2\cos(2\theta)$ | Astigmatism, Primary (axis at 0° or 90°) |
| 5 | $2R^2-1$ | Defocus – Field curvature |
| 6 | $R^2\sin(2\theta)$ | Astigmatism, Primary (axis at ±45°) |
| 7 | $R^3\cos(3\theta)$ | Trefoil, Primary (x-axis) |
| 8 | $(3R^3-2R)\cos\theta$ | Coma, Primary (x-axis) |
| 9 | $(3R^3-2R)\sin\theta$ | Coma, Primary (y-axis) |
| 10 | $R^3\sin(3\theta)$ | Trefoil, Primary (y-axis) |
| 11 | $R^4\cos(4\theta)$ | Trefoil, Primary (x-axis) |
| 12 | $(4R^4-3R^2)\cos(2\theta)$ | Astigmatism, Secondary (axis at 0° or 90°) |
| 13 | $6R^4-6R^2+1$ | Spherical Aberration, Primary |
| 14 | $(4R^4-3R^2)\sin(2\theta)$ | Astigmatism, Secondary (axis at ±45°) |
| 15 | $R^4\sin(4\theta)$ | Trefoil, Primary (y-axis) |
| 16 | $R^5\cos(5\theta)$ | Pentafoil, Primary (x-axis) |
| 17 | $(5R^5-4R^3)\cos(3\theta)$ | Trefoil, Secondary (x-axis) |
| 18 | $(10R^5-12R^3+3R)\cos\theta$ | Coma, Secondary (x-axis) |
| 19 | $(10R^5-12R^3+3R)\sin\theta$ | Coma, Secondary (y-axis) |
| 20 | $(5R^5-4R^3)\sin(3\theta)$ | Trefoil, Secondary (y-axis) |
| 21 | $R^5\sin(5\theta)$ | Pentafoil, Primary (Y-axis) |
| 22 | $R^6\cos(6\theta)$ | Hexafoil, Primary (x-axis) |
| 23 | $(6R^6-5R^4)\cos(4\theta)$ | Tetrafoil, Secondary (x-axis) |
| 24 | $(15R^6-20R^4+6R^2)\cos(2\theta)$ | Astigmatism, Tertiary (axis at 0° or 90°) |
| 25 | $20R^6-30R^4+12R^2-1$ | Spherical Aberration, Secondary |
| 26 | $(15R^6-20R^4+6R^2)\sin(2\theta)$ | Astigmatism, Tertiary (axis at ±45°) |
| 27 | $(6R^6-5R^4)\sin(4\theta)$ | Tetrafoil, Secondary (y-axis) |
| 28 | $R^6\sin(6\theta)$ | Hexafoil, Primary (y-axis) |
| 29 | $R^7\cos(7\theta)$ | Heptafoil, Primary (x-axis) |
| 30 | $(7R^7-6R^5)\cos(5\theta)$ | Pentafoil, Secondary (x-axis) |
| 31 | $(21R^7-30R^5+10R^3)\cos(3\theta)$ | Trefoil, Tertiary (x-axis) |
| 32 | $(35R^7-60R^5+30R^3-4R)\cos\theta$ | Coma, Tertiary (x-axis) |
| 33 | $(35R^7-60R^5+30R^3-4R)\mathrm{Sin}\theta$ | Coma, Tertiary (y-axis) |

Fig. 15b

| | | |
|---|---|---|
| 34 | $(21R^7-30R^5+10R^3)\sin(3\theta)$ | Trefoil. Tertiary (y-axis) |
| 35 | $(7R^7-6R^5)\sin(5\theta)$ | Pentafoil, Secondary (y-axis) |
| 36 | $R^7\sin(7\theta)$ | Heptafoil, Primary (y-axis) |
| 37 | $R^8\cos(8\theta)$ | Octafoil, Primary (x-axis) |
| 38 | $(8R^8-7R^6)\cos(6\theta)$ | Hexafoil, Secondary (x-axis) |
| 39 | $(28R^8-42R^6+15R^4)\cos(4\theta)$ | Tetrafoil, Tertiary (x-axis) |
| 40 | $(56R^8-105R^6+60R^4-10R^2)\cos(2\theta)$ | Astigmatism, Quaternary (axis at 0° or 90°) |
| 41 | $70R^8-140R^6+90R^4-20R^2+1$ | Spherical Aberration, Tertiary |
| 42 | $(56R^8-105R^6+60R^4-10R^2)\mathrm{Sin}(2\theta)$ | Astigmatism, Quaternary (axis at ±45°) |
| 43 | $(28R^8-42R^6+15R^4)\sin(4\theta)$ | Tetrafoil, Tertiary (y-axis) |
| 44 | $(8R^8-7R^6)\sin(6\theta)$ | Hexafoil, Secondary (y-axis) |
| 45 | $R^8\sin(8\theta)$ | Octafoil, Primary (y-axis) |
| 46 | $R^9\cos(9\theta)$ | Nonafoil, Primary (x-axis) |
| 47 | $(9R^9-8R^7)\cos(7\theta)$ | Heptafoil, Secondary (x-axis) |
| 48 | $(36R^9-56R^7+21R^5)\cos(5\theta)$ | Pentafoil, Tertiary (x-axis) |
| 49 | $(84R^9-168R^7+105R^5-20R^3)\cos(3\theta)$ | Trefoil, Quaternary (x-axis) |
| 50 | $(126R^9-280R^7+210R^5-60R^3+5R)\cos\theta$ | Coma, Quaternary (x-axis) |
| 51 | $(126R^9-280R^7+210R^5-60R^3+5R)\sin\theta$ | Coma, Quaternary (y-axis) |
| 52 | $(84R^9-168R^7+105R^5-20R^3)\sin(3\theta)$ | Trefoil, Quaternary (y-axis) |
| 53 | $(36R^9-56R^7+21R^5)\sin(5\theta)$ | Pentafoil, Tertiary (y-axis) |
| 54 | $(9R^9-8R^7)\sin(7\theta)$ | Heptafoil, Secondary (y-axis) |
| 55 | $R^9\sin(9\theta)$ | Nonafoil, Primary (y-axis) |
| 56 | $R^{10}\cos(10\theta)$ | Decafoil, Primary (x-axis) |
| 57 | $(10R^{10}-9R^8)\cos(8\theta)$ | Octafoil, Secondary (x-axis) |
| 58 | $(45R^{10}-72R^8+28R^6)\cos(6\theta)$ | Hexafoil, Tertiary (x-axis) |
| 59 | $(120R^{10}-252R^8+168R^6-35R^4)\cos(4\theta)$ | Tetrafoil, Quaternary (x-axis) |
| 60 | $(210R^{10}-504R^8+420R^6-140R^4+15R^2)\cos(2\theta)$ | Astigmatism, Quinternary (axis at 0° or 90°) |
| 61 | $252R^{10}-630R^8+560R^6-210R^4+30R^2-1$ | Spherical Aberration, Quaternary |
| 62 | $(210R^{10}-504R^8+420R^6-140R^4+15R^2)\sin(2\theta)$ | Astigmatism, Quinternary (axis at ±45°) |
| 63 | $(120R^{10}-252R^8+168R^6-35R^4)\sin(4\theta)$ | Tetrafoil, Quaternary (y-axis) |
| 64 | $(45R^{10}-72R^8+28R^6)\sin(6\theta)$ | Hexafoil, Tertiary (y-axis) |
| 65 | $(10R^{10}-9R^8)\sin(8\theta)$ | Octafoil. Secondary (y-axis) |
| 66 | $R^{10}\sin(10\theta)$ | Decafoil, Primary (y-axis) |

Fig. 16

| LENS | SURFACE | SURFACE TYPE | THICKNESS (mm) | RADIUS OF CURVATURE (mm) | REFRACTIVE INDEX | ABBE NUMBER |
|---|---|---|---|---|---|---|
| OBJECT | | | 500 | | | |
| FIRST LENS | FIRST SURFACE | ASPHERICAL SURFACE | 0.6244 | 1.5000 | 1.5348 | 55.71 |
| | SECOND SURFACE | ASPHERICAL SURFACE | 0.202 | 3.3151 | | |
| SECOND LENS | THIRD SURFACE | ASPHERICAL SURFACE | 0.23 | 5.2947 | 1.68 | 18.44 |
| | FOURTH SURFACE | ASPHERICAL SURFACE | 0.0933 | 2.8840 | | |
| THIRD LENS | FIFTH SURFACE | ASPHERICAL SURFACE | 0.3657 | 4.9410 | 1.5348 | 55.71 |
| | SIXTH SURFACE | ASPHERICAL SURFACE | 0.4433 | -43.1316 | | |
| FOURTH LENS | SEVENTH SURFACE | ASPHERICAL SURFACE | 0.23 | 3.6021 | 1.68 | 18.44 |
| | EIGHTH SURFACE | ASPHERICAL SURFACE | 0.3207 | 3.2282 | | |
| FIFTH LENS | NINTH SURFACE | ASPHERICAL SURFACE | 0.4702 | 4.799806913 | 1.567 | 37.55 |
| | TENTH SURFACE | ASPHERICAL SURFACE | 0.4325 | -2.1281 | | |
| SIXTH LENS | ELEVENTH SURFACE | FREE-FORM SURFACE (FREE-FORM) | 0.5622 | -2.705725659 | 1.567 | 37.55 |
| | TWELFTH SURFACE | FREE-FORM SURFACE (FREE-FORM) | 1.11559 | 2.333769581 | | |
| FILTER | THIRTEENTH SURFACE | FLAT SURFACE | 0.11 | - | - | - |
| | FOURTEENTH SURFACE | FLAT SURFACE | 0.27 | - | - | - |
| IMAGE SENSOR | FIFTEENTH SURFACE | | - | - | - | - |

Fig. 17

| LENS | SURFACE | SURFACE TYPE | THICKNESS (mm) | RADIUS OF CURVATURE (mm) | REFRACTIVE INDEX | ABBE NUMBER |
|---|---|---|---|---|---|---|
| OBJECT | | | 500 | | | |
| FIRST LENS | FIRST SURFACE | ASPHERICAL SURFACE | 0.6244 | 1.5000 | 1.5348 | 55.71 |
| | SECOND SURFACE | ASPHERICAL SURFACE | 0.202 | 3.3151 | | |
| SECOND LENS | THIRD SURFACE | ASPHERICAL SURFACE | 0.23 | 5.2947 | 1.68 | 18.44 |
| | FOURTH SURFACE | ASPHERICAL SURFACE | 0.0933 | 2.8840 | | |
| THIRD LENS | FIFTH SURFACE | ASPHERICAL SURFACE | 0.3657 | 4.9410 | 1.5348 | 55.71 |
| | SIXTH SURFACE | ASPHERICAL SURFACE | 0.4433 | -43.1316 | | |
| FOURTH LENS | SEVENTH SURFACE | ASPHERICAL SURFACE | 0.23 | 3.6021 | 1.68 | 18.44 |
| | EIGHTH SURFACE | ASPHERICAL SURFACE | 0.3207 | 3.2282 | | |
| FIFTH LENS | NINTH SURFACE | ASPHERICAL SURFACE | 0.4702 | 4.799806913 | 1.567 | 37.55 |
| | TENTH SURFACE | ASPHERICAL SURFACE | 0.4325 | -2.1281 | | |
| SIXTH LENS | ELEVENTH SURFACE | ASPHERICAL SURFACE | 0.3475 | -1.5327 | 1.567 | 37.55 |
| | TWELFTH SURFACE | ASPHERICAL SURFACE | 0.1999 | 3.8604 | | |
| FILTER | THIRTEENTH SURFACE | FLAT SURFACE | 0.11 | - | - | - |
| | FOURTEENTH SURFACE | FLAT SURFACE | 0.27 | - | - | - |
| IMAGE SENSOR | FIFTEENTH SURFACE | - | - | - | - | - |

Fig. 18

| DISTANCE (mm) | ANGLE | |
|---|---|---|
| | 0° | 90° |
| -2.50526 | -0.68626 | -0.79903 |
| -2.25474 | -0.69124 | -0.75145 |
| -2.00421 | -0.68609 | -0.71574 |
| -1.75368 | -0.64581 | -0.65944 |
| -1.50316 | -0.55332 | -0.55921 |
| -1.25263 | -0.4227 | -0.42504 |
| -1.00211 | -0.28463 | -0.2854 |
| -0.75158 | -0.16691 | -0.16706 |
| -0.50105 | -0.08398 | -0.08396 |
| -0.25053 | -0.03732 | -0.0373 |
| 0 | -0.0226 | -0.0226 |
| 0.250526 | -0.03732 | -0.0373 |
| 0.501052 | -0.08398 | -0.00839€ |
| 0.751579 | -0.16691 | -0.16706 |
| 1.002105 | -0.28463 | -0.2854 |
| 1.252631 | -0.4227 | -0.42504 |
| 1.503157 | -0.55332 | -0.55921 |
| 1.753683 | -0.64581 | -0.65944 |
| 2.004209 | -0.68609 | -0.71574 |
| 2.254736 | -0.0.69124 | -0.75145 |
| 2.505262 | -0.68626 | -0.79903 |

Fig. 19

| DISTANCE (mm) | ANGLE | |
|---|---|---|
| | 0° | 90° |
| -2.67044 | -0.99792 | -1.39779 |
| -2.4034 | -0.8222 | -0.93403 |
| -2.13635 | -0.67 | -0.71245 |
| -1.86931 | -0.52825 | -0.54854 |
| -1.60226 | -0.41461 | -0.42242 |
| -1.33522 | -0.34102 | -0.34276 |
| -1.06818 | -0.30691 | -0.30776 |
| -0.80113 | -0.3033 | -0.30501 |
| -0.53409 | -0.31783 | -0.31948 |
| -0.26704 | -0.33671 | -0.33733 |
| 0 | -0.34551 | -0.34551 |
| 0.26704 | -0.33671 | -0.33733 |
| 0.53409 | -0.31783 | -0.31948 |
| 0.80113 | -0.3033 | -0.30501 |
| 1.06818 | -0.30691 | -0.30776 |
| 1.33522 | -0.34102 | -0.34276 |
| 1.60226 | -0.41461 | -0.42242 |
| 1.86931 | -0.52825 | -0.54854 |
| 2.13635 | -0.67 | -0.71245 |
| 2.4034 | -0.8222 | -0.93403 |
| 2.67044 | -0.99792 | -1.39779 |

| Object Distance | MTF Anaysis |
|---|---|

| MTF Anaysis | | | | | |
|---|---|---|---|---|---|
| Wavelength | 656 | 588 | 546 | 486 | 436 |
| Weight | 10 | 29 | 38 | 17 | 6 |
| Frequency | Nyquist frequency/2 | | | | |

50cm (0~0.4F)

| Object Distance | |
|---|---|
| | Though Focus MTF Analysis |
| | Defocus Position: 9points(-0.04 ~ 0.04) |
| | Frequency: Ny/2 |
| 50cm (0~0.4F) |  |
| | |

| Object Distance | Though Focus MTF Analysis |  |
|---|---|---|
|  | Defocus Position | 9points(-0.04 ~ 0.04) |
|  | Frequency | Ny/4 |

50cm (0~0.4F)

| | | | |
|---|---|---|---|
| Position: | 1 | Wavelength (nm) | Weight |
| Frequency: | 180.0 cycles/mm | 656.2800 | 10 |
| | | 587.5600 | 29 |
| | | 546.0700 | 38 |
| | | 486.1300 | 17 |
| | | 435.8400 | 6 |

Object Distance

| MTF Anaysis | | | | | |
|---|---|---|---|---|---|
| Wavelength | 656 | 588 | 546 | 486 | 436 |
| Weight | 10 | 29 | 38 | 17 | 6 |
| Frequency | Nyquist frequency/2 | | | | |

50cm (0.5F~0.9F)

Object Distance

| Though Focus MTF Analysis | |
|---|---|
| Defocus Position | 9points(-0.04 ~ 0.04) |
| Frequency | Ny/2 |

50cm (0.5F~0.9F)

| Position: | 2 | Wavelength (nm) | Weight |
|---|---|---|---|
| Frequency: | 96.0 cycles/mm | 656.2800 | 10 |
| | | 587.5600 | 29 |
| | | 546.0700 | 38 |
| | | 486.1300 | 17 |
| | | 435.8400 | 5 |

| Object Distance | Though Focus MTF Analysis | |
|---|---|---|
| | Defocus Position | 9points(-0.04 ~ 0.04) |
| | Frequency | Ny/4 |

50cm (1.0F)

| | | | | |
|---|---|---|---|---|
| Position: | 2 | | Wavelength (nm) | Weight |
| Frequency: | 176.0 cycles/mm | | 656.2800 | 10 |
| | | | 587.5600 | 29 |
| | | | 546.0700 | 38 |
| | | | 486.1300 | 17 |
| | | | 435.8400 | 6 |

| Object Distance | MTF Anaysis | | | | | |
|---|---|---|---|---|---|---|
| | Wavelength | 656 | 588 | 546 | 486 | 436 |
| | Weight | 10 | 29 | 38 | 17 | 6 |
| | Frequency | Nyquist frequency/2 | | | | |

50cm (1.0F)

| | | | Wavelength (nm) | Weight |
|---|---|---|---|---|
| Position: | 3 | | 656.2800 | 10 |
| Defocusing: | 0.000 mm | | 587.5600 | 29 |
| | | | 546.0700 | 38 |
| | | | 486.1300 | 17 |
| | | | 435.8400 | 6 |

| Object Distance | Though Focus MTF Analysis |
| --- | --- |
| | Defocus Position: 9points(-0.04 ~ 0.04) |
| | Frequency: Ny/2 |
| 50cm (0.5F~0.9F) | |

| | | | Wavelength (nm) | Weight |
| --- | --- | --- | --- | --- |
| Position: | 3 | | 656.2800 | 10 |
| Frequency: | 84.0 cycles/mm | | 587.5600 | 29 |
| | | | 546.0700 | 38 |
| | | | 486.1300 | 17 |
| | | | 435.8400 | 6 |

| Object Distance | Though Focus MTF Analysis | |
|---|---|---|
| | Defocus Position | 9points(-0.04 ~ 0.04) |
| | Frequency | Ny/4 |

50cm (1.0F)

| | | | Wavelength (nm) | Weight |
|---|---|---|---|---|
| Position: | 3 | | 656.2800 | 10 |
| Frequency: | 168.0 cycles/mm | | 587.5600 | 29 |
| | | | 546.0700 | 38 |
| | | | 486.1300 | 17 |
| | | | 435.8400 | 6 |

| MTF vs Field Analysis | | | | | |
|---|---|---|---|---|---|
| Wavelength | 656 | 588 | 546 | 486 | 436 |
| Weight | 10 | 29 | 38 | 17 | 6 |
| Frequency | Ny/2 | | | | |
| Field | 0.1F step size | | | | |

| MTF vs Field Analysis | | | | | |
|---|---|---|---|---|---|
| Wavelength | 656 | 588 | 546 | 486 | 436 |
| Weight | 10 | 29 | 38 | 17 | 6 |
| Frequency | Ny/4 | | | | |
| Field | 0.1F step size | | | | |

■ Chief Ray Angle

| Field | Image H | Sensor | Lens | Deviation |
|---|---|---|---|---|
| 0.0F | 0.000 | 0.00 | 0.00 | 0.00 |
| 0.1F | 0.328 | 8.00 | 7.94 | -0.06 |
| 0.2F | 0.656 | 16.10 | 15.33 | -0.77 |
| 0.3F | 0.985 | 23.10 | 21.82 | -1.28 |
| 0.4F | 1.313 | 28.50 | 27.30 | -1.20 |
| 0.5F | 1.641 | 32.10 | 31.59 | -0.51 |
| 0.6F | 1.969 | 34.10 | 34.57 | 0.47 |
| 0.7F | 2.297 | 34.90 | 36.40 | 1.50 |
| 0.8F | 2.626 | 35.10 | 37.63 | 2.53 |
| 0.9F | 2.954 | 34.90 | 37.84 | 2.94 |
| 1.0F | 3.282 | 33.40 | 34.35 | 0.95 |

Fig. 24

Relative Illumination

| | | | | | | | | |
|---|---|---|---|---|---|---|---|---|
| 45 | 46 | 55 | 62 | 65 | 62 | 55 | 46 | 45 |
| 45 | 52 | 64 | 73 | 77 | 73 | 64 | 52 | 45 |
| 47 | 58 | 72 | 84 | 89 | 84 | 72 | 58 | 47 |
| 50 | 63 | 78 | 93 | 98 | 93 | 78 | 63 | 50 |
| 51 | 64 | 81 | 96 | 100 | 96 | 81 | 64 | 51 |
| 50 | 63 | 78 | 93 | 98 | 93 | 78 | 63 | 50 |
| 47 | 58 | 72 | 84 | 89 | 84 | 72 | 58 | 47 |
| 45 | 52 | 64 | 73 | 77 | 73 | 64 | 52 | 45 |
| 45 | 46 | 55 | 62 | 65 | 62 | 55 | 46 | 45 |

| Field | Image H | Relative Illumination | |
|---|---|---|---|
| 0.0F | 0.000 | 100% | |
| 0.1F | 0.328 | 99% | 0.9% |
| 0.2F | 0.656 | 96% | 3.4% |
| 0.3F | 0.985 | 89% | 6.5% |
| 0.4F | 1.313 | 80% | 8.7% |
| 0.5F | 1.641 | 72% | 8.9% |
| 0.6F | 1.969 | 64% | 7.8% |
| 0.7F | 2.297 | 56% | 7.9% |
| 0.8F | 2.626 | 49% | 7.3% |
| 0.9F | 2.954 | 45% | 3.3% |
| 1.0F | 3.282 | 45% | 0.2% |
| 1.05F | 3.428 | 30% | 14.6% |

Fig. 25

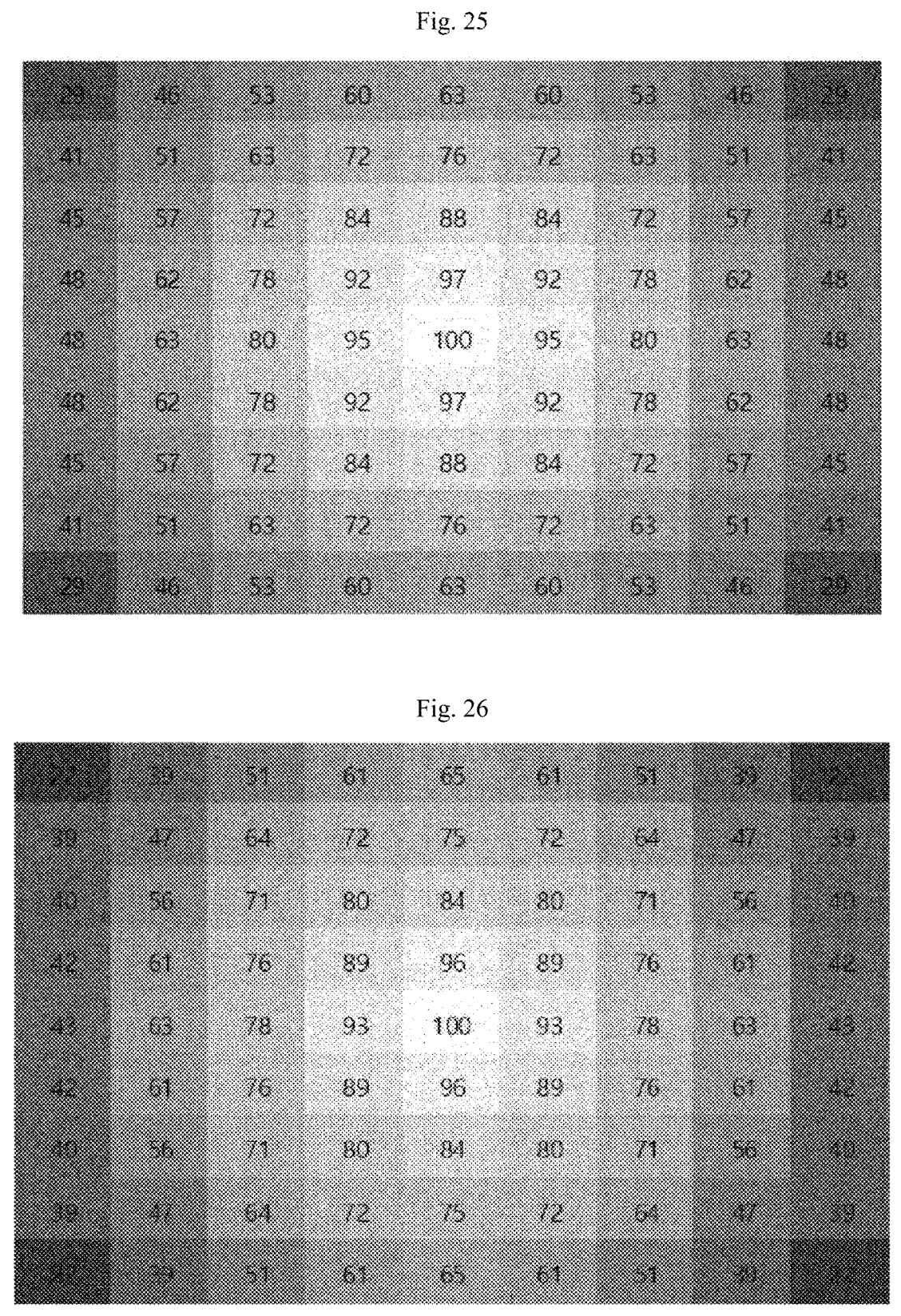

| | | | | | | | | |
|---|---|---|---|---|---|---|---|---|
| 29 | 46 | 53 | 60 | 63 | 60 | 53 | 46 | 29 |
| 41 | 51 | 63 | 72 | 76 | 72 | 63 | 51 | 41 |
| 45 | 57 | 72 | 84 | 88 | 84 | 72 | 57 | 45 |
| 48 | 62 | 78 | 92 | 97 | 92 | 78 | 62 | 48 |
| 48 | 63 | 80 | 95 | 100 | 95 | 80 | 63 | 48 |
| 48 | 62 | 78 | 92 | 97 | 92 | 78 | 62 | 48 |
| 45 | 57 | 72 | 84 | 88 | 84 | 72 | 57 | 45 |
| 41 | 51 | 63 | 72 | 76 | 72 | 63 | 51 | 41 |
| 29 | 46 | 53 | 60 | 63 | 60 | 53 | 46 | 29 |

Fig. 26

| | | | | | | | | |
|---|---|---|---|---|---|---|---|---|
| [illegible] | 39 | 51 | 61 | 65 | 61 | 51 | 39 | [illegible] |
| 39 | 47 | 64 | 72 | 75 | 72 | 64 | 47 | 39 |
| 40 | 56 | 71 | 80 | 84 | 80 | 71 | 56 | 40 |
| 42 | 61 | 76 | 89 | 96 | 89 | 76 | 61 | 42 |
| 43 | 63 | 78 | 93 | 100 | 93 | 78 | 63 | 43 |
| 42 | 61 | 76 | 89 | 96 | 89 | 76 | 61 | 42 |
| 40 | 56 | 71 | 80 | 84 | 80 | 71 | 56 | 40 |
| 39 | 47 | 64 | 72 | 75 | 72 | 64 | 47 | 39 |
| [illegible] | 39 | 51 | 61 | 65 | 61 | 51 | 39 | [illegible] |

OPTICAL SYSTEM

CROSS-REFERENCE TO RELATED APPLICATIONS

This application is the U.S. national stage application of International Patent Application No. PCT/KR2022/007755, filed May 31, 2022, which claims the benefit under 35 U.S.C. § 119 of Korean Application No. 10-2021-0071144, filed Jun. 1, 2021, the disclosures of each of which are incorporated herein by reference in their entirety.

TECHNICAL FIELD

An embodiment relates to an optical system capable of improving relative illumination or a relative illumination rate.

BACKGROUND ART

A camera module captures an object and stores the object as an image or video and is installed in various applications. In particular, the camera module is produced in a very small size and is applied to not only portable devices such as smartphones, tablet PCs, and laptops, but also drones and vehicles to provide various functions.

For example, an optical system of the camera module may include an imaging lens that forms an image and an image sensor that converts the formed image into an electrical signal. In this case, the camera module may perform an autofocus (AF) function of aligning a focal length of a lens by automatically adjusting a distance between the image sensor and the imaging lens and a zooming function of zooming up or zooming out by increasing or decreasing a magnification of a distant object through a zoom lens. In addition, the camera module employs an image stabilization (IS) technology to correct or inhibit image stabilization due to camera movement caused by an unstable fixing device or a user's movement.

The most important element for such a camera module to obtain an image is an imaging lens that forms an image. Recently, interest in high resolution is increasing, and research using 5 or 6 lenses is being conducted to realize this. In addition, research using a plurality of imaging lenses having positive (+) or negative (−) refractive power for realizing high resolution is being conducted.

Meanwhile, in recent years, as a front display of a smartphone to which a camera module is applied is required, the form factor of the front camera is continuously changing, and thereby, an under-display camera that hides the front camera under the display is applied.

However, when the camera is disposed under the display, problems such as deterioration of image quality of the camera module, decrease in brightness, and generation of ghost/flare occur due to loss of light amount due to a panel of the display. In particular, as the brightness drops to 20% compared to the existing ones, a new optical system that can compensate for the brightness of the camera is required.

DISCLOSURE

Technical Problem

An embodiment is directed to providing an optical system capable of improving a relative illumination rate of an image sensor unit and realizing miniaturization.

Technical Solution

An optical system according to an embodiment includes N lenses sequentially disposed along an optical axis from an object-side toward a sensor-side, wherein a first axis perpendicular to the optical axis is defined and a second axis perpendicular to the optical axis and the first axis is defined in an nth lens which is any one of the N lenses, a shape of a first surface of the nth lens is symmetrical in the first axis direction and the second axis direction, the first surface has a first sag value S1 of a first coordinate (±A,0) and a third sag value S3 of a third coordinate (±B,0) on the first axis, the first surface has a second sag value S2 of a second coordinate (0,±A) and a fourth sag value S4 of a fourth coordinate (0,±B) on the second axis, and the nth lens satisfies Equation 1 below.

$$|S2 - S1| > |S4 - S3| \quad \text{[Equation 1]}$$

$$|A| > |B|$$

$$|S4 - S3| \leq 3\ \mu m$$

Advantageous Effects

An embodiment may include N lenses sequentially disposed along an optical axis from an object-side toward a sensor-side and may form at least one of an object-side surface and a sensor-side surface of an nth lens which is any one of the N lenses as a free-form surface. In this case, the nth lens, which is any one of the N lenses, may be a lens disposed at a position closest to a sensor.

In detail, at least one of the object-side surface and the sensor-side surface of the nth lens may have a sag value defined by equations and a change value of the sag value, and a shape of a free-form surface of at least one of the object-side surface and the sensor-side surface of the nth lens may be defined by the sag value defined by the equations and the change value of the sag value.

Accordingly, when light passes through the nth lens and moves to an image sensor unit, relative illumination of the light incident on the image sensor unit may be improved. In detail, the relative illumination of the light passing through the nth lens and incident on the image sensor unit may be 30% or more. In detail, the relative illumination of the light passing through the nth lens and incident on the image sensor unit may be 35% or more. In detail, the relative illumination of the light passing through the nth lens and incident on the image sensor may be 45% or more.

Therefore, a camera module including the optical system can compensate for a decrease in an amount of light that may vary depending on a position of a display device. That is, the camera module including the optical system can secure an amount of light with sufficient brightness without being affected by the position of the display device, thereby realizing improved resolution.

In addition, since the light amount and resolution of the optical system can be improved without increasing a size of the optical system and a size of the lens diameter, it is possible to realize miniaturization of the optical system and the camera module while having a size of improved light amount.

DESCRIPTION OF DRAWINGS

FIGS. 14-15*b* are tables for describing an optical system and a free-form lens of an optical module according to an embodiment.

FIGS. 16 and 17 are tables for describing lenses of an optical system and an optical module according to Example and Comparative Example.

FIGS. 18 and 19 are tables for describing a difference in sag values of a sixth lens of the optical system and the optical module according to Comparative Example.

FIG. 24 is a view for describing relative illumination of an optical system according to an embodiment.

FIGS. 25 and 26 are views for describing relative illumination of an optical system according to Comparative Example.

MODES OF THE INVENTION

Figure 1:
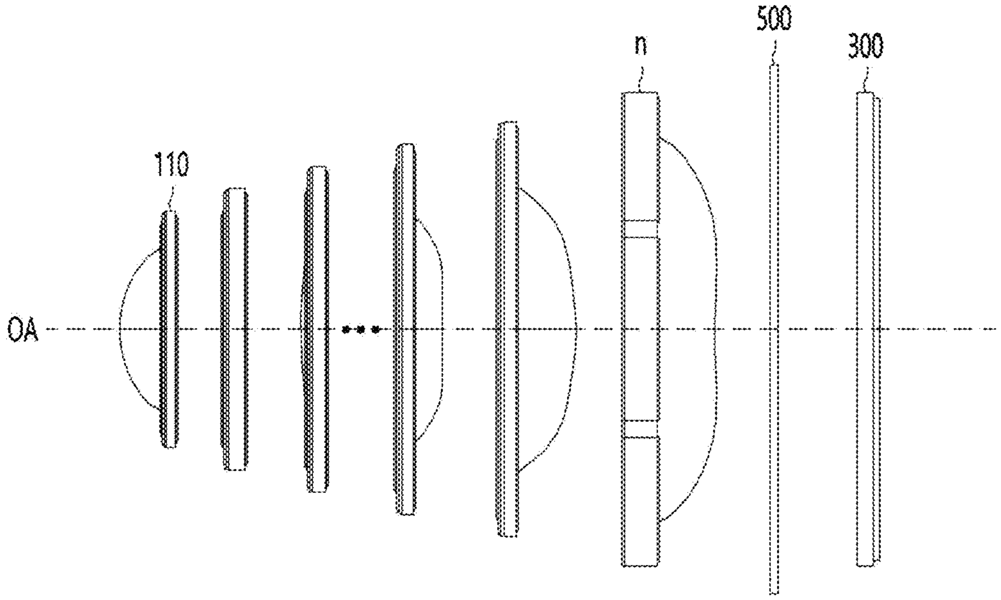
FIG. 1 is a configuration diagram of an optical system according to an embodiment.

Hereinafter, preferred embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and replaced. In addition, unless expressly otherwise defined and described, the terms used in the embodiments of the present invention (including technical and scientific terms) may be construed the same meaning as commonly understood by one of ordinary skill in the art to which the present invention belongs, and the terms such as those defined in commonly used dictionaries may be interpreted as having a meaning that is consistent with their meaning in the context of the relevant art. In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected" or "coupled" to another element, it may include not only when the element is directly "connected" or "coupled" to another element, but also when the element is "connected" or "coupled" by the other element between the element and another element.

Further, when described as being formed or disposed "on (above)" or "under (below)" of each element, the terms "on (above)" or "under (below)" may include not only when two elements are directly connected to each other, but also when one or more other elements are formed or disposed between two elements. Furthermore, when expressed as "on (above)" or "under (below)", it may include the meaning of not only the upward direction but also the downward direction based on one element.

Hereinafter, a first lens refers to a lens closest to an object-side, and the last lens refers to a closest to a sensor-side. In addition, unless otherwise specified, the units for the radius, effective diameter, thickness, distance, BFL (Back Focal Length), TTL (Total Track Length or Total Top Length), etc. Of the lens are all mm. In addition, a shape of the lens is shown based on an optical axis of the lens. As an example, the meaning that the object-side of the lens is convex refers that a vicinity of the optical axis is convex on the object-side of the lens, but does not refer that the vicinity of the optical axis is convex. Therefore, even when it is described that the object-side of the lens is convex, a portion around the optical axis on the object-side of the lens may be concave. In addition, it should be noted that a thickness and a radius of curvature of the lens are measured based on the optical axis of the lens. In addition, "object-side surface" may refer to a surface of a lens facing the object-side based on the optical axis, and "image side" may be defined as a surface of a lens facing an imaging surface based on the optical axis.

In addition, all units for coordinates are mm unless otherwise specified. For example, (1,1) refers to coordinates that have moved 1 mm in one axis direction and 1 mm in the other axis direction from an optical axis (0, 0).

Figure 2:
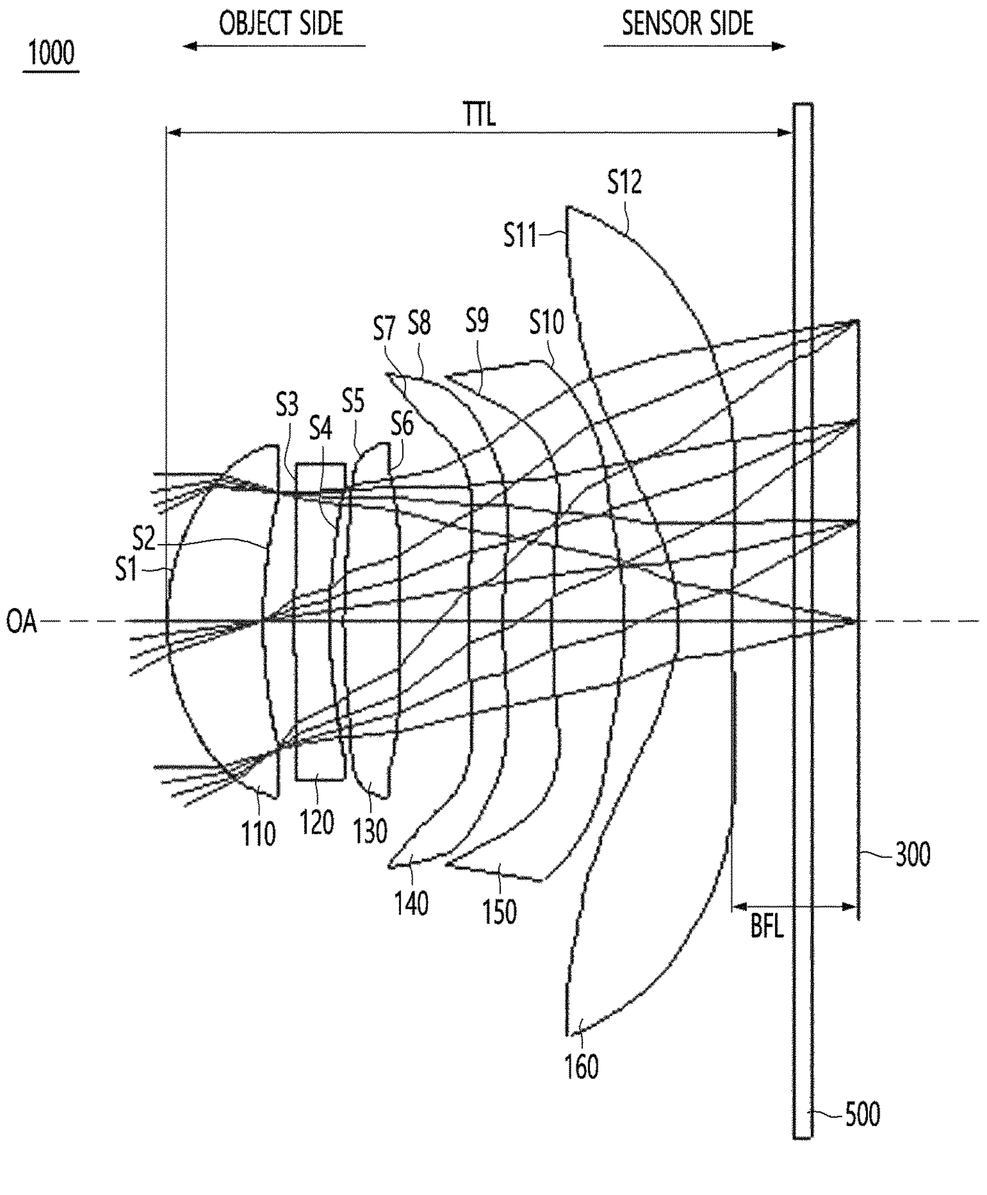
FIG. 2 is a view illustrating an exploded perspective view of an optical system according to an embodiment.

Referring to FIGS. 1 and 2, an optical system 1000 according to an embodiment may include a plurality of lenses. For example, the optical system 1000 may include N lenses. In detail, the optical system 1000 may include lenses of a first lens 110 to an nth lens n. That is, the optical system may include the first lens 110 to the nth lens 100N sequentially disposed in the optical axis direction from the object-side surface. In this case, the N may include a natural number equal to or greater than 2.

In FIG. 2, although it is illustrated that the optical system 1000 according to the embodiment includes six lenses of the first lens 110, a second lens 120, a third lens 130, a fourth lens 140, a fifth lens 150, and a sixth lens 160, the embodiment is not limited thereto, and the optical system 1000 may include two to five lenses or seven or more lenses.

Hereinafter, for convenience of description, the optical system 1000 will be described focusing on an optical system including six lenses of the first lens 110, the second lens 120, the third lens 130, the fourth lens 140, the fifth lens 150, and the sixth lens 160 as shown in FIG. 2.

Referring to FIGS. 1 and 2, the optical system 1000 may include the first lens 110, the second lens 120, the third lens 130, the fourth lens 140, and the fifth lens 150, the sixth lens 160, a filter unit 500, and an image sensor unit 300.

The first lens 110, the second lens 120, the third lens 130, the fourth lens 140, the fifth lens 150, and the sixth lens 160 may be sequentially disposed along an optical axis OA of the optical system 1000.

Light corresponding to information of an object disposed on the object-side may sequentially pass through the first lens 110, the second lens 120, the third lens 130, the fourth lens 140, and the fifth lens 150, the sixth lens 160, and the filter unit 500 to be incident on the image sensor unit 300.

The first lens 110, the second lens 120, the third lens 130, the fourth lens 140, the fifth lens 150, and the sixth lens 160 may include an effective region and an ineffective region, respectively. The effective region may be a region through which light incident on each lens of the first lens 110, the second lens 120, the third lens 130, the fourth lens 140, the fifth lens 150, and the sixth lens 160 passes. That is, the effective region may be defined as a region in which incident light is refracted to realize optical characteristics.

The ineffective region may be disposed around the effective region. The ineffective region may be disposed at a periphery of the effective region. That is, the region other than the effective region of the lens may be the ineffective region. The ineffective region may be a region where light is not incident. That is, the ineffective region may be a region unrelated to the optical characteristics. In addition, the ineffective region may be a region fixed to a barrel (not shown) accommodating the lens. A diameter of the effective region may be an effective diameter of the lens. That is, a maximum distance of the effective region may be the effective diameter of the lens.

The optical system 1000 according to the embodiment may include an aperture (not shown) for adjusting the amount of incident light. The aperture may be disposed between two adjacent lenses of the first lens 110, the second lens 120, the third lens 130, the fourth lens 140, the fifth lens 150, and the sixth lens 160. For example, the aperture may be disposed between the first lens 110 and the second lens 120.

In addition, at least one of the first lens 110, the second lens 120, the third lens 130, the fourth lens 140, the fifth lens 150, and the sixth lens 160 may serve as an aperture. For example, any one of the first lens 110, the second lens 120, the third lens 130, the fourth lens 140, the fifth lens 150, and the sixth lens 160 may serve as an aperture which adjusts the amount of light the object-side surface or the sensor-side surface of the lens.

The first lens 110 may have positive (+) or negative (−) refractive power on the optical axis. The first lens 110 may include a plastic or glass material. For example, the first lens 110 may be made of a plastic material.

The first lens 111 may include a first surface S1 defined as an object-side surface and a second surface S2 defined as a sensor-side surface. The first surface S1 may be convex toward the object-side surface on the optical axis, and the second surface S2 may be concave toward the sensor-side surface on the optical axis. That is, the first lens 111 may have a meniscus shape that is convex toward the object on the optical axis as a whole. Alternatively, the first surface S1 may be convex toward the object-side surface on the optical axis, and the second surface S2 may be convex toward the sensor-side surface on the optical axis. That is, the first lens 110 may have a convex shape on both sides on the optical axis as a whole. Alternatively, the first surface S1 may be concave toward the object-side surface on the optical axis, and the second surface S2 may be concave toward the sensor-side surface on the optical axis. That is, the first lens 110 may have a concave shape on both sides on the optical axis as a whole. Alternatively, the first surface S1 may be concave toward the object-side surface on the optical axis, and the second surface S2 may be convex toward the sensor-side surface on the optical axis. That is, the first lens 110 may have a meniscus shape that is convex toward the sensor-side surface on the optical axis as a whole.

At least one of the first surface S1 and the second surface S2 may be an aspherical surface. For example, both the first surface S1 and the second surface S2 may be the aspherical surface.

The first lens 110 may include an inflection point. In detail, at least one of the first surface S1 and the second surface S2 of the first lens 110 may include the inflection point.

In the first lens 110, a size of an effective diameter of the first surface S1 and a size of an effective diameter of the second surface S2 may be different from each other. For example, in the first lens 110, the size of the effective diameter of the first surface S1 may be greater than the size of the effective diameter of the second surface S2.

The second lens 120 may have positive (+) or negative (−) refractive power on the optical axis. The second lens 120 may include a plastic or glass material. For example, the second lens 120 may be made of a plastic material.

The second lens 120 may include a third surface S3 defined as the object-side surface and a fourth surface S4 defined as the sensor-side surface. The third surface S3 may be convex toward the object-side surface on the optical axis, and the fourth surface S4 may be concave toward the sensor-side surface on the optical axis. That is, the second lens 120 may have a meniscus shape convex toward the object on the optical axis as a whole. Alternatively, the third surface S3 may be convex toward the object-side surface on the optical axis, and the fourth surface S4 may be convex toward the sensor-side surface on the optical axis. That is, the second lens 120 may have a shape in which both surfaces are convex on the optical axis as a whole. Alternatively, the third surface S3 may be concave toward the object-side surface on the optical axis, and the fourth surface S4 may be concave toward the sensor-side surface on the optical axis. That is, the second lens 120 may have a shape in which both surfaces are concave on the optical axis as a whole. Alternatively, the third surface S3 may be concave toward the object-side surface on the optical axis, and the fourth surface S4 may be convex toward the sensor-side surface on the optical axis. That is, the second lens 120 may have a meniscus shape convex toward the sensor on the optical axis as a whole.

At least one of the third surface S3 and the fourth surface S4 may be an aspherical surface. For example, both the third surface S3 and the fourth surface S4 may be the aspherical surface.

The second lens 120 may include an inflection point. In detail, at least one of the third surface S3 and the fourth surface S4 of the second lens 120 may include the inflection point.

In the second lens 120, a size of an effective diameter of the third surface S3 and a size of an effective diameter of the fourth surface S4 may be different from each other. For example, in the second lens 120, the size of the effective diameter of the third surface S3 may be smaller than the size of the effective diameter of the fourth surface S4.

The third lens 130 may have positive (+) or negative (−) refractive power on the optical axis. The third lens 130 may include a plastic or glass material. For example, the third lens 130 may be made of a plastic material.

The third lens 130 may include a fifth surface S5 defined as the object-side surface and a sixth surface S6 defined as the sensor-side surface. The fifth surface S5 may be convex toward the object-side surface on the optical axis, and the sixth surface S6 may be concave toward the sensor-side surface on the optical axis. That is, the third lens 130 may have a meniscus shape convex toward the object on the optical axis as a whole. Alternatively, the fifth surface S5 may be convex toward the object-side surface on the optical axis, and the sixth surface S6 may be convex toward the sensor-side surface on the optical axis. That is, the third lens 130 may have a shape in which both surfaces are convex on the optical axis as a whole. Alternatively, the fifth surface S5 may be concave toward the object-side surface on the optical axis, and the sixth surface S6 may be concave toward the sensor-side surface on the optical axis. That is, the third lens 130 may have a shape in which both surfaces are concave on the optical axis as a whole. Alternatively, the fifth surface S5 may be concave toward the object-side surface on the optical axis, and the sixth surface S6 may be convex toward the sensor-side surface on the optical axis. That is, the third lens 130 may have a meniscus shape convex toward the sensor on the optical axis as a whole.

At least one of the fifth surface S5 and the sixth surface S6 may be an aspherical surface. For example, both the fifth surface S5 and the sixth surface S6 may be the aspherical surface.

The third lens 130 may include an inflection point. In detail, at least one of the fifth surface S5 and the fourth surface S6 of the third lens 130 may include the inflection point.

In the third lens 130, a size of an effective diameter of the fifth surface S5 and a size of an effective diameter of the sixth surface S6 may be different from each other. For example, in the third lens 130, the size of the effective diameter of the fifth surface S5 may be smaller than the size of the effective diameter of the sixth surface S6.

The fourth lens 140 may have positive (+) or negative (−) refractive power on the optical axis. The fourth lens 140 may include a plastic or glass material. For example, the fourth lens 140 may be made of a plastic material.

The fourth lens 140 may include a seventh surface S7 defined as the object-side surface and an eighth surface S8 defined as the sensor-side surface. The seventh surface S7 may be convex toward the object-side surface on the optical axis, and the eighth surface S8 may be concave toward the sensor-side surface on the optical axis. That is, the fourth lens 140 may have a meniscus shape convex toward the object on the optical axis as a whole. Alternatively, the seventh surface S7 may be convex toward the object-side surface on the optical axis, and the eighth surface S8 may be convex toward the sensor-side surface on the optical axis. That is, the fourth lens 140 may have a shape in which both sides are convex on the optical axis as a whole. Alternatively, the seventh surface S7 may be concave toward the object-side surface on the optical axis, and the eighth surface S8 may be concave toward the sensor-side surface on the optical axis. That is, the fourth lens 140 may have a shape in which both surfaces are concave on the optical axis as a whole. Alternatively, the seventh surface S7 may be concave toward the object-side surface on the optical axis, and the eighth surface S8 may be convex toward the sensor-side surface on the optical axis. That is, the fourth lens 140 may have a meniscus shape convex toward the sensor on the optical axis as a whole.

At least one of the seventh surface S7 and the eighth surface S8 may be an aspherical surface. For example, both the seventh surface S7 and the eighth surface S8 may be the aspherical surface.

The fourth lens 140 may include an inflection point. In detail, at least one of the seventh surface S7 and the eighth surface S8 of the fourth lens 140 may include the inflection point.

In the fourth lens 140, a size of an effective diameter of the seventh surface S7 and a size of an effective diameter of the eighth surface S8 may be different from each other. For example, in the fourth lens 140, the size of the effective diameter of the seventh surface S7 may be smaller than the size of the effective diameter of the eighth surface S8.

The fifth lens 150 may have positive (+) or negative (−) refractive power on the optical axis. The fifth lens 150 may include a plastic or glass material. For example, the fifth lens 150 may be made of a plastic material.

The fifth lens 150 may include a ninth surface S9 defined as the object-side surface and a tenth surface S10 defined as the sensor-side surface. The ninth surface S9 may be convex toward the object-side surface on the optical axis, and the tenth surface S10 may be concave toward the sensor-side surface on the optical axis. That is, the fifth lens 150 may have a meniscus shape convex from the optical axis toward the object as a whole. Alternatively, the ninth surface S9 may be convex toward the object-side surface on the optical axis, and the tenth surface S10 may be convex toward the sensor-side surface on the optical axis. That is, the fifth lens 150 may have a shape in which both sides are convex on the optical axis as a whole. Alternatively, the ninth surface S9 may be concave toward the object-side surface on the optical axis, and the tenth surface S10 may be concave toward the sensor-side surface on the optical axis. That is, the fifth lens 150 may have a shape in which both sides are concave on the optical axis as a whole. Alternatively, the ninth surface S9 may be concave toward the object-side surface on the optical axis, and the tenth surface S10 may be convex toward the sensor-side surface on the optical axis. That is, the fifth lens 150 may have a meniscus shape convex toward the sensor on the optical axis as a whole.

At least one of the ninth surface S9 and the tenth surface S10 may be an aspherical surface. For example, both the ninth surface S9 and the tenth surface S10 may be the aspherical surface.

The fifth lens 150 may include an inflection point. In detail, at least one of the ninth surface S9 and the tenth surface S10 of the fifth lens 150 may include the inflection point.

In the fifth lens 150, a size of an effective diameter of the ninth surface S9 and a size of an effective diameter of the tenth surface S10 may be different from each other. For example, in the fifth lens 150, the size of the effective diameter of the ninth surface S9 may be smaller than the size of the effective diameter of the tenth surface S10.

The sixth lens 160 may have positive (+) or negative (−) refractive power on the optical axis. The sixth lens 160 may include a plastic or glass material. For example, the sixth lens 160 may be made of a plastic material.

The sixth lens 160 may include an eleventh surface S11 defined as the object-side surface and a twelfth surface S12 defined as the sensor-side surface.

At least one of the eleventh surface S11 and the twelfth surface S12 may be formed in a free form shape. In detail, at least one of the eleventh surface S11 and the twelfth surface S12 may include a free-form surface. For example, in the sixth lens 160, any one of the eleventh surface S11 and the twelfth surface S12 has the free-form surface, or both the eleventh surface S11 and the twelfth surface S12 may have the free-form surface.

Meanwhile, in the drawings, the eleventh surface S11 and the twelfth surface S12 of the sixth lens 160 are illustrated as having free-form surfaces, but the embodiment is not limited thereto.

That is, in the optical system 1000 according to the embodiment, a surface of any one of the first lens 110 to the sixth lens 160 may have the free-form surface. That is, the sixth lens 160 may have an aspherical surface, and any one of the first lens 110 to the fifth lens 150 may have the free-form surface.

Hereinafter, for convenience of description, the eleventh surface S11 and the twelfth surface S12 of the sixth lens 160 will be mainly described as having free-form surfaces.

Meanwhile, the optical system 1000 may satisfy the following condition.

A back focal length (BFL) of the optical system 1000 may be 0.6 mm or less. In detail, the back focal length (BFL) of the optical system 1000 may be 0.5 mm to 0.55 mm.

Here, the back focal length (BFL) of the optical system 1000 is defined as a distance on the optical axis (OA) from a vertex of the sensor-side surface (the twelfth surface S12) of the last lens (the sixth lens 160) to an upper surface of the image sensor unit 300.

In addition, an effective focal length (EFL) of the optical system may be 3 mm to 4 mm. In detail, the effective focal length (EFL) of the optical system may be 3.6 mm to 3.8 mm.

In addition, the F number of the optical system may be 1.9 to 2.1.

In addition, a total track length or total top length (TTL) of the optical system 1000 may be 5 mm or less. In detail, the total track length or total top length (TTL) of the optical system 1000 may be 4 mm to 5 mm. In detail, the total track length or total top length (TTL) of the optical system 1000 may be 4.4 mm to 4.6 mm.

Here, the total track length (TTL) of the optical system 1000 is defined as a distance in an optical axis QA direction from a vertex of the object-side surface (a first surface S1) of the first lens 110 to the upper surface of the image sensor unit 300.

In addition, a horizontal FOV defined as an angle at which light is incident in the optical system 1000 may be in a range of 60° to 65°, and a vertical FOV may be in a range of 45° to 50°.

In addition, an overall diagonal length of the image sensor unit may be 6 mm to 7 mm. In detail, the overall diagonal length of the image sensor unit may be 6.5 mm to 6.6 mm.

Hereinafter, an optical system according to a first embodiment will be described with reference to FIGS. 3 to 8.

Referring to FIGS. 3 to 8, at least one of the eleventh surface S11 and the twelfth surface S12 may include a free-form surface. In more detail, both the eleventh surface S11 and the twelfth surface S12 may include free-form surfaces.

Shapes of free-form surfaces of the eleventh surface S11 and the twelfth surface S12 of the sixth lens 160 may be defined as a shape according to a sag value at each coordinate defined by an equation and a difference between sag values. That is, the shapes of the eleventh surface S11 and the twelfth surface S12 of the sixth lens 160 may be defined as curved shapes according to a sag value in the eleventh surface S11 and the twelfth surface S12 defined by Equation 2 below and a difference between sags value.

Figure 3:
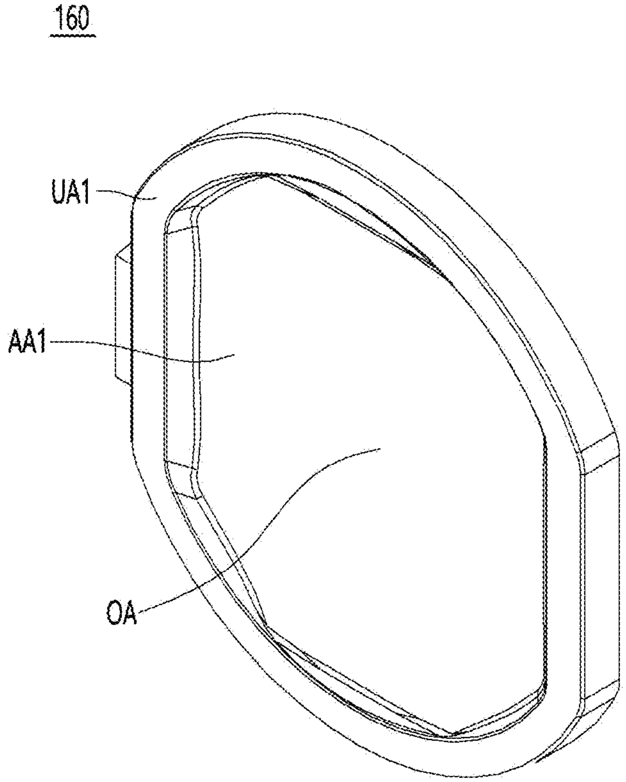
FIGS. 3 and 4 are views for describing an object-side surface of an nth lens of an optical system according to a first embodiment.
Figure 4:
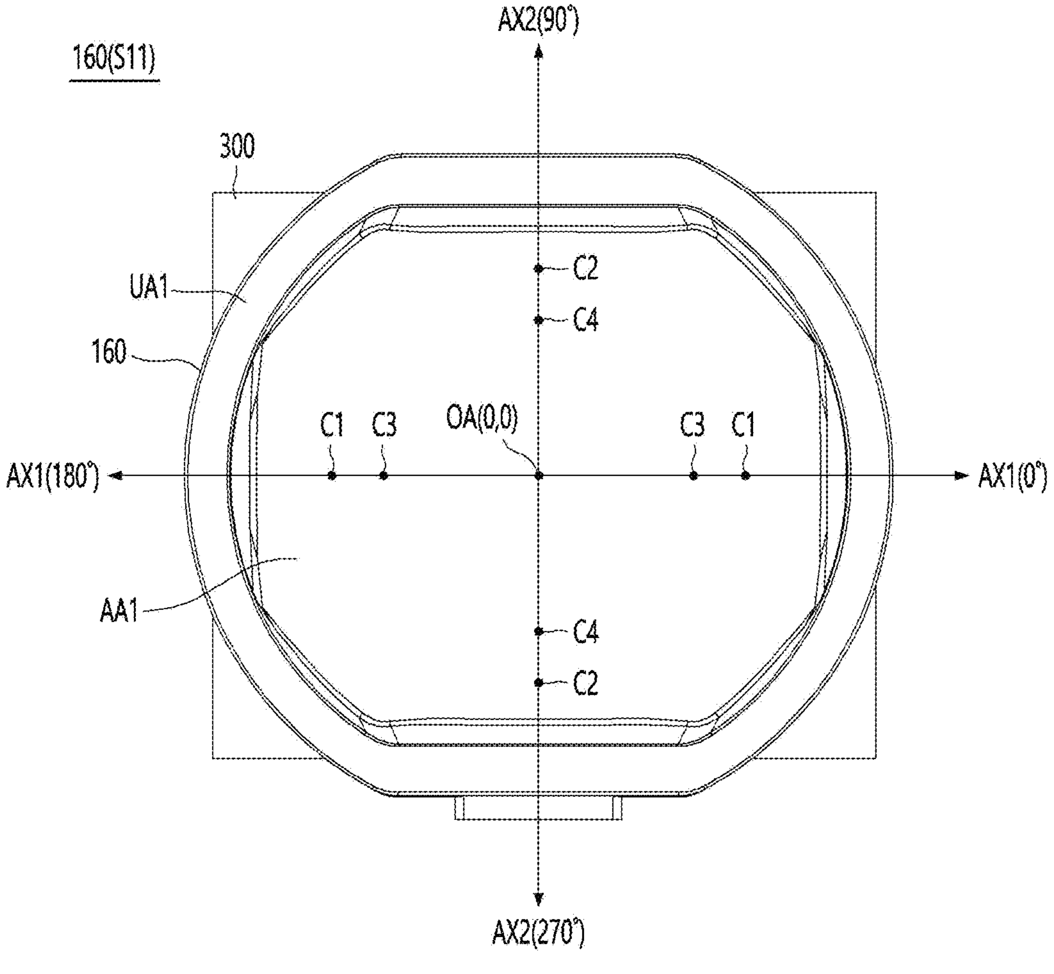
Figure 5:
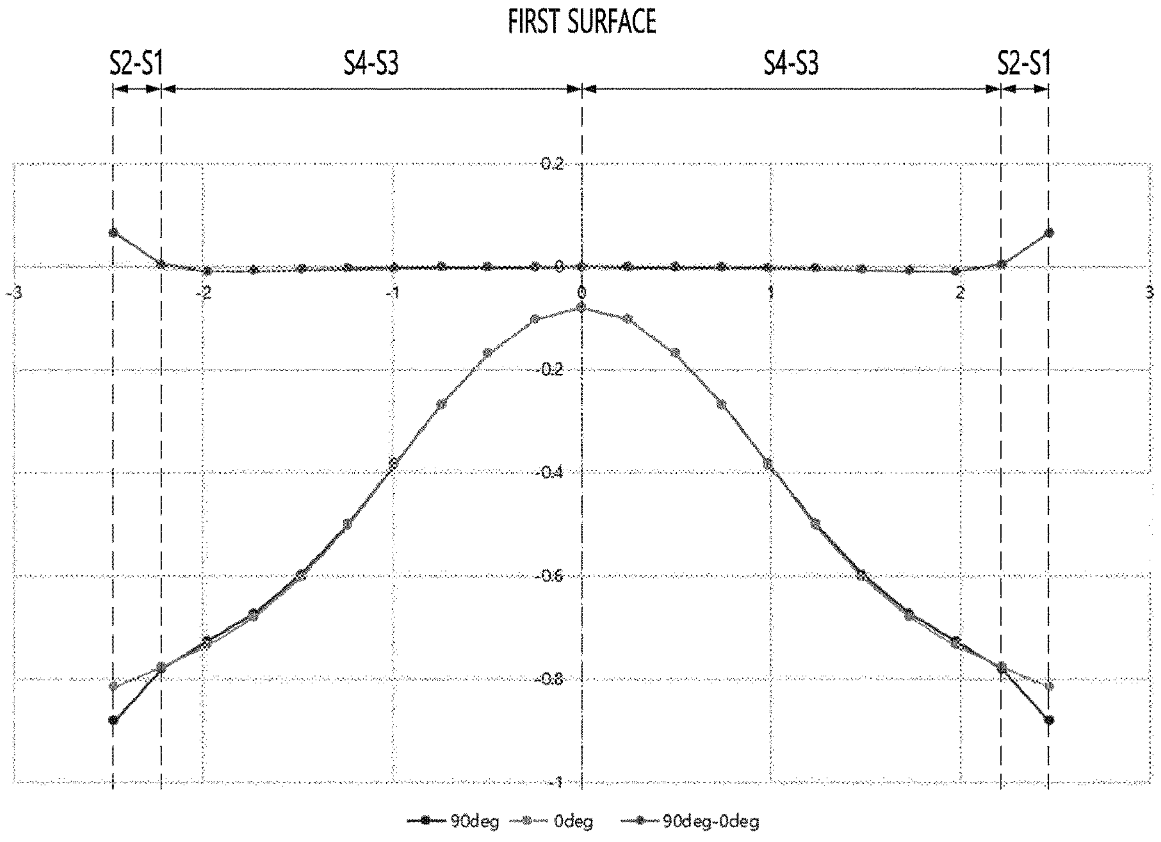
FIG. 5 is a graph for describing a sag value at the object-side surface of the nth lens of the optical system according to the first embodiment.

FIGS. 3 to 5 are views for describing a free-form surface of the eleventh surface S11 of the sixth lens 16.

Referring to FIG. 3, the eleventh surface S11 of the sixth lens 160 may include a first effective region AA1 and a first ineffective region UA1. In detail, the eleventh surface S11 of the sixth lens 160 may include the first effective region AA1 that is a region through which light incident on the sixth lens 160 passes. The light incident on the sixth lens 160 may be refracted in the first effective region AA1 of the eleventh surface S11 of the sixth lens 160 to realize optical characteristics.

In addition, the eleventh surface S11 of the sixth lens 160 may include the first ineffective region UA1 that is a region through which the light incident on the sixth lens 160 does not pass. The light incident on the sixth lens 160 may not pass through the first ineffective region UA1 of the sixth lens 160. Accordingly, the first ineffective region UA1 of the eleventh surface S11 may be independent of the optical characteristics of the light incident on the sixth lens 160. In addition, a part of the first ineffective region UA1 may be fixed to a barrel accommodating the sixth lens 160.

Referring to FIG. 4, a virtual axis for setting coordinates of the eleventh surface S11 may be defined on the eleventh surface S11 of the sixth lens 160.

In detail, a first axis AX1 and a second axis AX2 may be set on the eleventh surface S11 of the sixth lens 160. The first axis AX1 may be defined as a direction parallel to a direction of a major axis of the image sensor unit 300. That is, the first axis AX1 may be defined as an axis passing through the optical axis OA and extending in a direction parallel to the major axis of the image sensor unit 300.

In addition, the second axis AX2 may be defined as a direction parallel to a direction of a minor axis of the image sensor unit 300. That is, the second axis AX2 may be defined as an axis passing through the optical axis OA and extending in a direction parallel to the minor axis of the image sensor unit 300.

For example, the first axis AX1 may be defined as an X axis and may be defined as an axis having angles of 0° and 180° with respect to the optical axis OA. In addition, the second axis AX2 may be defined as a Y axis and may be defined as an axis having angles of 90° and 270° with respect to the optical axis OA.

However, the embodiment is not limited thereto, and the first axis may be defined as the Y axis and the second axis may be defined as the X axis. Hereinafter, for convenience of description, a case in which the first axis AX1 is defined as the X axis and the second axis AX2 is defined as the Y axis will be mainly described.

The first axis AX1 and the second axis AX2 may be perpendicular to each other. That is, the first axis AX1 and the second axis AX2 may be perpendicular to each other on the optical axis OA. Accordingly, the first axis AX1 may be perpendicular to the optical axis OA. In addition, the second axis AX2 may be perpendicular to the optical axis OA. That is, the optical axis OA, the first axis AX1, and the second axis AX2 may be perpendicular to each other.

A plurality of coordinates respectively set to the first axis AX1 and the second axis AX2 may be set on the eleventh surface S11 of the sixth lens 160.

In detail, first coordinates C1 and third coordinates C3 on the first axis AX1 may be set on the eleventh surface S11 of the sixth lens 160. In detail, the first coordinates C1 having coordinates of (±A,0) and the third coordinate C3 having coordinates of (±B,0) on the first axis AX1 may be set on the eleventh surface S11 of the sixth lens 160.

In addition, the eleventh surface S11 of the sixth lens 160 may have a first sag value S1 at the first coordinates C1 and a third sag value S3 at the third coordinates C3.

In addition, second coordinates C2 and fourth coordinates C4 on the second axis AX2 may be set on the eleventh surface S11 of the sixth lens 160. In detail, the second coordinates C2 having coordinates of (0,±A) and the fourth coordinates C4 having coordinates of (0,±B) on the second axis AX2 may be set on the eleventh surface S11 of the sixth lens 160.

In addition, the eleventh surface S11 of the sixth lens 160 may have a second sag value S2 at the second coordinates C2 and a fourth sag value S4 at the fourth coordinates C4.

In this case, the sixth lens may satisfy Equation 1 below.

$$|S2 - S1| > |S4 - S3|$$ [Equation 1]

$$|A| > |B|$$

$$|S4 - S3| \leq 3\ \mu m$$

In Equation 1, each equation may be independent, or a plurality of equations may be combined with each other.

That is, on the eleventh surface S11 of the sixth lens 160, a difference between a sag value on the first axis and a sag value on the second axis at coordinates disposed far from the optical axis (0,0) may be greater than a difference between a sag value on the first axis and a sag value in the second axis at coordinates disposed close to the optical axis (0,0).

That is, on the eleventh surface S11 of the sixth lens 160, as further away from the optical axis (0,0), the difference between the sag value on the first axis and the sag value on the second axis may increase.

In addition, a range of the |S4–S3| value and the |S2–S1| value may be related to an amount of light incident on the image sensor unit through the sixth lens and the optical characteristics of the optical system.

In detail, when |S4–S3| is set to a value of 3 μm or less, an amount of light passing through the sixth lens and incident toward the image sensor unit may be increased. In addition, when the |S2–S1| is set to an excessive value of the |S4–S3|, the amount of light passing through the sixth lens 160 and incident toward the image sensor unit may be increased. Accordingly, a relative illumination RI of the image sensor unit may be increased to 35% or more.

In addition, when |S4–S3| of the sixth lens is set to a value of 3 μm or less, it is possible to have improved optical characteristics. That is, the optical system including the sixth lens may have improved MTF characteristics.

That is, when |S4–S3| of the sixth lens satisfies a value of 3 μm or less, it is possible to improve the resolution by increasing the amount of light incident on the image sensor unit while having improved optical characteristics.

However, when the |S4–S3| is set to a value greater than 3 μm, the amount of light passing through the sixth lens and incident toward the image sensor unit decreases, or the MTF characteristics of the entire optical system are lowered, so that the optical characteristics may be lowered.

That is, when |S4–S3| of the sixth lens does not satisfy a value of 3 μm or less, the amount of light incident to the image sensor unit may decrease to lower the resolution, or the overall optical characteristics of the optical system may be lowered to increase aberration and distortion.

FIG. 5 is a graph showing a difference in sag value according to differences between the first sag value S1, the second sag value S2, the third sag value S3, and the fourth sag value S4 on the eleventh surface S11 of the sixth lens 160.

In FIG. 5, an X axis is a distance (mm) on the optical axis, and a Y axis is a size (mm) of a sag value at coordinates determined by the distance on the optical axis.

Referring to FIG. 5, on the eleventh surface S11 of the sixth lens 160, it can be seen that an absolute value of the sag value on the first axis and the sag value on the second axis gradually increases as further away from the optical axis (0,0) and a difference between the sag value on the first axis and the sag value on the second axis increases from a specific point.

In addition, referring to FIG. 5, on the eleventh surface S11 of the sixth lens 160, it can be seen that a left and right sag value in the first axis AX1 direction and a vertical sag value in the second axis AX2 direction are symmetrical to each other.

Accordingly, the eleventh surface S11 of the sixth lens 160 on which the shape of the free-form surface is defined by the sag values may be symmetrical in the first axis direction AX1 and may be symmetrical in the second axis direction AX2.

Meanwhile, a sag value of the eleventh surface S11 of the sixth lens 160 may be set by Equation 2 below.

$$z = \frac{cr^2}{1 + \sqrt{(1+k)c^2r^2}} + \sum_{i=1}^{n} C_j Z_j$$ [Equation 2]

(In Equation 2, Z is a sag value of an nth lens, c is a curvature value of an nth lens, r is an effective diameter value of an nth lens, k is a conic constant, and Cj is a Zernike coefficient at the j order, and Zj is a Zernike basis at the j order).

In addition, the first coordinates C1, the second coordinates C2, the third coordinates C3, and the fourth coordinates C4 may satisfy Equation 3 below.

$$h_1 = H - t_1 * \tan(\theta_h - \alpha),$$ {Equation 3]

$$|B| < 0.7 * h_1 \leq |A|$$

(In Equation 3, $h_1$ is a distance spaced apart from the optical axis in the negative or positive direction of the first axis, H is half of the minor axis of the image sensor unit, $t_1$ is a distance from the eleventh surface S11 to the image sensor unit, and $\theta_h$ is the chief ray angle in the 0.6 field of the image sensor unit, and α is $\sin^{-1}(1/(2*F\ number))$. Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

Meanwhile, when the optical system is applied to a mobile display device such as a smart phone, an average angle of $\theta_h$ may be 34°.

In addition, the eleventh surface S11 of the sixth lens 160 may satisfy Equation 4 below.

$$|S4-S3|=0 \quad \text{[Equation 4]}$$

That is, the third sag value of the third coordinate and the fourth sag value of the fourth coordinate may be the same. That is, an absolute value of a difference between the third sag value of the third coordinate and the fourth sag value of the fourth coordinate satisfying Equation 3 may be greater than 0 and may be 3 μm or less.

Figure 6:
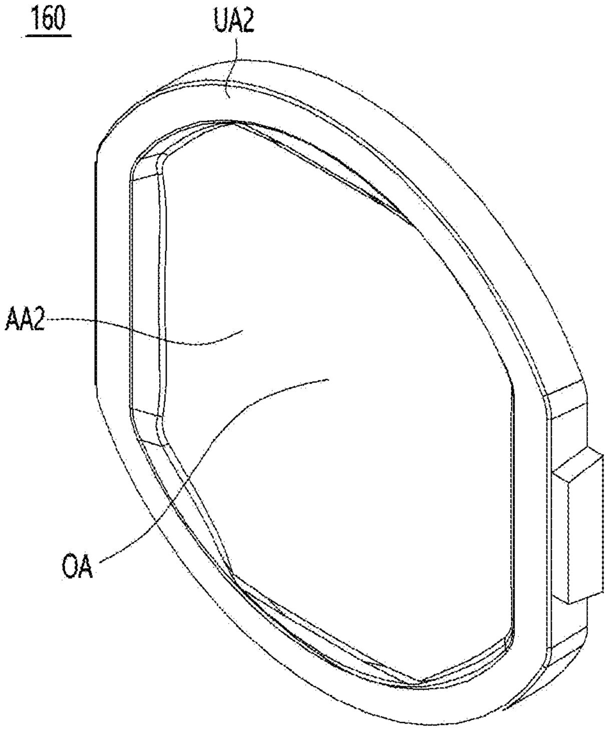
FIGS. 6 and 7 are diagrams for describing a sensor-side surface of the nth lens of the optical system according to the first embodiment.
Figure 7:
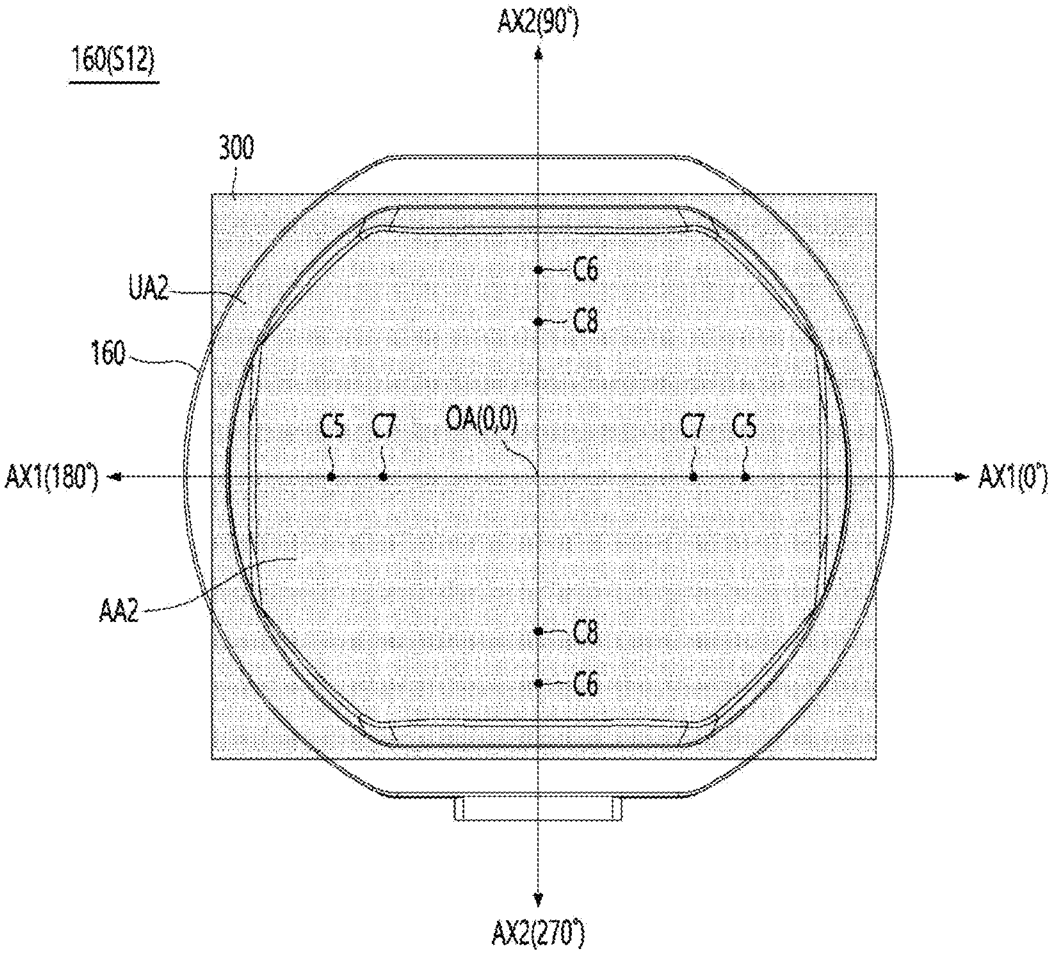
Figure 8:
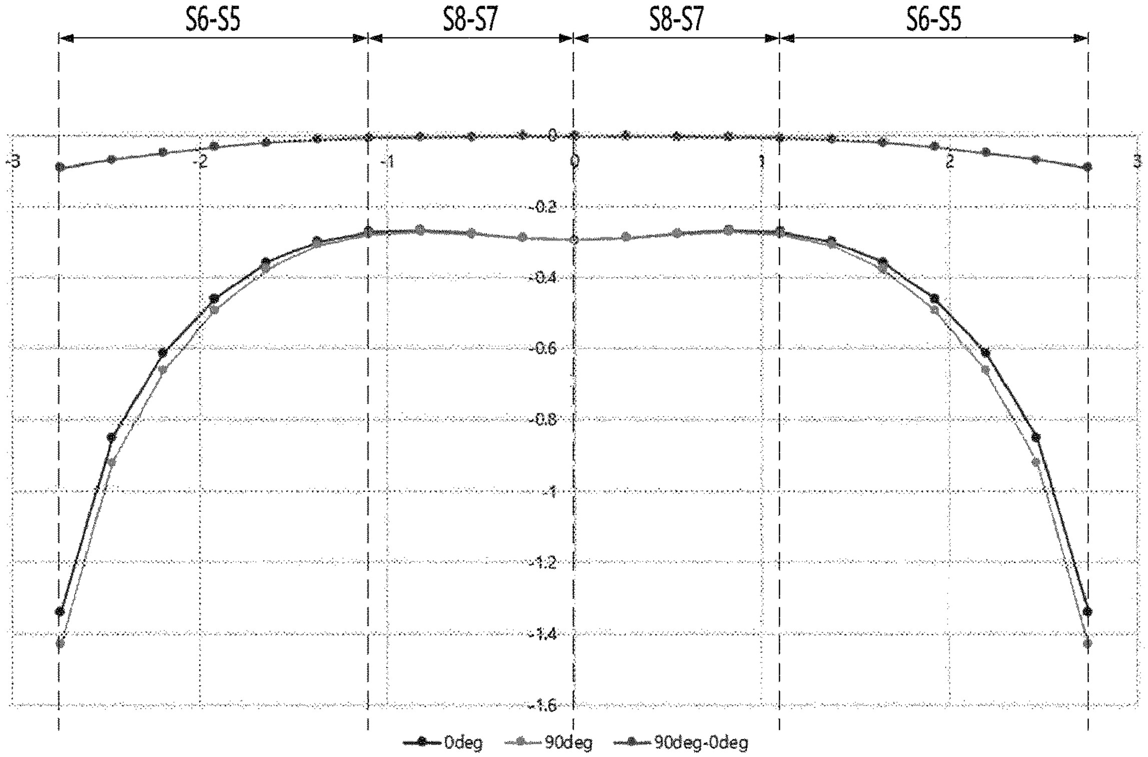
FIG. 8 is a graph for describing a sag value at the sensor-side surface of the nth lens of the optical system according to the first embodiment.

FIGS. 6 to 8 are views for describing a free-form surface of the twelfth surface S12 of the sixth lens 160.

Referring to FIG. 6, the twelfth surface S12 of the sixth lens 160 may include a second effective region AA2 and a second ineffective region UA2. In detail, the twelfth surface S12 of the sixth lens 160 may include the second effective region AA2 that is a region through which light incident on the sixth lens 160 passes. The light incident on the sixth lens 160 may be refracted in the second effective region AA2 of the twelfth surface S12 of the sixth lens 160 to realize optical characteristics.

In addition, the twelfth surface S12 of the sixth lens 160 may include the second ineffective region UA2 that is a region through which the light incident on the sixth lens 160 does not pass. The light incident on the sixth lens 160 may not pass through the second ineffective region UA2 of the sixth lens 160. Accordingly, the second ineffective region UA2 of the twelfth surface S12 may be independent of the optical characteristics of the light incident on the sixth lance 160. In addition, a part of the second ineffective region UA2 may be fixed to the barrel accommodating the sixth lens 160.

Referring to FIG. 7, a virtual axis for setting coordinates of the twelfth surface S12 may be set on the twelfth surface S12 of the sixth lens 160.

In detail, the first axis AX1 and the second axis AX2 may be set on the twelfth surface S12 of the sixth lens 160. The first axis AX1 may be defined in a direction parallel to the direction of the major axis of the image sensor unit 300. That is, the first axis AX1 may be defined as an axis passing through the optical axis OA and extending in a direction parallel to the major axis of the image sensor unit 300.

In addition, the second axis AX2 may be defined in a direction parallel to the direction of the minor axis of the image sensor unit 300. That is, the second axis AX2 may be defined as an axis passing through the optical axis OA and extending in a direction parallel to the minor axis of the image sensor unit 300.

For example, the first axis AX1 may be defined as an X axis and may be defined as an axis having angles of 0° and 180° with respect to the optical axis OA. In addition, the second axis AX2 may be defined as a Y axis and may be defined as an axis having angles of 90° and 270° with respect to the optical axis OA.

The first axis AX1 and the second axis AX2 may be perpendicular to each other. That is, the first axis AX1 and the second axis AX2 may be perpendicular to each other on the optical axis OA. Accordingly, the first axis AX1 may be perpendicular to the optical axis OA. In addition, the second axis AX2 may be perpendicular to the optical axis OA. That is, the optical axis OA, the first axis AX1, and the second axis AX2 may be perpendicular to each other.

A plurality of coordinates respectively set to the first axis AX1 and the second axis AX2 may be set on the twelfth surface S12 of the sixth lens 160.

In detail, fifth coordinates C5 and seventh coordinates C7 on the first axis AX1 may be set on the twelfth surface S12 of the sixth lens 160. In detail, the fifth coordinates C5 having coordinates of (±C,0) and the seventh coordinates C7 having coordinates of (±D,0) on the first axis AX1 may be set on the twelfth surface S12 of the sixth lens 160.

In addition, the twelfth surface S12 of the sixth lens 160 may have a fifth sag value S5 at the fifth coordinates C5 and a seventh sag value S7 at the seventh coordinates C7.

In addition, sixth coordinates C6 and eighth coordinates C8 on the second axis AX2 may be set on the twelfth surface S12 of the sixth lens 160. In detail, the sixth coordinates C6 having coordinates of (0,±C) and the eighth coordinates C8 having coordinates of (0,±D) on the second axis AX2 may be set on the twelfth surface S12 of the sixth lens 160.

In addition, the twelfth surface S11 of the sixth lens 160 may have a sixth sag value S6 at the sixth coordinates C6 and an eighth sag value S8 at the eighth coordinates C8.

In this case, the sixth lens may satisfy Equation 5 below.

$$|S6-S5|>|S8-S7| \quad \text{[Equation 5]}$$

$$|C|>|D|$$

$$|S8-S7|\leq 5\ \mu\text{m}$$

In Equation 5, each equation may be independent, or a plurality of equations may be combined with each other.

In addition, a range of the |S8−S7| value may be related to an amount of light incident on the image sensor unit through the sixth lens and the optical characteristics of the optical system.

In detail, when |S8−S7| is set to a value of 5 μm or less, the amount of light passing through the sixth lens and incident toward the image sensor unit may be increased. Accordingly, the relative illumination RI of the image sensor unit may be increased to 35% or more.

In addition, when |S8−S7| of the sixth lens is set to a value of 5 μm or less, it is possible to have improved optical characteristics. That is, the optical system including the sixth lens may have improved MTF characteristics. In detail, when the |S6−S5| is set to a value greater than the S8−S7|, that is, when the |S6−S5| is set to a value greater than 5 μm, the amount of light passing through the sixth lens 160 and incident toward the image sensor unit may be increased.

That is, the optical system including the sixth lens may have improved MTF characteristics.

That is, when |S8−S7| of the sixth lens satisfies a value of 5 μm or less, it is possible to improve the resolution by increasing the amount of light incident on the image sensor unit while having improved optical characteristics.

However, when the |S8−S7| is set to a value greater than 5 μm, the amount of light passing through the sixth lens and incident toward the image sensor unit is decreased, or the MTF characteristics of the entire optical system are deteriorated, so that the optical characteristics may be deteriorated.

That is, when |S8−S7| of the sixth lens does not satisfy a value of 5 μm or less, in detail, when the |S6−S5| is set to a value greater than the |S8−S7|, that is, when the |S6−S5| is set to a value greater than 5 μm, the amount of light incident on the image sensor unit is decreased to lower the resolution, or the overall optical characteristics of the optical system are deteriorated, so that aberration and distortion may be increased.

That is, on the twelfth surface S12 of the sixth lens 160, a difference between a sag value on the first axis and a sag value on the second axis at coordinates disposed far from the optical axis (0,0) may be greater than a difference between a sag value on the first axis and a sag value in the second axis at coordinates disposed close to the optical axis (0,0).

That is, on the twelfth surface S12 of the sixth lens 160, as further away from the optical axis (0,0), the difference between the sag value on the first axis and the sag value on the second axis may increase.

FIG. 8 is a graph showing a difference in sag value according to differences between the fifth sag value S5, the sixth sag value S6, the seventh sag value S7, and the eighth sag value S8 on the twelfth surface S12 of the sixth lens 160.

In FIG. 8, an X axis is a distance (mm) between the first axis and the second axis on the optical axis, and a Y axis is a size (mm) of a sag value at coordinates determined by the distance on the optical axis.

Referring to FIG. 8, on the twelfth surface S12 of the sixth lens 160, it can be seen that an absolute value of the sag value on the first axis and an absolute value of the sag value on the second axis gradually increases as further away from the optical axis (0,0) and a difference between the sag value on the first axis and the sag value on the second axis further increases from a specific point.

In addition, referring to FIG. 8, on the twelfth surface S12 of the sixth lens 160, it can be seen that left and right sag values based on the optical axis in the first axis AX1 direction and upper and lower sag values based on the optical axis in the second axis AX2 direction.

Accordingly, the twelfth surface S12 of the sixth lens 160 on which the shape of the free-form surface is defined by the sag values may be symmetrical in the first axis direction AX1 and may be symmetrical in the second axis direction AX2.

Meanwhile, a sag value of the twelfth surface S12 of the sixth lens 160 may be set by Equation 2 above.

In addition, the fifth coordinates C5, the sixth coordinates C6, the seventh coordinates C7, and the eighth coordinates C8 may satisfy Equation 6 below.

$$h_2 = H - t_2 * \tan(\theta_h - \alpha), \qquad \text{[Equation 6]}$$

$$|D| < 0.7 * h1 \leq |C|$$

(In Equation 6, $h_2$ is a distance spaced apart from the optical axis in the negative or positive direction of the first axis, H is half of the minor axis of the image sensor unit, $t_2$ is a distance from the twelfth surface S12 to the image sensor unit, and $\theta_h$ is the chief ray angle in the 0.6 field of the image sensor unit, and $\alpha$ is $\sin^{-1}(1/(2*\text{F number}))$. Here, when half of the diagonal length from the center of the image sensor unit to the corner is set to 1.0 field, the field of the image sensor unit may be defined as a relative distance from the center of the image sensor unit to any point of the diagonal length.)

Meanwhile, when the optical system is applied to the mobile display device such as the smart phone, the average angle of $\theta_h$ may be 34°.

In addition, the twelfth surface S12 of the sixth lens 160 may satisfy Equation 7 below.

$$|S8 - S7| = 0 \qquad \text{[Equation 7]}$$

That is, the seventh sag value of the seventh coordinate and the eighth sag value of the eighth coordinate may be the same.

In the optical system according to the embodiment, the sixth lens may have a sag value set by the above equations and a relationship between the sag values, and the object-side surface and the sensor-side surface of the sixth lens may have a free-form surface formed by the sag value and the relationship between the sag values.

Accordingly, when light is incident on the image sensor unit through the optical system according to the embodiment, a relative illumination of the image sensor unit may be improved.

That is, in the optical system according to the embodiment, the light is incident on the image sensor unit through the sixth lens, and when the light is incident on the image sensor unit, the relative illumination of the image sensor unit may be improved by expanding a region where the light is incident from the optical system to the image sensor unit, that is, by expanding an effective region of the image sensor unit.

In detail, in the optical system according to the embodiment, when an illuminance in the brightest region and an illuminance in the darkest region of the image sensor unit are compared, light may be incident on the image sensor unit such that an illuminance of the darkest region has an illuminance of 30% or more with respect to the brightest region. In detail, in the optical system according to the embodiment, when the illuminance in the brightest region and the darkest region of the image sensor unit is compared, light may be incident on the image sensor unit such that an illuminance of the darkest region has an illuminance of 35% or more with respect to the brightest region. In more detail, in the optical system according to the embodiment, when the illuminance in the brightest region and the darkest region of the image sensor unit is compared, light may be incident on the image sensor unit such that an illuminance of the darkest region has an illuminance of 45% or more with respect to the brightest region.

Therefore, in the optical system according to the embodiment, in order to increase the amount of light incident on the image sensor unit, the amount of light incident on the image sensor unit may be increased while maintaining a size of the lenses and improved optical characteristics without increasing the aperture of the lenses.

Hereinafter, an optical system according to a second embodiment will be described with reference to FIGS. 9 and 10. In the description of the second embodiment, a description of a configuration the same as or similar to the optical system according to the first embodiment described above will be omitted. In addition, in the description of the second embodiment, the same reference numerals are assigned to components the same as or similar to those of the optical system according to the first embodiment described above. In addition, the second embodiment may be an embodiment implemented independently or an embodiment implemented in combination with the first embodiment.

Figure 9:
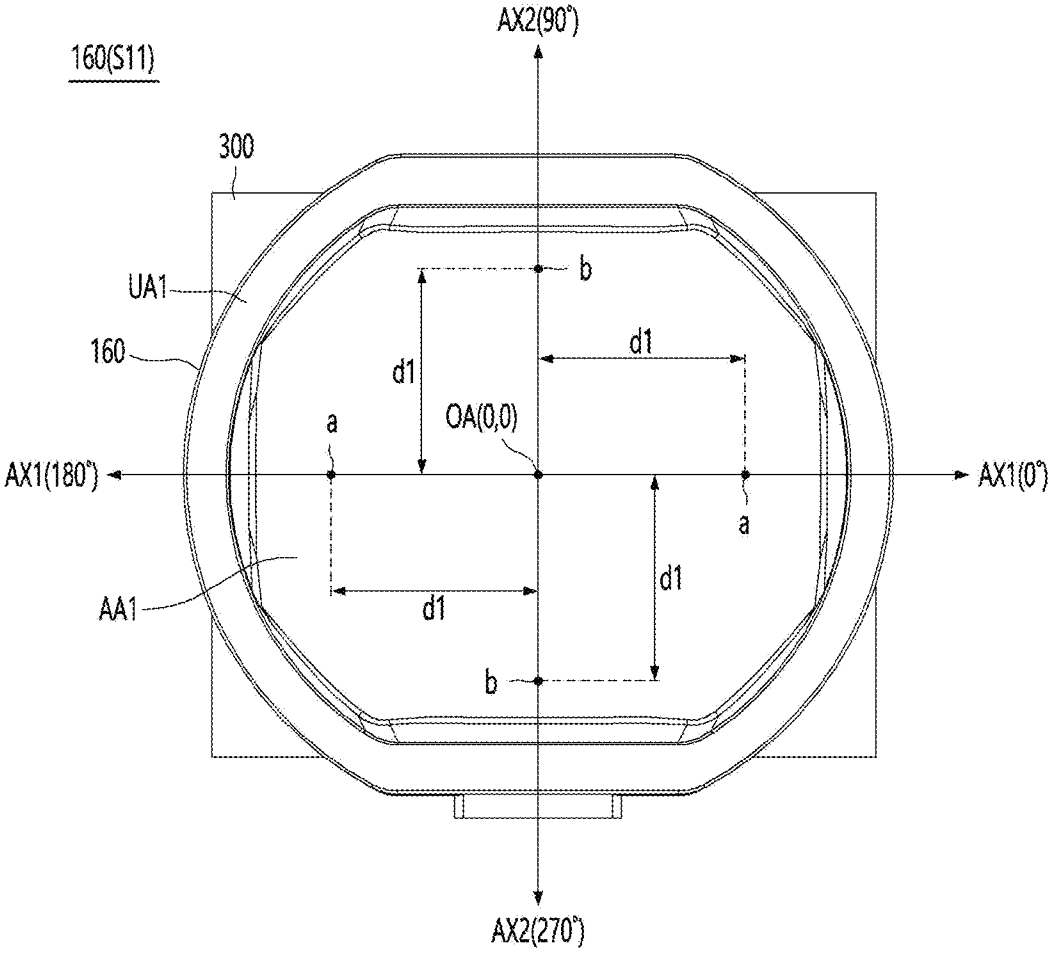
FIG. 9 is a view for describing a sag value at an object-side surface of a sixth lens of an optical system according to a second embodiment.
Figure 10:
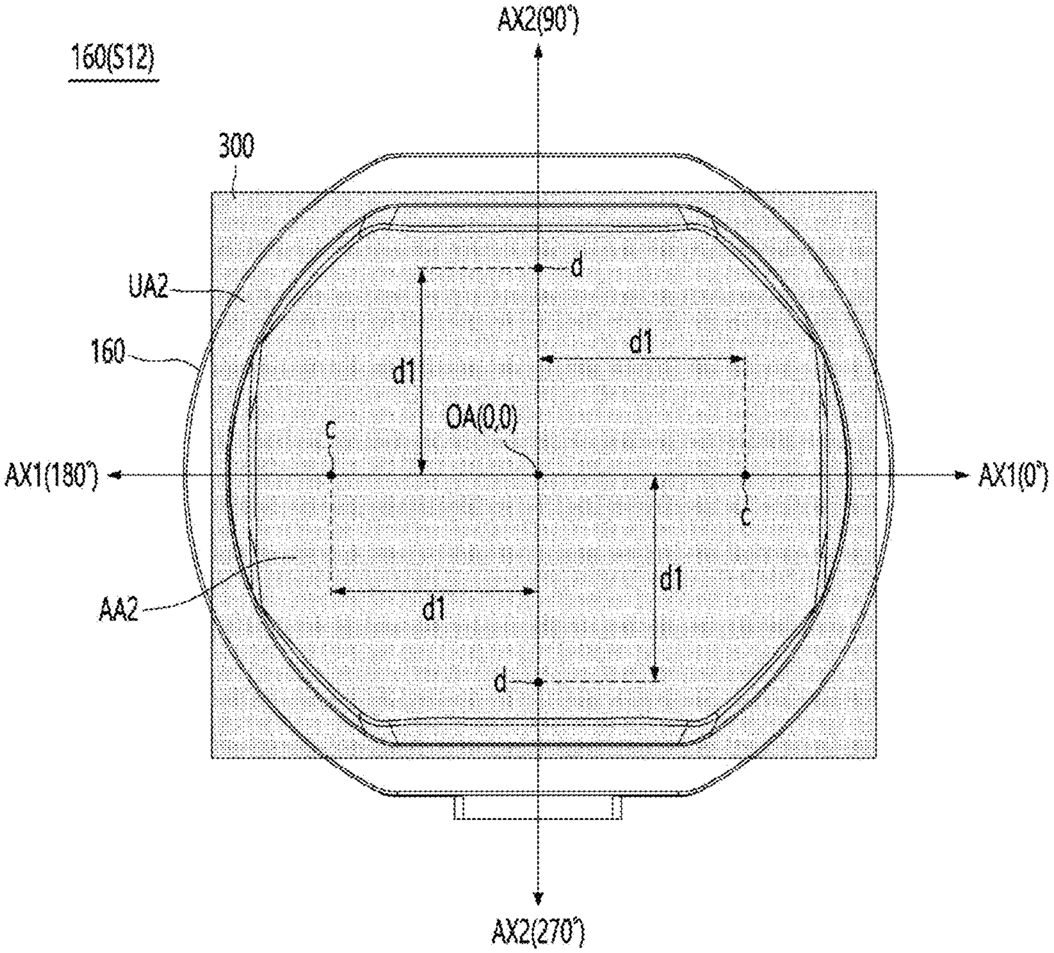
FIG. 10 is a view for describing a sag value at a sensor-side surface of the sixth lens of the optical system according to the second embodiment.

Referring to FIGS. 9 and 10, the eleventh surface S11 of the sixth lens 160 may have a first sag value S1 at coordinates a that are spaced apart by a first distance d1 from the optical axis OA in the first axis direction and may have a second sag value S2 at coordinates b that are spaced apart by the first distance d1 from the optical axis OA in the second axis direction.

In addition, the twelfth surface S12 of the sixth lens 160 may have a third sag value S3 at coordinates c that are spaced apart by the first distance d1 from the optical axis OA in the first axis direction and may have a fourth sag value S4 at coordinates d that are spaced apart by the first distance d1 from the optical axis OA in the second axis direction.

In this case, the sixth lens may satisfy Equation 8 below.

$$d1 > 0 \quad \text{[Equation 8]}$$

$$S2 - S1 \neq 0$$

$$S4 - S3 \neq 0$$

In Equation 8, each equation may be independent, or a plurality of equations may be combined with each other.

That is, in the eleventh surface S11 and the twelfth surface S12 of the sixth lens, the sag value on the second axis and the sag value on the first axis may be different from each other. That is, on the eleventh surface S11 and the twelfth surface S12 of the sixth lens, a difference between the sag value on the second axis and the sag value on the first axis may not be zero. That is, on the eleventh surface S11 and the twelfth surface S12 of the sixth lens, a difference between the sag value on the second axis and the sag value on the first axis may be greater than or less than zero.

In addition, the sixth lens may satisfy Equation 9 below.

$$|S2 - S1| < |S4 - S3| \quad \text{[Equation 9]}$$

That is, an absolute value of a difference between the sag value on the second axis and the sag value on the first axis on the eleventh surface S11 of the sixth lens may be smaller than an absolute value of a difference between the sag value on the second axis and the sag value on the first axis on the twelfth surface S12.

In addition, the first sag value S1, the second sag value S2, the third sag value S3, and the fourth sag value S4 may satisfy Equation 10 below.

$$|S2 - S1| > 1\ \mu m \quad \text{[Equation 10]}$$

$$|S4 - S3| > 3\ \mu m$$

In Equation 10, each equation may be independent, or a plurality of equations may be combined with each other.

In addition, the third sag value S3 and the fourth sag value S4 may satisfy Equation 11 below.

$$|S3| \leq |S4| \quad \text{[Equation 11]}$$

In addition, the first distance d1 may satisfy Equation 12 below.

$$h_1 = H - t_1 * \tan(\theta_h - \alpha) \quad \text{[Equation 12]}$$

$$0.7 * h_1 < |d1|$$

(In Equation 12, $h_1$ is a distance spaced apart from the optical axis in the negative or positive direction of the first axis, H is half of the minor axis of the image sensor unit, $t_1$ is a distance from the first surface of the nth lens to the image sensor unit, and $\theta_h$ is the chief ray angle in the 0.6 field of the image sensor unit, and $\alpha$ is $\sin^{-1}(1/(2*F\ \text{number}))$).

In Equation 12, each equation may be independent, or a plurality of equations may be combined with each other.

When the optical system is applied to the mobile display device such as the smartphone, the average angle of $\theta_h$ may be 34°.

That is, in the sixth lens, positions of coordinates disposed facing each other on the eleventh surface S11 and the twelfth surface S12, a magnitude of the sag values of the coordinates, and relationship between the sag values of the coordinates may satisfy Equation 8, Equation 9, Equation 10, Equation 11, and Equation 12.

In detail, in the sixth lens, a plurality of coordinates disposed at the same position to face each other may be set on the eleventh surface S11 and the twelfth surface S12 facing each other, a difference between the second sag value on the second axis and the first sag value on the first axis on the eleventh surface S11 and a difference between the fourth sag value on the second axis and the third sag value on the first axis on the twelfth surface S12 may not be zero, and an absolute value of the difference between the second sag value and the first sag value may be smaller than an absolute value of the difference between the fourth sag value and the third sag value.

In addition, |S2−S1|, which is the absolute value of the difference between the second sag value and the first sag value, may exceed 1 μm, and |S4−S3|, which is the absolute value of the difference between the fourth sag value and the third sag value, may exceed 3 μm.

In addition, the first distance d1 for setting the coordinates of the eleventh surface S11 and the twelfth surface S12 may be greater than 0.7 times a value set by Equation 12.

Ranges of the |S2−S1|, the |S4−S3|, and the d1 may be determined by a size of the image sensor and may be related to the amount of light incident on the image sensor unit through the sixth lens and optical characteristics of the optical system.

In detail, when the ranges of the |S2−S1|, the |S4−S3|, and the d1 satisfy the range, the amount of light passing through the sixth lens and incident toward the image sensor unit may be increased. Accordingly, the relative illumination RI of the image sensor unit may be increased to 30% or more. In detail, the relative illumination RI of the image sensor unit may be increased to 35% or more. In more detail, the relative illumination RI of the image sensor unit may be increased to 45% or more.

In addition, when the ranges of the |S2−S1|, the |S4−S3|, and the d1 satisfy the range, it is possible to have improved optical characteristics. That is, the optical system including the sixth lens may have improved MTF characteristics.

That is, when the ranges of the |S2−S1|, the |S4−S3|, and the d1 satisfy the range, it is possible to improve the resolution by increasing the amount of light incident on the image sensor unit while having improved optical characteristics.

However, when the ranges of the |S2−S1|, the |S4−S3|, and the d1 does not satisfy the range, the amount of light passing through the sixth lens and incident toward the image sensor unit is decreased, or the MTF characteristics of the entire optical system are deteriorated, so that the optical characteristics may be deteriorated.

That is, when the ranges of the |S2−S1|, the |S4−S3|, and the d1 does not satisfy the range, the amount of light incident on the image sensor unit is decreased to lower the resolution, or the overall optical characteristics of the optical system are deteriorated, so that aberration and distortion may be increased.

Hereinafter, an optical system according to a third embodiment will be described with reference to FIGS. 11 and 12. In the description of the third embodiment, descriptions of configurations the same as or similar to those of the optical systems according to the first and second embodiments described above will be omitted. In addition, in the description of the third embodiment, the same reference numerals are assigned to the configurations the same as or similar to the optical systems according to the first and second embodiments described above. In addition, the third embodiment may be an embodiment implemented independently or an embodiment implemented in combination with the first embodiment and/or the second embodiment.

Figure 11:
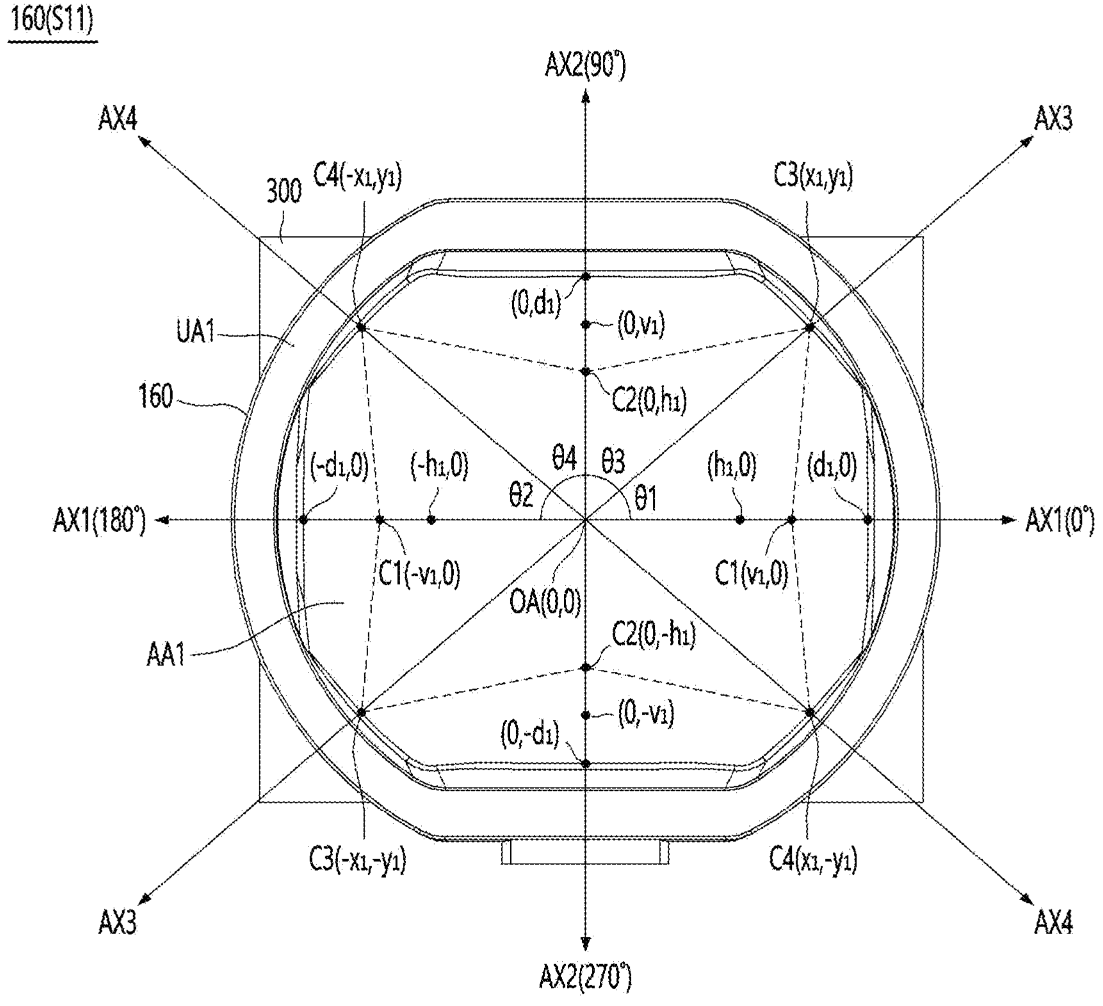
FIG. 11 is a view for describing a sag value at an object-side surface of a sixth lens of an optical system according to a third embodiment.

Referring to FIG. 11, a first effective surface AS1 may be defined in the first effective region AA1 of the eleventh surface S11 of the sixth lens 160. In detail, the first effective surface AS1 set by coordinates defined by the following equations may be set on the eleventh surface S11 of the sixth lens 160. The first effective surface AS1 may be defined as a region where light is refracted in the first effective region AA1 of the eleventh surface S11 of the sixth lens 160 to realize the optical characteristics.

Referring to FIG. 11, a virtual axis for setting the coordinates of the eleventh surface S11 may be set on the eleventh surface S11 of the sixth lens 160.

In detail, virtual axes of a first axis AX1, a second axis AX2, a third axis AX3, and a fourth axis AX4 may be set on the eleventh surface S11 of the sixth lens 160. The first axis AX1 may be defined as the direction parallel to the major axis of the image sensor unit 300. That is, the first axis AX1 may be defined as the axis passing through the optical axis OA and extending in the direction parallel to the major axis of the image sensor unit 300.

In addition, the second axis AX2 may be defined as the direction parallel to the minor axis of the image sensor unit 300. That is, the second axis AX2 may be defined as the axis passing through the optical axis OA and extending in the direction parallel to the minor axis of the image sensor unit 300.

In addition, the third axis AX3 and the fourth axis AX4 may be defined as a direction parallel to a diagonal length direction of the image sensor unit 300. That is, the third axis AX2 and the fourth axis AX4 may be defined as axes passing through the optical axis OA and extending in a direction parallel to a diagonal of the image sensor unit 300.

For example, the first axis AX1 may be defined as the X axis, the second axis AX2 may be defined as the Y axis, and the third axis AX3 and the fourth axis AX4 may be defined as an X-Y axis.

The first axis AX1 and the second axis AX2 may be perpendicular to each other. That is, the first axis AX1 and the second axis AX2 may be perpendicular to each other on the optical axis OA. Accordingly, the first axis AX1 may be perpendicular to the optical axis OA. In addition, the second axis AX2 may be perpendicular to the optical axis OA. That is, the optical axis OA, the first axis AX1, and the second axis AX2 may be perpendicular to each other.

In addition, the third axis AX3 and the fourth axis AX4 may be perpendicular to the first axis AX1. In addition, the third axis AX3 and the fourth axis AX4 may be perpendicular to the second axis AX2. In addition, the third axis AX3 and the fourth axis AX4 may not be perpendicular to the optical axis OA. That is, the third axis AX3 and the fourth axis AX4 may be perpendicular to the first axis AX1, the second axis AX2, and the optical axis OA.

In addition, the third axis AX3 and the fourth axis AX4 may not be perpendicular to each other.

In addition, a first angle θ1 between the first axis AX1 and the third axis AX3 and a second angle θ2 between the first axis AX1 and the fourth axis AX4 may be the same in a tolerance range. In addition, a third angle θ3 between the second axis AX2 and the third axis AX3 and a fourth angle θ4 between the second axis AX2 and the fourth axis AX4 may be the same within the tolerance range. For example, the first angle θ1 between the first axis AX1 and the third axis AX3 and the second angle θ2 between the first axis AX1 and the fourth axis AX4 may have an interior angle of 35° to 40°. In detail, the interior angle of the first angle θ1 and the second angle θ2 may be 35° to 40°.

A plurality of coordinates for defining the first effective surface AS1 set by the coordinates that are respectively set on the first axis AX1, the second axis AX2, the third axis AX3, and the fourth axis AX4 may be set on the eleventh surface S11 of the sixth lens 160.

In detail, first coordinates C1 defined by Equations 13-1 and 13-2 below may be set on the first axis AX1.

$$v_1' = V - t_1 * \tan(\theta_v - \alpha) \quad \text{[Equation 13-1]}$$

$$0.7 * v_1' < v_1 < 1.3 * v_1' \quad \text{[Equation 13-2]}$$

(In Equation 13-1, $v_1$' is a distance spaced apart from the optical axis in the negative or positive direction of the first axis, V is a half of the major axis of the image sensor unit, $t_1$ is a distance from the eleventh surface S11 to the image sensor unit, $\theta_v$ is the chief ray angle in the 0.8 field of the image sensor unit, and α is $\sin^{-1}$(1/(2*F number)). Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

When the optical system is applied to the mobile display device such as the smartphone, an average angle of $\theta_v$ may be 35°.

Equation 13-1 is an equation for defining a distance $v_1$' spaced apart from the optical axis OA in the positive and negative directions of the first axis, and Equation 13-2 may refer to a distance $v_1$ that is set in consideration of a process error at the distance $v_1$' calculated by Equation 13-1.

That is, the distance $v_1$' calculated by Equation 13-1 may be a theoretical value, and the distance $v_1$ calculated by Equation 13-2 may be a design value in consideration of tolerance.

The distance $v_1$ spaced apart from the optical axis OA in the positive and negative directions of the first axis may be set by Equations 13-1 and 13-2. Accordingly, the first coordinates C1 of ($v_1$.0) and (−$v_1$,0) may be set on the first axis AX1 by Equations 13-1 and 13-2.

In addition, second coordinates C2 defined by Equations 14-1 and 14-2 below may be set on the second axis AX2.

$$h_1': H - t_1 * \tan(\theta_h - \alpha) \quad \text{[Equation 14-1]}$$

$$h_1' < v_1'$$

-continued $$0.7*h_1' < h_1 < 1.3*h_1' \quad \text{[Equation 14-2]}$$

$$h_1 < v_1$$

(In Equation 14-1, $h_1$' is a distance spaced apart from the optical axis in the negative or positive direction of the first axis, H is a half of the minor axis length of the image sensor unit, $t_1$ is a distance from the eleventh surface S11 to the image sensor unit, $\theta_h$ is the chief ray angle in the 0.6 field of the image sensor unit, and $\alpha$ is $\sin^{-1}$(1/(2*F number)). Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

In Equations 14-1 and 14-2, each equation may be independent or a plurality of equations may be combined with each other.

When the optical system is applied to the mobile display device such as the smartphone, the average angle of $\theta_h$ may be 34°.

Equation 14-1 is an equation for defining a distance $h_1$' spaced apart from the optical axis OA in the positive and negative directions of the second axis, and Equation 14-2 may refer to a distance $h_1$ that is set in consideration of a process error at the distance $h_1$' calculated by Equation 14-1.

That is, the distance h1' calculated by Equation 14-1 may be a theoretical value, and the distance $h_1$ calculated by Equation 14-2 may be a design value in consideration of tolerance.

The distance $h_1$ spaced apart from the optical axis OA in the positive and negative directions of the second axis AX2 may be set by Equations 14-1 and 14-2. Accordingly, the second coordinates C2 of (0,$h_1$) and (0,−$h_1$) may be set on the second axis AX2 by Equations 14-1 and 14-2.

In addition, a plurality of third coordinates C3 and a plurality of fourth coordinates C4 defined by Equations 15-1 and 15-2 below may be set on the third axis AX3 and the fourth axis AX4.

$$d_1': D - t_1 * \tan(\theta_d - \alpha) \quad \text{[Equation 15-1]}$$

$$h_1' < v_1' < d_1'$$

$$|d_1'|^2 = |x_1'|^2 + |y_1'|^2$$

$$0.7*d_1' < d_1 < 1.3*d_1' \quad \text{[Equation 15-2]}$$

$$h_1 < v_1 < d_1$$

$$|d_1|^2 = |x_1|^2 + |y_1|^2$$

(In Equation 15-1, $d_1$' is a diagonal distance extending from the optical axis in third and fourth axis directions, D is a half of a diagonal length of the image sensor unit, $t_1$ is a distance from the eleventh surface S11 to the image sensor unit, $\theta_d$ is the chief ray angle in the 1.0 field of the image sensor unit, and $\alpha$ is $\sin^{-1}$(1/(2*F number)). Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

In Equations 15-1 and 15-2, each equation may be independent or a plurality of equations may be combined with each other.

When the optical system is applied to the mobile display device such as the smartphone, an average angle of $\theta_d$ may be 32°.

Equation 15-1 is an equation for defining a distance $d_1$' spaced apart from the optical axis OA in positive and negative directions of the third and fourth axes, and Equation 15-2 may refer to a distance $d_1$ that is set in consideration of a process error at the distance d1' calculated by Equation 15-1.

That is, the distance $d_1$' calculated by Equation 15-1 may be a theoretical value, and the distance $d_1$ calculated by Equation 15-2 may be a design value in consideration of tolerance.

The value of $d_1$ defined by Equations 15-1 and 15-2 may be defined as a distance from the optical axis to the coordinates of the third axis AX3 and the fourth axis AX4.

Accordingly, a third coordinate C3 of ($x_1$, $y_1$) and a third coordinate C3 of (−$x_1$, −$y_1$) spaced apart by the distance $d_1$ from the optical axis OA in the third axis AX3 direction may be set on the third axis, and a fourth coordinate C4 of (−$x_1$, $y_1$) and a fourth coordinate C4 of ($x_1$, −$y_1$) spaced apart by a distance $d_1$ from the optical axis OA in the fourth axis AX4 direction may be set on the fourth axis.

A distance from the third coordinate C3 to the optical axis and a distance from the fourth coordinate C4 to the optical axis may be half of a distance of the effective region of the eleventh surface S11 of the sixth lens on the third axis AX3 and the fourth axis AX4. In detail, the distance from the third coordinate C3 to the optical axis and the distance from the fourth coordinate C4 to the optical axis may be an effective diameter of the eleventh surface S11 of the sixth lens.

For example, the distance from the third coordinate C3 to the optical axis and the distance from the fourth coordinate C4 to the optical axis may be 2.0 mm to 2.7 mm. In detail, the distance from the third coordinate C3 to the optical axis and the distance from the fourth coordinate C4 to the optical axis may be 2.3 mm to 2.7 mm.

Accordingly, the first coordinate may be a coordinate (±$v_1$,0) between the (±$d_1$,0) coordinates of the optical axis and the first axis on the eleventh surface S11 of the sixth lens 160.

In addition, the second coordinate may be a coordinate (0,±$h_1$) between the (0,±$d_1$) coordinates of the optical axis and the second axis on the eleventh surface S11 of the sixth lens 160.

A value of the v1 defined by Equations 13-1 and 13-2 may be 40% to 80% of a value of the $d_1$ defined by Equations 15-1 and 15-2. That is, a distance from the optical axis to the $v_1$ in the first axis direction may be 40% to 80% of a distance from the optical axis to the $d_1$.

In addition, a value of the $h_1$ defined by Equations 14-1 and 14-2 may be 40% to 80% of the value of the $d_1$ defined by Equations 15-1 and 15-2. That is, a distance from the optical axis to the $h_1$ in the second axis direction may be 40% to 80% of the distance from the optical axis to the $d_1$.

The first effective surface AS1 of the first effective region AA1 of the sixth lens 160 may be formed by the first coordinates C1, the second coordinates C2, the third coordinates C3, and the fourth coordinates C4. In detail, the first effective surface AS1 may be defined as an inner region of a line connecting the first coordinates C1, the second coordinates C2, the third coordinates C3, and the fourth coordinates C4.

The eleventh surface S11 of the first effective region AA1 may have a sag value defined as a distance from a vertex of the eleventh surface S11 to a curved surface.

In detail, the eleventh surface S11 of the first effective region AA1 may have a sag value set by Equation 2.

When an angle between the optical axis OA and the first axis AX1 is defined as 0° and 180°, and an angle between the optical axis OA and the second axis AX2 is defined as 90° and 270°, the sag value in the first effective region AA1 may be changed according to a distance and an angle from each axis.

For example, a first sag value may be defined in the first axis AX1 defined as 0° and 180°. The first sag value may change according to a change in the coordinates of the first axis AX1 at 0° and 180°.

In detail, when the coordinate of the optical axis is defined as (0,0), a size of the |first sag value| may increase while the first sag value moves from the (0,0) coordinate to the $(d_1,0)$ coordinate, and the size of the |first sag value| may increase while moving from the (0,0) coordinate to the $(-d_1,0)$ coordinate.

That is, the first sag value on the first axis AX1 may gradually increase while moving away from the optical axis. That is, the first sag value on the first axis AX1 may be gradually increased while moving away from the optical axis both inside and outside the first effective surface AS1.

In addition, the sixth lens 160 may have a first sag value that is horizontally symmetrical based on the first axis AX1 direction.

In detail, the eleventh surface S11 of the sixth lens 160 may be changed while having a size in which the first sag value from the (0,0) coordinate to the $(d_1,0)$ coordinate of the first axis AX1 and the first sag value from the (0,0) coordinate to the $(-d_1,0)$ coordinate correspond to each other.

Accordingly, the eleventh surface S11 of the sixth lens 160 has the first sag value that is horizontally symmetrical based on the first axis AX1, and accordingly, the eleventh surface S11 of the sixth lens 160 may be formed in a shape and a change in shape of a curved surface defined by the first sag value that is horizontally symmetrical based on the first axis AX1.

In addition, sag values inside and outside the first effective surface AS1 may be different from each other. In detail, a first sag value outside the first effective surface AS1 may be greater than a first sag value inside the first effective surface AS1.

In addition, the second sag value may be defined on the second axis AX2 defined as 90° and 270°. The second sag value may change according to a change in the coordinates of the second axis AX2 at 90° and 270°.

In detail, when the coordinate of the optical axis is defined as (0,0), a size of the |second sag value| may increase while the second sag value moves from the (0,0) coordinate to the $(0,d_1)$ coordinate, and the size of the |second sag value| may increase while moving from the (0,0) coordinate to the $(0,-d_1)$ coordinate.

That is, the second sag value on the second axis AX2 may gradually increase while moving away from the optical axis. That is, the second sag value on the second axis AX2 may be gradually increased while moving away from the optical axis both inside and outside the first effective surface AS1.

In addition, the sixth lens 160 may have a second sag value that is vertically symmetrical based on the second axis AX2 direction.

In detail, the eleventh surface S11 of the sixth lens 160 may be changed while having a size in which the second sag value from the (0,0) coordinate to the $(0,d_1)$ coordinate of the second axis AX2 and the second sag value from the (0,0) coordinate to the $(0,-d_1)$ coordinate correspond to each other.

Accordingly, the eleventh surface S11 of the sixth lens 160 has the second sag value that is vertically symmetrical based on the second axis AX2, and accordingly, the eleventh surface S11 of the sixth lens 160 may be formed in a shape and a change in shape of a curved surface defined by the second sag value that is vertically symmetrical based on the second axis AX2.

In addition, the sag values inside and outside the first effective surface AS1 may be different from each other. In detail, a second sag value outside the first effective surface AS1 may be greater than a second sag value inside the first effective surface AS1.

In addition, a third sag value and a fourth sag value may be defined on the third axis AX3 and the fourth axis AX4 between the first axis AX1 and the second axis AX2, respectively.

The third sag value may change according to a change in the coordinates of the third axis AX3.

In detail, when the coordinates of the optical axis are defined as (0,0), a size of the |third sag value| may increase while the third sag value moves from the (0,0) coordinate to the $(x_1,y_1)$ coordinate, and the size of the |third sag value| may increase while moving from the (0,0) coordinate to the $(-x_1,-y_1)$ coordinate. That is, all of the third sag values on the third axis AX3 are sag values inside the first effective surface AS1 and may gradually increase while moving away from the optical axis.

In addition, the sixth lens 160 may have a third sag value that is symmetrical based on the third axis AX3 direction.

In detail, the eleventh surface S11 of the sixth lens 160 may be changed while having a size in which the third sag value from the (0,0) coordinate to the $(x_1,y_1)$ coordinate of the third axis AX3 and the third sag value from the (0,0) coordinate to the $(-x_1,-y_1)$ coordinate correspond to each other.

Accordingly, the eleventh surface S11 of the sixth lens 160 has the third sag value that is symmetrical based on the third axis AX3, and accordingly, the eleventh surface S11 of the sixth lens 160 may be formed in a shape and a change in shape of a curved surface defined by the third sag value that is symmetrical based on the third axis AX3.

In addition, the fourth sag value may change according to a change in the coordinates of the fourth axis AX4.

In detail, when the coordinates of the optical axis are defined as (0,0), a size of the |fourth sag value| may increase while the fourth sag value moves from the (0,0) coordinate to the $(-x_1,y_1)$ coordinate, and the size of the |fourth sag value| may increase while moving from the (0,0) coordinate to the $(x_1,-y_1)$ coordinate. That is, all of the fourth sag values on the fourth axis AX4 are sag values inside the first effective surface AS1 and may gradually increase while moving away from the optical axis.

In addition, the sixth lens 160 may have a fourth sag value that is symmetrical based on the fourth axis AX4 direction.

In detail, the eleventh surface S11 of the sixth lens 160 may be changed while having a size in which the fourth sag value from the (0,0) coordinate to the $(-x_1,y_1)$ coordinate of the fourth axis AX4 and the fourth sag value the (0,0) coordinate to the $(x_1,-y_1)$ coordinate correspond to each other.

Accordingly, the eleventh surface S11 of the sixth lens 160 has the fourth sag value that is symmetrical based on the fourth axis AX4, and accordingly, the eleventh surface S11 of the sixth lens 160 may be formed in a shape and a change in shape of a curved surface defined by the fourth sag value that is symmetrical based on the fourth axis AX4.

In addition, the |first sag value| and the |second sag value| at the first coordinate and the second coordinate spaced apart from the optical axis by the same distance may be different from each other. In detail, the |second sag value| may be greater or less than the |first sag value| at the first coordinate and the second coordinate spaced apart from the optical axis by the same distance.

In detail, the |first sag value| may be greater than the |second sag value| from a distance spaced apart from the optical axis by |Amm| or more to the $(\pm d_1,0)$, $(0,\pm d_1)$ coordinates. In other words, the first sag value| between the (A,0) coordinates and the $(d_1,0)$ coordinates and between the (−A,0) coordinates and the $(-d_1,0)$ coordinates| may be greater than the |second sag value between the (0,A) coordinates and the $(0,d_1)$ coordinates and between the (0,−A) coordinates and the $(0,-d_1)$ coordinates.

In addition, the |first sag value| may be smaller than the |second sag value| from a distance spaced apart from the optical axis by less than |Amm| to the coordinates. In other words, the |first sag value| between the (0,0) coordinates and the (±A,0) coordinates may be smaller than the second sag value| between the (0,0) coordinates and the (0,±A) coordinates.

In this case, the A may satisfy $2.1 \le A \le 2.3$.

In addition, |second sag value−first sag value|, which is a difference between the second sag value and the first sag value, may differ according to a distance from the optical axis. Here, the |second sag value−first sag value| is defined as a difference in sag value when the first axis value of the first coordinate and the second axis value of the second coordinate have the same value. That is, a distance from the optical axis to the first coordinate may be the same as a distance from the optical axis to the second coordinate.

The |second sag value−first sag value| may increase as the distance from the optical axis increases. In detail, the |second sag value−the first sag value| may gradually increase as the distance from the optical axis increases. In more detail, at a distance spaced apart from the optical axis by less than |Amm|, the |second sag value−first sag value| may gradually increase as the distance from the optical axis increases.

In addition, at a distance spaced apart from the optical axis by |Amm| or more, the |second sag value−first sag value| may include a section in which the distance from the optical axis is gradually decreased as the distance from the optical axis increases.

The |second sag value−first sag value| may have a first average deviation defined as a deviation between the second sag value from the (0,0) coordinate to the $(0,h_1)$ coordinate and the first sag value from the (0,0) coordinate to the $(h_1,0)$ coordinate and a second average deviation defined as a deviation between the second sag value from the $(0,h_1)$ coordinate to the $(0,d_1)$ coordinate and the first sag value from the $(h_1,0)$ coordinate to the $(d_1,0)$ coordinate.

In this case, the first average deviation and the second average deviation may be defined as a sum of |second sag value−first sag value|/n in n coordinates.

The first average deviation and the second average deviation may be different. In detail, the second average deviation may be greater than the first average deviation.

That is, an average deviation of the |second sag value−first sag value| at a distance from the second coordinate to the effective diameter may be greater than an average deviation of the |second sag value−first sag value| at a distance from the optical axis to the second coordinate.

In addition, the |second sag value−the first sag value| may have a third average deviation defined as a deviation between the second sag value from the (0,0) coordinate to the $(0,v_1)$ coordinate and the first sag value from the (0,0) coordinate to the $(0,d_1)$ coordinate and a fourth average deviation defined as a deviation between the second sag value from the $(v_1,0)$ coordinate to the $(d_1,0)$ coordinate and the first sag value from the $(v_1,0)$ coordinate to the $(d_1,0)$ coordinate.

In this case, the third average deviation and the fourth average deviation may be defined as a sum of |second sag value−first sag value|/n in n coordinates.

The third average deviation and the fourth average deviation may be different. In detail, the fourth average deviation may be greater than the third average deviation.

That is, an average deviation of the |second sag value−first sag value| at a distance from the first coordinate to the effective diameter may be greater than an average deviation of the |second sag value−first sag value| at a distance from the optical axis to the first coordinate.

In addition, the |second sag value−first sag value|, which is a difference between the second sag value from the (0,0) coordinate to the (0,E) coordinate and the first sag value from the (0,0) coordinate to the (E,0) coordinate, may be 8 μm or more.

In this case, the E may satisfy $0.7{*}v1 \le |E|$.

That is, the |second sag value−first sag value| may be 7 μm or more in the first coordinate C1 and a region adjacent to the first coordinate.

In addition, the |second sag value−first sag value|, which is a difference between the second sag value from the (0,0) coordinate to the (0,F) coordinate and the first sag value from the (0,0) coordinate to the (F,0) coordinate, may be 2 μm or more.

In this case, the F may satisfy $0.7{*}h_1 \le |F|$.

That is, the |second sag value−the first sag value| may be 2 μm or more in the second coordinate C2 and a region adjacent to the second coordinate.

In addition, a deviation of the sag value inside the first effective surface AS1 and a deviation of the sag value outside the first effective surface AS1 may be different.

In detail, when defining the |second sag value−first sag value| which is a difference between the second sag value at the coordinates of the second axis AX2 and the first sag value at the coordinates of the first axis AX1 that are spaced apart from the optical axis OA by the same distance, an average deviation of the |second sag value−first sag value| inside the first effective surface AS1 may be smaller than an average deviation of the |second sag value−first sag value| outside the first effective surface AS1.

That is, a change amount of the sag values inside the first effective surface AS1 may be smaller than a change amount of the sag values outside the first effective surface AS1.

Meanwhile, |third sag value| and |fourth sag value| of the third coordinate and the fourth coordinate spaced apart from the optical axis by the same distance may be equal to each other. In detail, the |third sag value| of the third coordinate and the |fourth sag value| of the fourth coordinate spaced apart from the optical axis by the same distance may have sizes corresponding to each other. In more detail, a difference between the |third sag value| and the |fourth sag value| at the third coordinate and the fourth coordinate spaced apart from the optical axis by the same distance may be 0 or close to 0.

That is, the first sag value of the first axis AX1 and the second sag value of the second axis AX2 may be different from each other, and the third sag value of the third axis AX3 and the fourth sag value of the fourth axis AX4 may be the same as or similar to each other.

Figure 12:
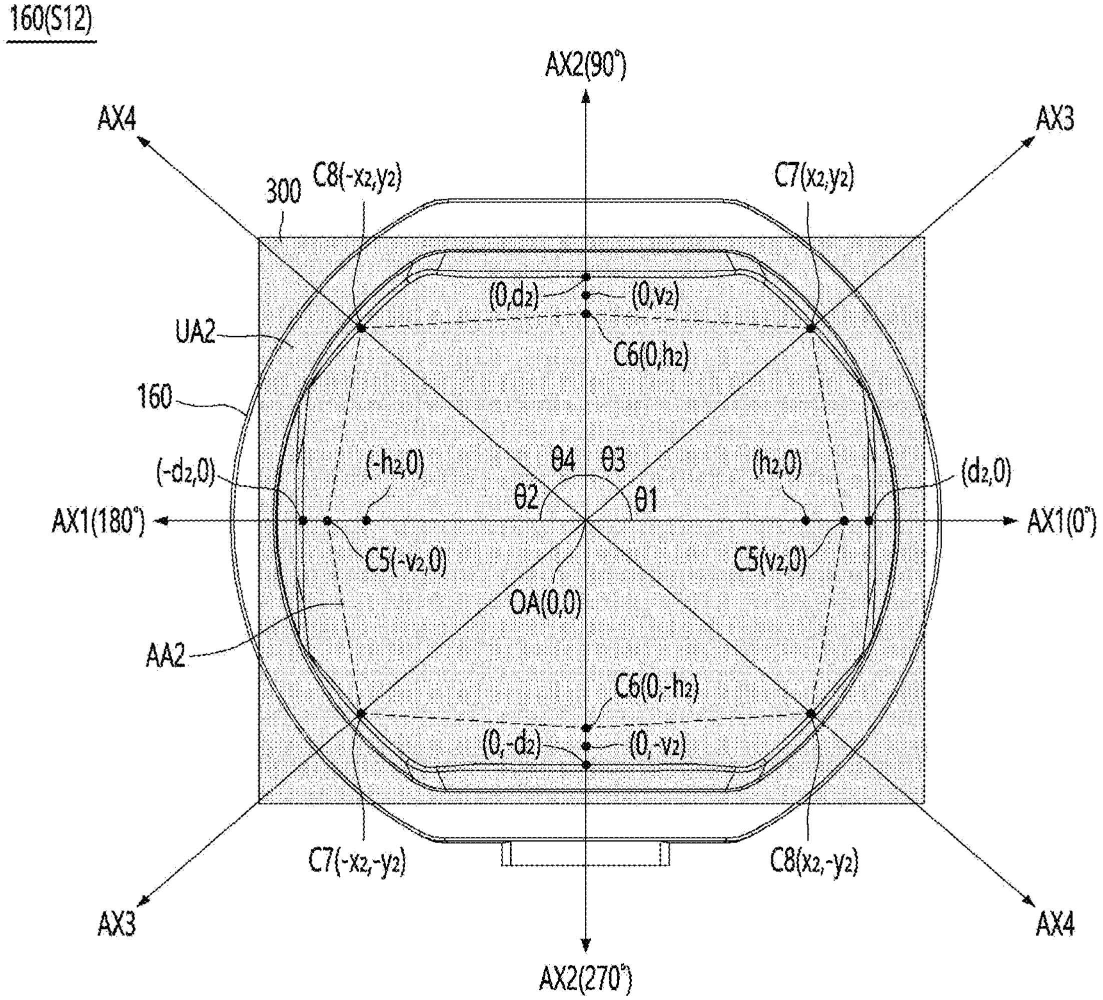
FIG. 12 is a view for describing a sag value at a sensor-side surface of the sixth lens of the optical system according to the third embodiment.

Referring to FIG. 12, a second effective surface AS2 may be defined in the second effective region AA2 of the twelfth surface S12 of the sixth lens 160. In detail, the second effective surface AS2 set by coordinates defined by the following equations may be set on the twelfth surface S12 of the sixth lens 160. The second effective surface AS2 may be defined as a region where light is refracted in the second effective region AA2 of the twelfth surface S12 of the sixth lens 160 to realize the optical characteristics.

Referring to FIG. 12, a virtual axis for setting the coordinates of the twelfth surface S12 may be set on the twelfth surface S12 of the sixth lens 160.

In detail, virtual axes of a first axis AX1, a second axis AX2, a third axis AX3, and a fourth axis AX4 may be set on the twelfth surface S12 of the sixth lens 160. The first axis AX1 may be defined as the direction parallel to the major axis of the image sensor unit 300. That is, the first axis AX1 may be defined as the axis passing through the optical axis OA and extending in the direction parallel to the major axis of the image sensor unit 300.

In addition, the second axis AX2 may be defined as the direction parallel to the minor axis of the image sensor unit 300. That is, the second axis AX2 may be defined as the axis passing through the optical axis OA and extending in the direction parallel to the minor axis of the image sensor unit 300.

In addition, the third axis AX3 and the fourth axis AX4 may be defined as a direction parallel to a diagonal length direction of the image sensor unit 300. That is, the third axis AX2 and the fourth axis AX4 may be defined as axes passing through the optical axis OA and extending in a direction parallel to a diagonal of the image sensor unit 300.

For example, the first axis AX1 may be defined as the X axis, the second axis AX2 may be defined as the Y axis, and the third axis AX3 and the fourth axis AX4 may be defined as an X-Y axis.

The first axis AX1 and the second axis AX2 may be perpendicular to each other. That is, the first axis AX1 and the second axis AX2 may be perpendicular to each other on the optical axis OA. Accordingly, the first axis AX1 may be perpendicular to the optical axis OA. In addition, the second axis AX2 may be perpendicular to the optical axis OA. That is, the optical axis OA, the first axis AX1, and the second axis AX2 may be perpendicular to each other.

In addition, the third axis AX3 and the fourth axis AX4 may not be perpendicular to the first axis AX1. In addition, the third axis AX3 and the fourth axis AX4 may not be perpendicular to the second axis AX2. In addition, the third axis AX3 and the fourth axis AX4 may not be perpendicular to the optical axis OA. That is, the third axis AX3 and the fourth axis AX4 may not be perpendicular to the first axis AX1, the second axis AX2, and the optical axis OA.

In addition, the third axis AX3 and the fourth axis AX4 may not be perpendicular to each other. That is, the third axis AX3 and the fourth axis AX4 may not be perpendicular to each other on the optical axis OA.

In addition, a first angle θ1 between the first axis AX1 and the third axis AX3 and a second angle θ2 between the first axis AX1 and the fourth axis AX4 may be the same in a tolerance range. In addition, a third angle θ3 between the second axis AX2 and the third axis AX3 and a fourth angle θ4 between the second axis AX2 and the fourth axis AX4 may be the same within the tolerance range. For example, the first angle θ1 between the first axis AX1 and the third axis AX3 and the second angle θ2 between the first axis AX1 and the fourth axis AX4 may have an interior angle of 35° to 40°.

A plurality of coordinates for defining the second effective surface AS2 set by the coordinates that are respectively set on the twelfth surface S12 of the sixth lens 160, the first axis AX1, the second axis AX2, the third axis AX3, and the fourth axis AX4 may be set on the twelfth surface S12 of the sixth lens 160.

In detail, fifth coordinates C5 defined by Equations 16-1 and 16-2 below may be set on the first axis AX1.

$$v_2' = V - t_2 * \tan(\theta_v - \alpha) \quad \text{[Equation 16-1]}$$

$$0.7 * v_2' < v_2 < 1.3 * v_2' \quad \text{[Equation 16-2]}$$

(In Equation 16-1, $v_2'$ is a distance spaced apart from the optical axis in the negative or positive direction of the first axis, V is a half of the major axis of the image sensor unit, $t_2$ is a distance from the twelfth surface S12 to the image sensor unit, $\theta_v$ is the chief ray angle in the 0.8 field of the image sensor unit, and α is $\sin^{-1}(1/(2^*F \text{ number}))$. Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

When the optical system is applied to the mobile display device such as the smartphone, an average angle of $\theta_v$ may be 35°.

Equation 16-1 is an equation for defining a distance $v_2'$ spaced apart from the optical axis OA in the positive and negative directions of the first axis, and Equation 16-2 may refer to a distance $v_2$ that is set in consideration of a process error at the distance $v_2'$ calculated by Equation 16-1.

That is, the distance $v_2'$ calculated by Equation 16-1 may be a theoretical value, and the distance $v_2$calculated by Equation 16-2 may be a design value in consideration of tolerance.

The distance $v_2$ spaced apart from the optical axis OA in the positive and negative directions of the first axis may be set by Equations 16-1 and 16-2. Accordingly, the fifth coordinates C5 of ($v_2$.0) and ($-v_2$,0) may be set on the first axis AX1 by Equations 16-1 and 16-.

In addition, sixth coordinates C6 defined by Equations 17-1 and 17-2 below may be set on the second axis AX2.

$$h_2': H - t_2 * \tan(\theta_h - \alpha), \quad \text{[Equation 17-1]}$$

$$h_2' < v_2'$$

$$0.7 * h_2' < h_2 < 1.3 * h_2' \quad \text{[Equation 17-2]}$$

$$h_2 < v_2$$

(In Equation 17-1, $h_2'$ is a distance spaced apart from the optical axis in the negative or positive direction of the first axis, H is a half of the minor axis of the image sensor unit, $t_2$ is a distance from the twelfth surface S12 to the image sensor unit, θh is the chief ray angle in the 0.6 field of the image sensor unit, and α is $\sin^{-1}(1/(2^*F \text{ number}))$. Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

In Equations 17-1 and 17-2, each equation may be independent or a plurality of equations may be combined with each other.

When the optical system is applied to the mobile display device such as the smartphone, the average angle of $\theta_h$ may be 34°.

Equation 17-1 is an equation for defining a distance $h_2'$ spaced apart from the optical axis OA in the positive and negative directions of the second axis, and Equation 17-2 may refer to a distance $h_2$that is set in consideration of the process error at the distance $h_2'$ calculated by Equation 17-1.

That is, the distance $h_2'$ calculated by Equation 17-1 may be a theoretical value, and the distance $h_2$ calculated by Equation 17-2 may be a design value in consideration of tolerance.

The distance $h_2$spaced apart from the optical axis OA in the positive and negative directions of the second axis AX2 may be set by Equations 17-1 and 17-2. Accordingly, the sixth coordinate C6 of $(0.h_2)$ and $(0,-h_2)$ may be set on the second axis AX2 by Equations 17-1 and 17-2.

In addition, a plurality of seventh coordinates C7 and a plurality of eighth coordinates C8 defined by Equations 18-1 and 18-2 below may be set on the third axis AX3 and the fourth axis AX4.

$$d_2': D - t_2 * \tan(\theta_d - \alpha), \quad \text{[Equation 18-1]}$$

$$h_2' < v_2' < d_2'$$

$$|d_2'|^2 = |x_2'|^2 + |y_2'|^2$$

$$0.7 * d_2' < d_2 < 1.3 * d_2' \quad \text{[Equation 18-1]}$$

$$h_2 < v_2 < d_2$$

$$|d_2|^2 = |x_2|^2 + |y_2|^2$$

(In Equation 18-1, $d_2$ is a diagonal distance extending from the optical axis in the third and fourth axis directions, D is a half of the diagonal length of the image sensor unit, $t_2$ is a distance from the eleventh surface S11 to the image sensor unit, $\theta_d$ is the chief ray angle in the 1.0 field of the image sensor unit, and α is $\sin^{-1}(1/(2*F\ number))$. Here, when the center of the image sensor unit is set to 0 field and half of the diagonal length from the center of the image sensor unit to the corner is set to 1.0 field, the field of the image sensor unit may be defined as a relative distance from the center of the image sensor unit to any point of the diagonal length.)

In Equations 18-1 and 18-2, each equation may be independent, or a plurality of equations may be combined with each other.

When the optical system is applied to the mobile display device such as the smartphone, the average angle of $\theta_d$ may be 32°.

Equation 18-1 is an equation for defining a distance $d_2'$ spaced apart from the optical axis OA in the positive and negative directions of the third and fourth axes, and Equation 18-2 may refer to a distance $d_2$ that is set in consideration of a process error at the distance $d_2'$ calculated by Equation 18-1.

The value of $d_2$ defined by Equations 18-1 and 18-2 may be defined as a distance from the optical axis to the coordinates of the third axis AX3 and the fourth axis AX4.

Accordingly, a seventh coordinate C7 of $(x_2, y_2)$ and a seventh coordinate C7 of $(-x_2, -y_2)$ spaced apart by the distance d2 from the optical axis OA in the third axis AX3 direction may be set on the third axis, and an eighth coordinate C8 of $(-x_2, y_2)$, and an eighth coordinate C8 of $(x_2, -y_2)$ spaced apart by the distance d2 from the optical axis OA in the fourth axis AX4 direction may be set on the fourth axis.

A distance from the seventh coordinate C7 to the optical axis and a distance from the eighth coordinate C8 to the optical axis may be half of a distance of the effective region of the twelfth surface S12 of the sixth lens. In detail, the distance from the seventh coordinate C7 to the optical axis and the distance from the eighth coordinate C8 to the optical axis may be an effective diameter of the twelfth surface S12 of the sixth lens.

For example, the distance from the seventh coordinate C7 to the optical axis and the distance from the eighth coordinate C8 to the optical axis may be 2.55 mm to 2.95 mm.

Accordingly, the fifth coordinate may be a coordinate $(\pm v_2,0)$ between the $(\pm d_2,0)$ coordinates of the optical axis and the first axis on the twelfth surface S12 of the sixth lens 160.

In addition, the sixth coordinate may be a coordinate $(0,\pm h_2)$ between the $(0,\pm d_2)$ coordinates of the optical axis and the second axis on the twelfth surface S12 of the sixth lens 160.

A value of the v2 defined by Equations 16-1 and 16-2 may be 40% to 80% of a value of the $d_2$ defined by Equations 18-1 and 18-2. That is, a distance from the optical axis to the $v_2$ in the first axis direction may be 40% to 80% of a distance from the optical axis to the $d_2$.

In addition, a value of the $h_2$ defined by Equations 17-1 and 17-2 may be 40% to 80% of the value of the $d_2$ defined by Equations 18-1 and 18-2. That is, a distance from the optical axis to the $h_2$ in the second axis direction may be 40% to 80% of the distance from the optical axis to the $d_2$.

The second effective surface AS2 of the first effective region AA1 of the sixth lens 160 may be formed by the fifth coordinate C5, the sixth coordinate C6, the seventh coordinate C7, and the eighth coordinate C8. In detail, the second effective surface AS2 may be defined as an inner region of a line connecting the fifth coordinate C5, the sixth coordinate C6, the seventh coordinate C7, and the eighth coordinate C8.

A size of the first effective surface AS2 and the second effective surface AS2 may be different. In detail, an area of the first effective surface AS2 and an area of the second effective surface AS2 may be different. For example, the area of the second effective surface AS2 may be larger than the area of the first effective surface AS2.

The twelfth surface S12 of the second effective region AA2 may have a sag value defined as a distance from a vertex of the twelfth surface S12 to a curved surface.

In detail, the twelfth surface S12 of the second effective region AA2 may have a sag value set by Equation 2.

When an angle between the optical axis OA and the first axis AX1 is defined as 0° and 180°, and an angle between the optical axis OA and the second axis AX2 is defined as 90° and 270°, the sag value in the second effective region AA2 may be changed according to a distance and an angle from each axis.

For example, a fifth sag value may be defined in the first axis AX1 defined as 0° and 180°. The fifth sag value may change according to a change in the coordinates of the first axis AX1 at 0° and 180°.

In detail, when the coordinates of the optical axis are defined as (0,0), a size of the |fifth sag value| may increase while the fifth sag value moves from the (0,0) coordinate to the $(d_2,0)$ coordinate, and the size of the |fifth sag value| may increase while moving from the (0,0) coordinate to the $(-d_2,0)$ coordinate.

That is, the fifth sag value on the first axis AX1 may gradually increase while moving away from the optical axis. That is, the fifth sag value in the first axis AX1 may be gradually increased while moving away from the optical axis both inside and outside the second effective surface AS2.

In addition, the sixth lens 160 may have a fifth sag value that is horizontally symmetrical based on the first axis AX1 direction.

In detail, the twelfth surface S12 of the sixth lens 160 may be changed while having a size in which the fifth sag value from the (0,0) coordinate to the $(d_2,0)$ coordinate of the first axis AX1 and the fifth sag value from the (0,0) coordinate to the $(-d_2,0)$ coordinate correspond to each other.

Accordingly, the twelfth surface S12 of the sixth lens 160 has the fifth sag value that is horizontally symmetrical based on the first axis AX1, and accordingly, the twelfth surface S12 of the sixth lens 160 may be formed in a shape and a change in shape of a curved surface defined by the fifth sag value that is horizontally symmetrical based on the first axis AX1.

In addition, sag values inside and outside the second effective surface AS2 may be different from each other. In detail, a fifth sag value outside the second effective surface AS2 may be greater than a fifth sag value inside the second effective surface AS2.

In addition, the sixth sag value may be defined on the second axis AX2 defined as 90° and 270°. The sixth sag value may change according to a change in the coordinates of the second axis AX2 at 90° and 270°.

In detail, when the coordinates of the optical axis are defined as (0,0), a size of the |6th sag value| may increase while the sixth sag value moves from the (0,0) coordinate to the $(0,d_2)$ coordinate, and the size of the |sixth sag value| may increase while moving from the (0,0) coordinate to the $(0,-d_2)$ coordinate.

That is, the sixth sag value on the second axis AX2 may gradually increase while moving away from the optical axis. That is, the sixth sag value on the second axis AX2 may be gradually increased while moving away from the optical axis both inside and outside the second effective surface AS2.

In addition, the sixth lens 160 may have a sixth sag value that is vertically symmetrical based on the second axis AX2 direction.

In detail, the twelfth surface S12 of the sixth lens 160 may be changed while having a size in which the sixth sag value from the (0,0) coordinate to the $(0,d_2)$ coordinate of the second axis AX2 and the sixth sag value from the (0,0) coordinate to the $(0,-d_2)$ coordinate correspond to each other.

Accordingly, the twelfth surface S12 of the sixth lens 160 has the sixth sag value that is vertically symmetrical based on the second axis AX2, and accordingly, the twelfth surface S12 of the sixth lens 160 may be in a shape and a change in shape of a curved surface defined by the sixth sag value that is vertically symmetrical based on the second axis AX2.

In addition, the sag values inside and outside the second effective surface AS2 may be different from each other. In detail, a sixth sag value outside the second effective surface AS2 may be greater than a sixth sag value inside the second effective surface AS2.

In addition, a seventh sag value and an eighth sag value may be defined on the third axis AX3 and the fourth axis AX4 between the first axis AX1 and the second axis AX2, respectively.

The seventh sag value may change according to a change in the coordinates of the third axis AX3.

In detail, when the coordinates of the optical axis are defined as (0,0), a size of the |seventh sag value| may increase while the seventh sag value moves from the (0,0) coordinate to the $(x_2,y_2)$ coordinate, and the size of the |seventh sag value| may increase while moving from the (0,0) coordinate to the $(-x_2,-y_2)$ coordinate. That is, all of the seventh sag values on the third axis AX3 are sag values inside the second effective surface AS2 and may gradually increase while moving away from the optical axis.

In addition, the sixth lens 160 may have a seventh sag value that is symmetrical based on the third axis AX3 direction.

In detail, the twelfth surface S12 of the sixth lens 160 may be changed while having a size in which the seventh sag value from the (0,0) coordinate to the $(x_2,y_2)$ coordinate of the third axis AX3 and the seventh sag value from (0,0) coordinate to $(-x_2,-y_2)$ coordinate correspond to each other.

Accordingly, the twelfth surface S12 of the sixth lens 160 has the seventh sag value that is symmetrical based on the third axis AX3, and accordingly, the twelfth surface S12 of the sixth lens 160 may be formed in a shape and a change in shape of a curved surface defined by the seventh sag value that is symmetrical based on the third axis AX3.

In addition, the eighth sag value may change according to a change in the coordinates of the fourth axis AX4.

In detail, when the coordinates of the optical axis are defined as (0,0), a size of the |eighth sag value| may increase while the eighth sag value moves from the (0,0) coordinate to the $(-x_2,y_2)$ coordinate, and the size of the |eighth sag value| may increase while moving from the (0,0) coordinate to the $(x_2,-y_2)$ coordinate. That is, all of the eighth sag values on the fourth axis AX4 are sag values inside the second effective surface AS2 and may gradually increase while moving away from the optical axis.

In addition, the sixth lens 160 may have an eighth sag value that is symmetrical based on the fourth axis AX4 direction.

In detail, the twelfth surface S12 of the sixth lens 160 may be changed while having a size in which the eighth sag value from the (0,0) coordinate to the $(-x_2,y_2)$ coordinate of the fourth axis AX4 and the eighth sag value from the (0,0) coordinate to the $(x_2,-y_2)$ coordinate correspond to each other.

Accordingly, the twelfth surface S12 of the sixth lens 160 has the eighth sag value that is symmetrical based on the fourth axis AX4, and accordingly, the twelfth surface S12 of the sixth lens 160 160 may be formed in a shape and a change in shape of a curved surface defined by the eighth sag value that is symmetrical based on the fourth axis AX4.

In addition, the |fifth sag value| and the |sixth sag value| at the fifth coordinate and the sixth coordinate spaced apart from the optical axis by the same distance may be different from each other. In detail, the |sixth sag value| may be greater or less than the |fifth sag value| at the fifth coordinate and the sixth coordinate spaced apart from the optical axis by the same distance.

In addition, |sixth sag value−fifth sag value|, which is a difference between the sixth sag value and the fifth sag value, may differ according to a distance from the optical axis. Here, the |sixth sag value−fifth sag value| is defined as a difference in sag value when the first axis value of the fifth coordinate and the second axis value of the sixth coordinate have the same value. That is, a distance from the optical axis to the fifth coordinate may be the same as a distance from the optical axis to the sixth coordinate.

The |sixth sag value−the fifth sag value| may increase as the distance from the optical axis increases. In detail, the |sixth sag value−the fifth sag value| may gradually increase as the distance from the optical axis increases.

The |sixth sag value−the fifth sag value| may have a fifth average deviation defined as a deviation between the sixth sag value from the (0,0) coordinate to the $(0,h_2)$ coordinate and the fifth sag value from the (0,0) coordinate to the $(h_2,0)$ and a sixth average deviation defined as a deviation between the sixth sag value from the $(0,h_2)$ coordinate to the $(0,d_2)$ coordinate and the fifth sag value from the $(h_2,0)$ coordinate to the $(d_2,0)$ coordinate.

In this case, the fifth average deviation and the sixth average deviation may be defined as a sum of |second sag value−first sag value|/n in n coordinates.

The fifth average deviation and the sixth average deviation may be different. In detail, the sixth average deviation may be greater than the fifth average deviation.

That is, an average deviation of the |sixth sag value−fifth sag value| at the distance from the second coordinate to the effective diameter may be greater than an average deviation of the |sixth sag value−fifth sag value| at the distance from the optical axis to the sixth coordinate.

In addition, the |sixth sag value−the fifth sag value| may have a seventh average deviation defined as a deviation between the sixth sag value from the (0,0) coordinate to the $(0,v_2)$ coordinate and the fifth sag value from the (0,0) coordinate to the $(v_2,0)$ coordinate and an eighth average deviation defined as a deviation between the sixth sag value from the $(0,v_2)$ coordinate to the $(0,d_2)$ coordinate and the fifth sag value from the $(v_2,0)$ coordinate to the $(d_2,0)$ coordinate.

In this case, the seventh average deviation and the eighth average deviation may be defined as a sum of |second sag value−first sag value|/n in n coordinates.

The seventh average deviation and the eighth average deviation may be different. In detail, the seventh average deviation may be greater than the eighth average deviation.

That is, an average deviation of the |sixth sag value−fifth sag value| at a distance from the fifth coordinate to the effective diameter may be greater than an average deviation of the |sixth sag value−fifth sag value| at a distance from the optical axis to the fifth coordinate.

In addition, the |sixth sag value−fifth sag value|, which is a difference between the sixth sag value from the (0,0) coordinate to the (0,G) coordinate and the fifth sag value from the (0,0) coordinate to the (G,0) coordinate, may be 35 μm or more.

In this case, G may satisfy $0.7*v_2 \leq |G|$.

That is, the |sixth sag value−the fifth sag value| may be 35 μm or more in the fifth coordinate C5 and a region adjacent to the first coordinate.

In addition, the |sixth sag value−fifth sag value|, which is a difference between the 6th sag value from the (0,0) coordinate to the (0,H) coordinate and the fifth sag value from the (0,0) coordinate to the (H,0) coordinate, may be 15 μm or more.

In this case, H may satisfy $0.7*h_2 \leq |H|$.

That is, the |sixth sag value−fifth sag value| may be 15 μm or more in the sixth coordinate C6 and a region adjacent to the sixth coordinate.

In addition, a deviation of the sag value inside the second effective surface AS2 and a deviation of the sag value outside the second effective surface AS2 may be different.

In detail, when defining the |sixth sag value−fifth sag value| which is a difference between the sixth sag value at the coordinates of the second axis AX2 and the fifth sag value in the coordinates of the first axis AX1 that are spaced apart from the optical axis OA by the same distance, an average deviation of the |sixth sag value−fifth sag value| inside the second effective surface AS2 may be smaller than an average deviation of the |sixth sag−fifth sag| outside the second effective surface AS2.

That is, a change amount of the sag values inside the second effective surface AS2 may be smaller than a change amount of the sag values outside the second effective surface AS2.

Meanwhile, |seventh sag value| and |eighth sag value| of the third coordinate and the fourth coordinate spaced apart from the optical axis by the same distance may be equal to each other. In detail, the |seventh sag value| of the seventh coordinate and the |eighth sag values| of the eighth coordinate spaced apart from the optical axis by the same distance may have sizes corresponding to each other. In more detail, a difference between the |seventh sag value| and the |eighth sag value| at the seventh coordinate and the eighth coordinate spaced apart from the optical axis by the same distance may be 0 or close to 0.

That is, the fifth sag value of the first axis AX1 and the sixth sag value of the second axis AX2 may be different from each other, and the seventh sag value of the third axis AX3 and the eighth sag value of the fourth axis AX4 may be the same or similar to each other.

Hereinafter, an optical system according to a fourth embodiment will be described with reference to FIG. 13. In the description of the fourth embodiment, descriptions of configurations the same as and similar to those of the optical systems according to the first, second, and third embodiments described above will be omitted. In addition, the fourth embodiment may be an embodiment implemented independently or an embodiment implemented in combination with the first embodiment and/or the second embodiment and/or the third embodiment.

In the optical system according to the fourth embodiment, the relative illumination of the image sensor unit may be 35% or more.

Figure 13:
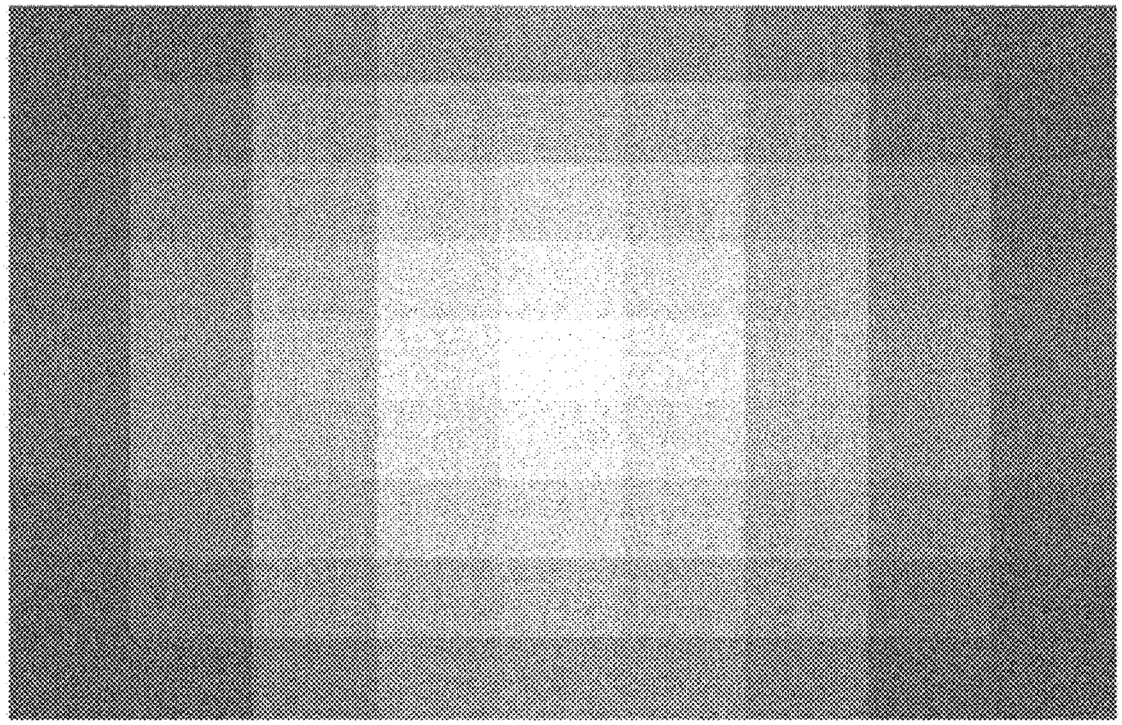
FIG. 13 is a view for describing relative illumination of an image sensor unit of an optical system according to a fourth embodiment.

In detail, referring to FIG. 13, light passing through the first lens 110 to the sixth lens 160 may be incident on the image sensor unit 300.

In this case, light may be incident on the image sensor unit 300 with a different amount of light for each region of the image sensor unit 300. For example, in the image sensor unit 300, a plurality of regions having a unit area size may be defined, and light may be incident on the plurality of regions with different illuminances.

The relative illumination of the image sensor unit may be defined as a relative ratio of the illuminance in the darkest region to the illuminance in the brightest region among the plurality of regions of the image sensor unit. That is, the relative illumination is 35% or more may refer that a magnitude of illuminance in the darkest region of the image sensor unit is 35% or more with respect to the illuminance in the brightest region of the image sensor unit.

That is, in the optical system according to the fourth embodiment, since the relative illumination of the light incident on the image sensor unit increases, it is possible to inhibit resolution degradation according to a position of the optical system. That is, when the optical system is applied to a display device, even though the optical system is disposed under another member of the display device rather than the most front surface of the display device, it is possible to compensate for a decrease in the amount of light caused by another member, and thus it is possible to realize improved resolution.

In addition, since the relative illumination of the image sensor unit may be increased without increasing the lens size of the optical system, it is possible to have an improved resolution while realizing miniaturization of the optical system.

In addition, the optical system according to the fourth embodiment may satisfy Equation 19 below.

$$0.5 < TTL/(2*ImgH) < 2.0 \quad \text{[Equation 19]}$$

(In Equation 19, total track length (TTL) refers to a distance in the optical axis direction from the vertex of the object-side surface of the first lens to the upper surface of the sensor, and Img is a vertical distance from the upper surface of the image sensor unit overlapping the optical axis to the 1.0 field region of the image sensor.)

That is, the optical system according to the fourth embodiment may have the TTL within the above range compared to the size of the image sensor unit. Accordingly, since the relative illumination of the image sensor unit may be increased by increasing the effective region of the image sensor unit without increasing the size of the optical system according to the distance of the lenses of the optical system, without increasing the aperture of the lens, or without increasing the size of the lens, it is possible to have an improved resolution while realizing miniaturization of the optical system.

The optical system according to the embodiment may form at least one of the object-side surface and the sensor-side surface of the nth lens closest to the image sensor as a free-form surface.

In detail, at least one of the object-side surface and the sensor-side surface of the nth lens may have a sag value defined by the above equations and a change value of the sag value, and a shape of a free-form surface of at least one of the object-side surface and the sensor-side surface of the nth lens may be defined by the sag value defined by the equations and the change value of the sag value.

Accordingly, when light passes through the nth lens and moves to an image sensor unit, relative illumination of the light incident on the image sensor unit may be improved. In detail, the relative illumination of the light passing through the nth lens and incident on the image sensor unit may be 45% or more.

Accordingly, the camera module including the optical system can compensate for the decrease in the amount of light depending on the position of the display device and can secure the amount of light with sufficient brightness without being affected by the position of the display device, thereby realizing improved resolution.

In addition, since the light amount and resolution of the optical system can be improved without increasing the size of the optical system, it is possible to realize miniaturization of the optical system and the camera module while having a size of increased light amount.

Hereinafter, the present invention will be described in more detail through optical systems according to Examples and Comparative Examples. Such Examples are merely presented as examples in order to explain the present invention in more detail. Therefore, the present invention is not limited to such Examples.

EXAMPLE

The optical system 1000 according to Example may include first to sixth lenses.

The first lens 110 may have a positive (+) refractive power on the optical axis. The first surface S1 of the first lens 110 may be convex toward the object-side surface on the optical axis, and the second surface S2 may be concave toward the sensor-side surface on the optical axis. The first lens 110 may have a meniscus shape convex toward the object on the optical axis as a whole. The first surface S1 may be an aspherical surface, and the second surface S2 may be an aspherical surface.

The second lens 120 may have a negative (−) refractive power on the optical axis. The third surface S3 of the second lens 120 may be convex toward the object-side surface on the optical axis, and the fourth surface S4 may be concave toward the sensor-side surface on the optical axis. The second lens 120 may have a meniscus shape convex toward the object on the optical axis as a whole. The third surface S3 may be an aspherical surface, and the fourth surface S4 may be an aspherical surface.

The third lens 130 may have a positive (+) refractive power on the optical axis. The fifth surface S5 of the third lens 130 may be convex toward the object-side surface on the optical axis, and the sixth surface S6 may be convex toward the sensor-side surface on the optical axis. The third lens 130 may have a shape in which both sides are convex on the optical axis as a whole. The fifth surface S5 may be an aspherical surface, and the sixth surface S6 may be an aspherical surface.

The fourth lens 150 may have negative (−) refractive power on the optical axis. The seventh surface S7 of the fourth lens 140 may be convex toward the object-side surface on the optical axis, and the eighth surface S8 may be concave toward the sensor-side surface on the optical axis. The fourth lens 140 may have a meniscus shape convex toward the object on the optical axis as a whole. The seventh surface S7 may be an aspherical surface, and the eighth surface S8 may be an aspherical surface.

The fifth lens 150 may have a positive (+) refractive power on the optical axis. The ninth surface S9 of the fifth lens 150 may be convex toward the object-side surface on the optical axis, and the tenth surface S10 may be convex toward the sensor-side surface on the optical axis. The fifth lens 150 may have a shape in which both sides are convex on the optical axis as a whole. The ninth surface S9 may be an aspherical surface, and the tenth surface S10 may be an aspherical surface.

The sixth lens 160 may have a negative (−) refractive power on the optical axis. The eleventh surface S11 and the twelfth surface S12 of the sixth lens 160 may include a free-form surface having a zernike coefficient value of Table 1 below and a sag value z calculated by Equation 2.

In detail, the eleventh surface S11 and the twelfth surface S12 may have sag values calculated by Equation 2 and FIGS. 14-15*b* according to a distance and angle from the optical axis.

In addition, the optical system including the first lens 110, the second lens 120, the third lens 130, the fourth lens 140, and the fifth lens 150 had a shape, a size, and characteristics of FIG. 16.

In addition, TTL/(2*ImgH) value of the optical system was 0.685.

Then, MTF characteristics, distortion characteristics, and relative illumination of the optical system according to the embodiment were measured.

Comparative Example 1

Unlike the embodiment, the sixth lens has an aspherical surface, and the first to sixth lenses had a shape, a size, and characteristics of FIG. 17.

Then, relative illumination of the optical system according to Comparative Example 1 was measured.

Comparative Example 2

The sixth lens is a free-form surface, and unlike the embodiment, a difference in sag values on the first axis and the second axis on the eleventh and twelfth surfaces of the sixth lens had values of FIG. 18 (the eleventh surface) and FIG. 19 (the twelfth surface).

Then, relative illumination of the optical system according to Comparative Example 2 was measured.

In the optical system according to the embodiment, orders of the Zernike coefficient of FIG. 13 may include an order having a value of zero and an order having a value other than zero.

In detail, in the optical system according to the embodiment, all orders having Sin θ and Cos θ in FIG. 14 are adjusted to the value of zero, and some of orders having Cos 2nθ are adjusted to values other than zero, thereby manufacturing the sixth lens having the above-described free-form surface.

Figure 20A:
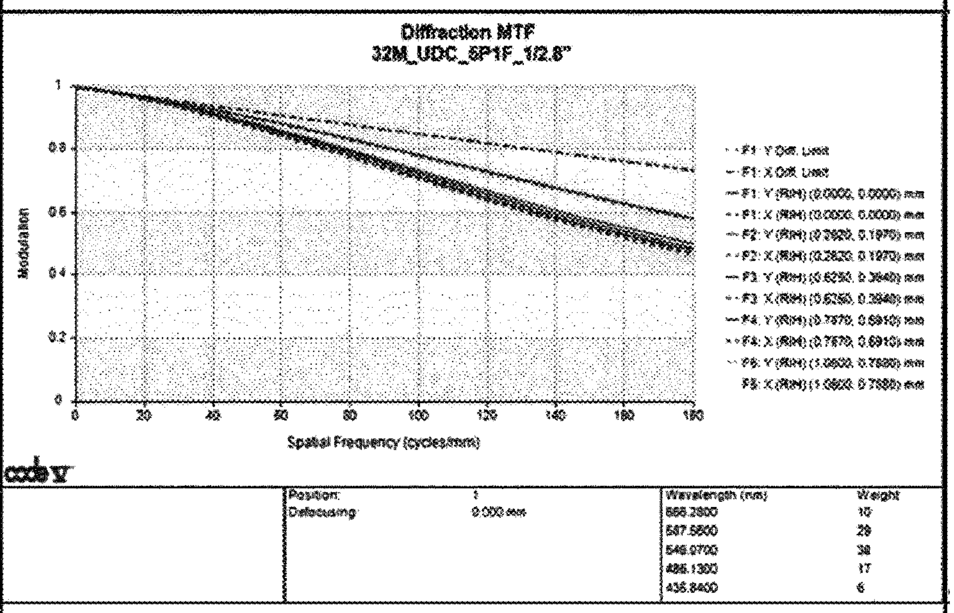
FIGS. 20 and 21 are views for describing MTF characteristics of an optical system according to an embodiment.
Figure 20B:
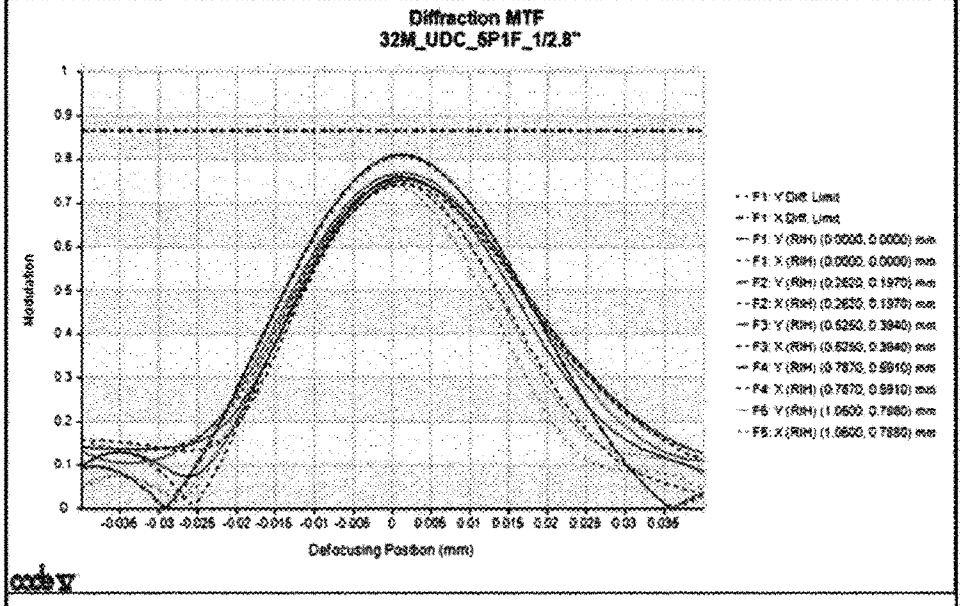
Figure 20C:
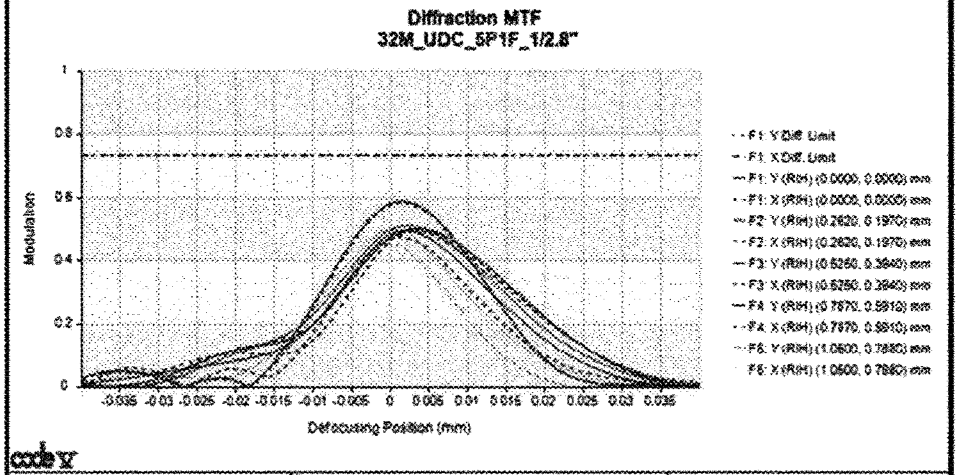
Figure 20D:
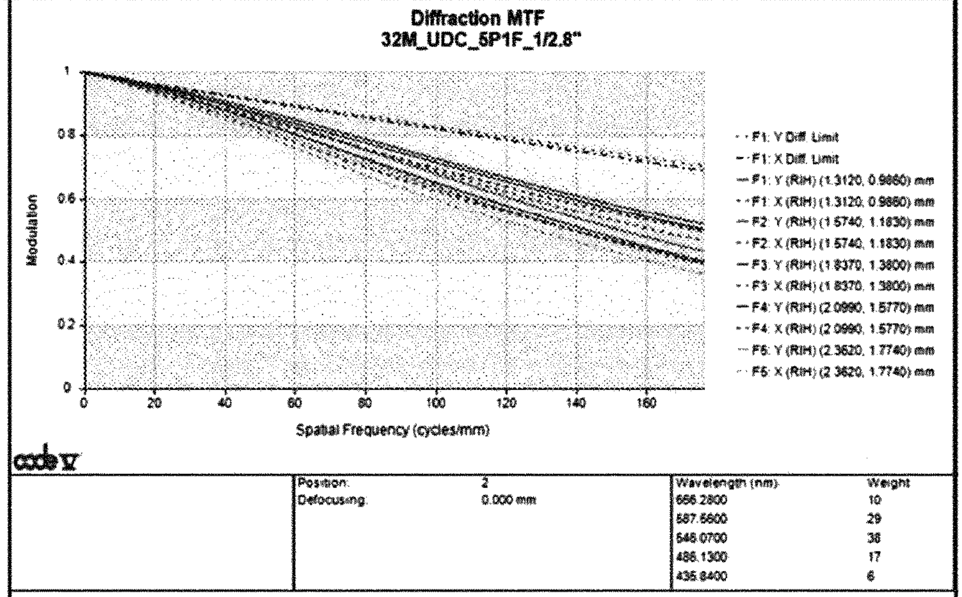
Figure 20E:
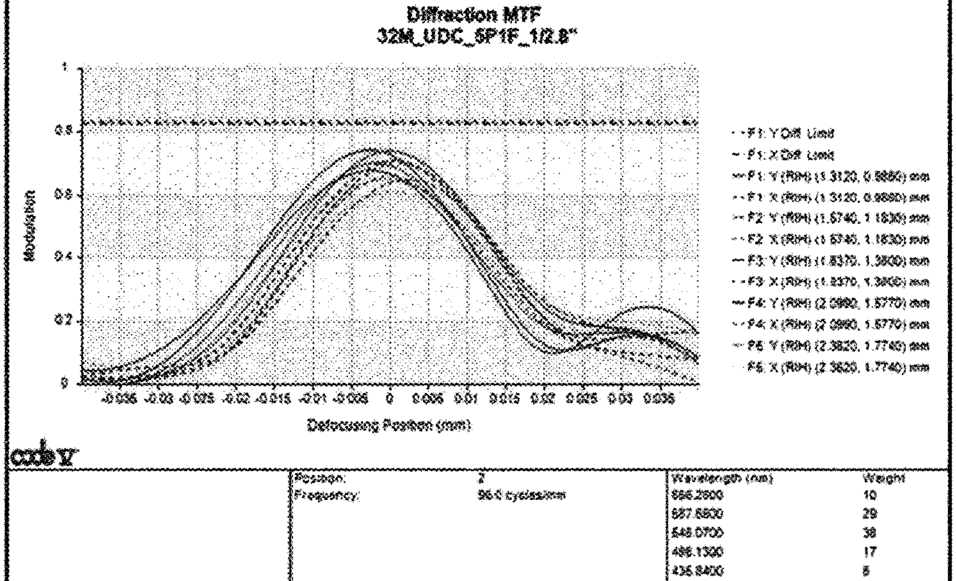
Figure 20F:
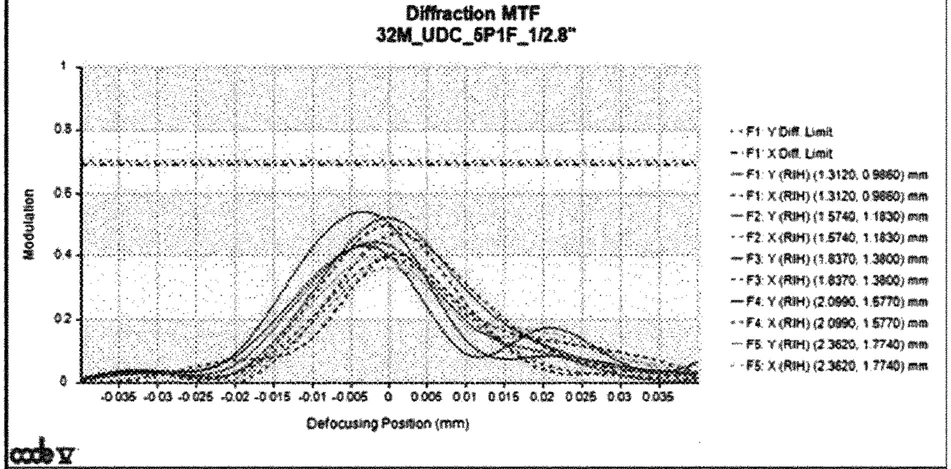
Figure 20G:
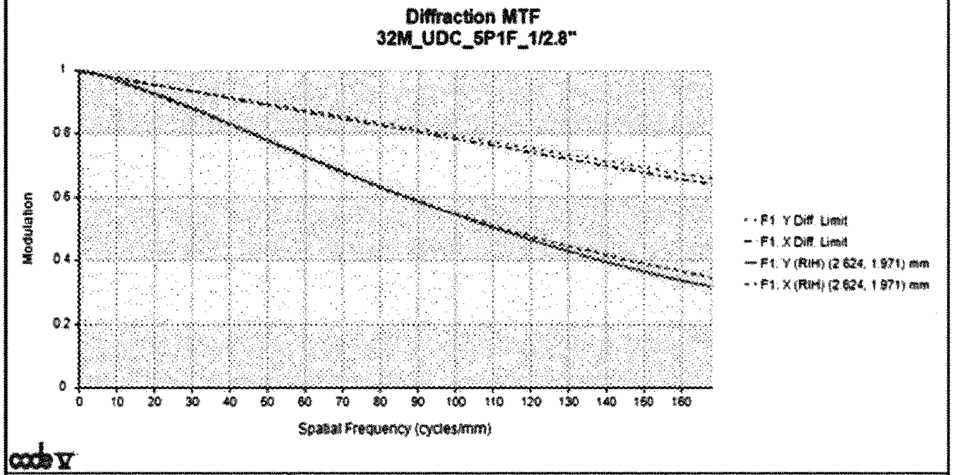
Figure 20H:
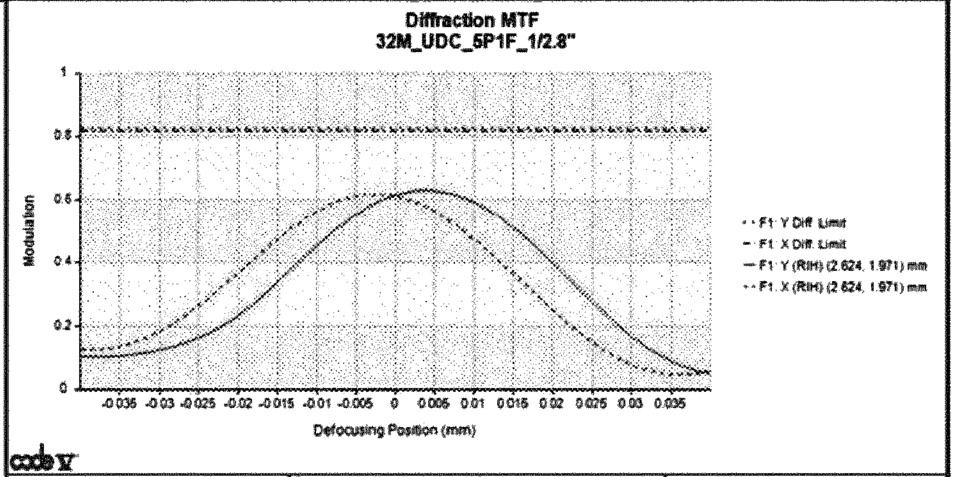
Figure 20I:
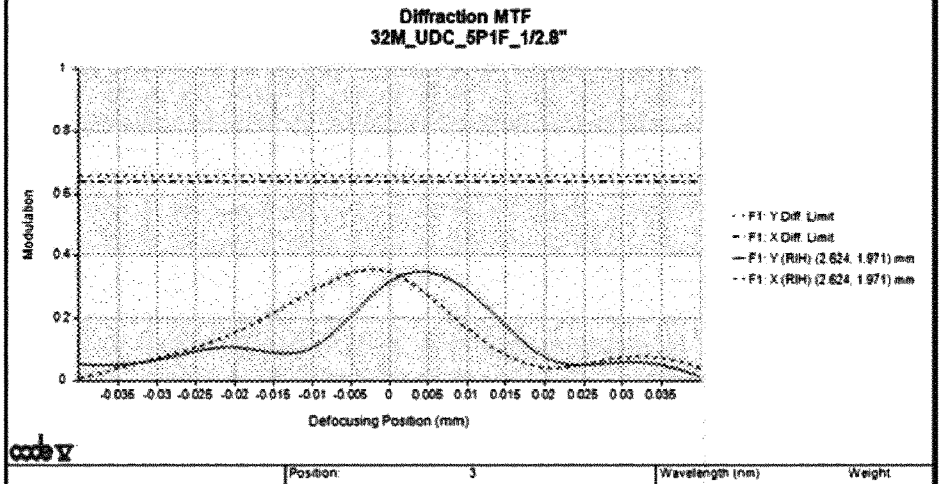
Figure 21:
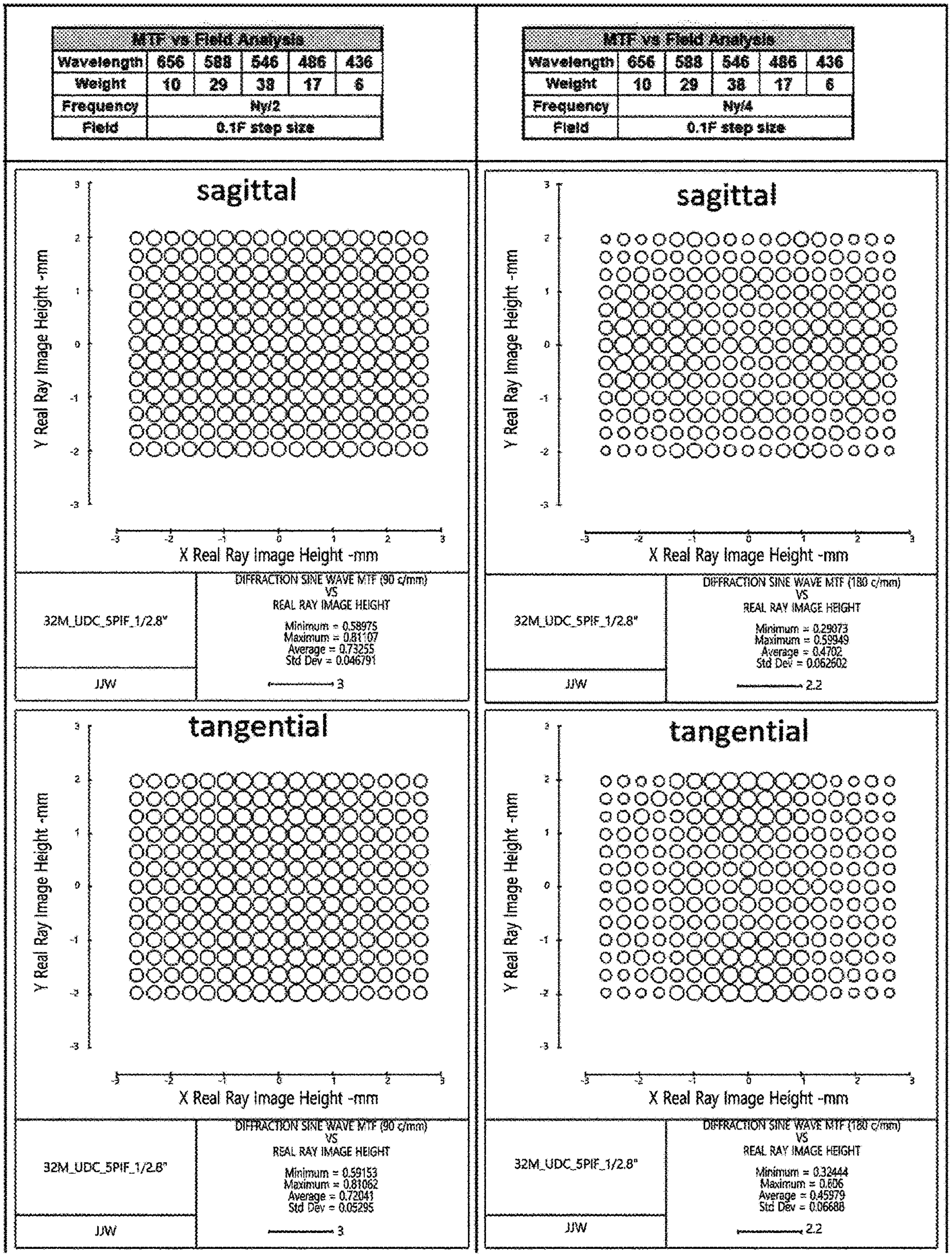

The optical system according to the embodiment may have a modulation transfer function (MTF) characteristic as shown in FIGS. 20*a*-21.

The graphs in FIGS. 20*a*, 20*d*, and 20*g* are views showing MTF characteristics (blackest 0, whitest 1, Y-axis) with respect to spatial frequency (ln/pair, X-axis), and it is a graph showing the number of black and white lines placed in a 1 mm space.

That is, the graphs in FIGS. 20*a*, 20*d*, and 20*g* are graphs showing the change of the MTF according to the spatial frequency.

For example, when interpreting that the MTF appears about 0.6 at 180 lp/mm in the red solid line graph of the graphs in FIGS. 20*a*, 20*d*, and 20*g*, it may refer that the resolution is resolved with a contrast of about 0.6 when a pattern having 180 black/white lines in 1 mm is photographed with the optical system of the present invention.

In addition, the graphs in FIGS. 20*b*, 20*c*, 20*e*, 20*f*, 20*h*, and 20*i* are graphs showing that the MTF changes as the position of the focus changes at a specific spatial frequency.

That is, the graphs in FIGS. 20*b*, 20*e*, and 20*h* are graphs for Nyquist/2, that is, 156 lp/mm, and the graphs in FIGS. 20*c*, 20*f*, and 20*i* are graphs for Nyquist/4.

In addition, FIG. 21 is a view illustrating an MTF map showing what MTF values appear in all regions of the image sensor.

In FIG. 21, the size of the circle is MTF, and the larger the circle, the higher the MTF, and the smaller the circle, the lower the MTF.

That is, it can be seen that the optical system according to the embodiment has improved MTF characteristics as shown in FIGS. 20*a*-21.

Figure 22:
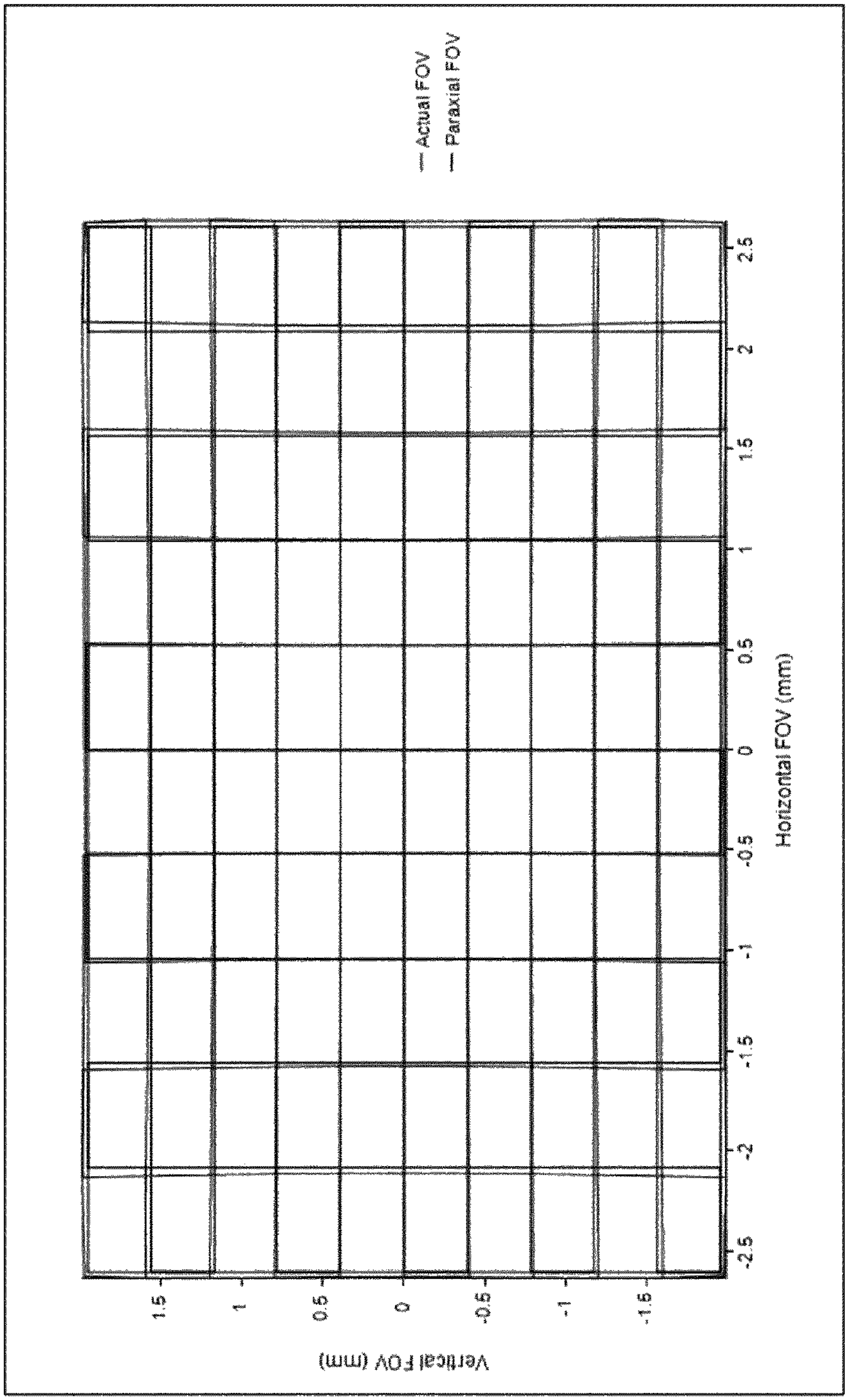
FIG. 22 is a view for describing distortion characteristics of an optical system according to an embodiment.

In addition, the optical system according to the embodiment may have distortion aberration as shown in FIG. 22.

FIG. 22 is a view illustrating distortion, in which a black grid is a shape of an ideal image and a red grid is a view illustrating a shape of a distorted image after passing through a lens.

That is, it can be seen that the optical system according to the embodiment has improved distortion characteristics as shown in FIG. 22.

Figure 23:
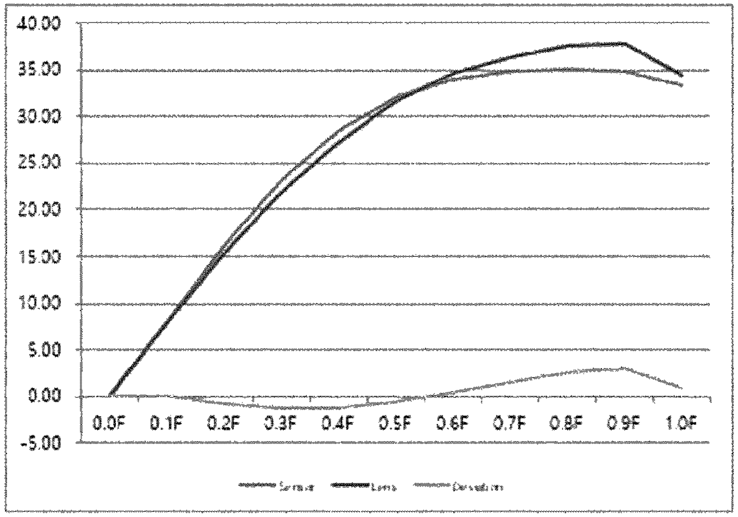
FIG. 23 is a view for describing a chief ray angle of an optical system according to an embodiment.

In addition, the optical system according to the embodiment may have the optical characteristics shown in FIGS. 23 and 24.

In FIG. 23, an X-axis is field coordinates of the image sensor unit, and a Y-axis is a chief ray angle. That is, referring to FIG. 23, in the optical system according to the embodiment, it can be seen that the chief ray angle of the lens of the optical system and the image sensor unit has a value of 3° or less in each field.

In addition, referring to FIG. 24, when light is incident on the image sensor unit through the optical system according to the embodiment, it can be seen that the relative illumination of the image sensor unit is 35% or more.

On the other hand, it can be seen that the optical systems according to Comparative Examples 1 and 2 have a low relative illumination, unlike the optical systems according to Examples.

In detail, unlike the embodiment, in the optical system of Comparative Example 1 in which the sixth lens has the aspherical shape other than the free-form shape, it can be seen that the illuminance of the darkest region has a value less than 30% of the illuminance of the brightest region when the illuminance of the brightest region and the darkest region of the image sensor is compared as shown in FIG. 25.

In addition, unlike the embodiment, in the optical system of Comparative Example 2 which does not satisfy the above equation but the sixth lens has a free-form surface shape, it can be seen that the illuminance of the darkest region has a value of less than 30%, in detail, 22% or less of the illuminance of the brightest region when the illuminance of the brightest region and the darkest region of the image sensor is compared as shown in FIG. 26.

That is, it can be seen that the optical system according to the embodiment includes the sixth lens satisfying the above equations, thereby improving the MTF characteristic of the optical system, reducing distortion, and improving the relative illumination of the image sensor unit.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical system comprising:

N lenses sequentially disposed along an optical axis from an object-side toward a sensor-side, wherein a first axis perpendicular to the optical axis is defined and a second axis perpendicular to the optical axis and the first axis is defined in an nth lens which is any one of the N lenses, a shape of a first surface of the nth lens is symmetrical in the first axis direction and the second axis direction, the first surface has a first sag value (S1) of a first coordinate (±A,0) and a third sag value (S3) of a third coordinate (±B,0) on the first axis, the first surface has a second sag value (S2) of a second coordinate (0,±A) and a fourth sag value (S4) of a fourth coordinate (0,±B) on the second axis, and the nth lens satisfies Equation 1 below:

$$|S2-S1|>|S4-S3| \quad |A|>|B| \quad |S4-S3|\leq 3\ \mu m. \qquad \text{[Equation 1]}$$

wherein the N lenses comprise a first lens, a second lens, a third lens, a fourth lens, a fifth lens, and a sixth lens disposed sequentially from the object-side to the sensor-side, wherein the sixth lens comprises an eleventh surface S11 on an object-side surface of the sixth lens, wherein A and B satisfy Equation 3 below:

$$h_1 = H - t_1 * \tan(\theta_h - \alpha), \quad |B| < 0.7 * h_1 \leq |A| \qquad \text{[Equation 3]}$$

wherein $h_1$ is a distance spaced apart from the optical axis in a negative or a positive direction of the first axis, H is half of a minor axis of an image sensor unit, $t_1$ is a distance from the eleventh surface S11 to the image sensor unit, θh is a chief ray angle in a 0.6 field of the image sensor unit, and α is $\sin^{-1}(1/(2{*}F\ \text{number}))$.

2. The optical system of claim 1, wherein the first sag value, the second sag value, the third sag value, and the fourth sag value are set by Equation 2 below:

$$Z = \frac{cr^2}{1+\sqrt{(1+k)c^2r^2}} + \sum_{i=1}^{n} C_j Z_j \qquad \text{[Equation 2]}$$

wherein Z is a sag value of an nth lens, c is a curvature value of an nth lens, r is an effective diameter value of an nth lens, k is a conic constant, and Cj is a Zernike coefficient at the j order, and Zj is a Zernike basis at the j order.

3. The optical system of claim 1, wherein the nth lens satisfies Equation 4 below:

$$|S4-S3| = 0. \qquad \text{[Equation 4]}$$

4. The optical system of claim 1, wherein a second surface opposite to the first surface is a fifth sag value S5 of a fifth coordinate (±C,0) and a seventh sag value S7 of a seventh coordinate (±D,0) on the first axis, the second surface has a sixth sag value S6 of a sixth coordinate (0,±C) and an eighth sag value S8 of an eighth coordinate (0,±D) on the second axis, and the nth lens satisfies Equation 5 below:

$$|S6-S5|>|S8-S7| \quad |C|>|D| \quad |S8-S7|\leq 5\ \mu m. \qquad \text{[Equation 5]}$$

5. The optical system of claim 4, wherein the fifth sag value, the sixth sag value, the seventh sag value, and the eighth sag value are set by Equation 2 below:

$$Z = \frac{cr^2}{1+\sqrt{(1+k)c^2r^2}} + \sum_{i=1}^{n} C_j Z_j \qquad \text{[Equation 2]}$$

wherein Z is a sag value of an nth lens, c is a curvature value of an nth lens, r is an effective diameter value of an nth lens, k is a conic constant, and Cj is a Zernike coefficient at the j order, and Zj is a Zernike basis at the j order.

6. The optical system of claim 4, wherein the sixth lens comprises a twelfth surface S12 on a sensor-side surface of the sixth lens, wherein C and D satisfy Equation 6 below:

$$h_2 = H - t_2 * \tan(\theta_h - \alpha), \quad |D| < 0.7 * h_2 \leq |C| \qquad \text{[Equation 6]}$$

wherein $h_2$ is a distance spaced apart from the optical axis in the negative or positive direction of the first axis, H is half of the minor axis of the image sensor unit, $t_2$ is a distance from the twelfth surface S12 to the image sensor unit, $\theta_h$ is the chief ray angle in the 0.6 field of the image sensor unit, and α is $\sin^{-1}(1/(2{*}F\ \text{number}))$.

7. The optical system of claim 4, wherein the nth lens satisfies Equation 7 below:

$$|S8-S7| = 0. \qquad \text{[Equation 7]}$$

8. The optical system of claim 1, wherein the first surface is an object-side surface of the nth lens, and the second surface is a sensor-side surface of the nth lens.

9. The optical system of claim 1, wherein a first surface of the nth lens has a first sag value S21 at coordinates spaced apart from the optical axis by a first distance d1 in the first axis direction and a second sag value S22 at coordinates spaced apart from the optical axis by the first distance d1 in the second axis direction, a second surface of the nth lens has a third sag value S23 at coordinates spaced apart from the optical axis by the first distance in the first axis direction and a fourth sag value S24 at coordinates spaced from the optical axis by the first distance in the second axis direction, and the nth lens satisfies Equations 8 and 9 below:

$$d1 > 0 \quad \text{[Equation 8]}$$

$$S2 - S1 \neq 0$$

$$S4 - S3 \neq 0$$

$$|S2 - S1| < |S4 - S3|. \quad \text{[Equation 9]}$$

10. The optical system of claim 9, wherein the first sag value S21, the second sag value S22, the third sag value S23 and the fourth sag value S24 satisfy Equation 10 below:

$$|S2 - S1| > 1\ \mu\text{m} \quad \text{[Equation 10]}$$

$$|S4 - S3| > 3\ \mu\text{m}.$$

11. The optical system of claim 10, wherein the first axis is parallel to a major axis of the image sensor unit, wherein the second axis is parallel to the minor axis of the image sensor unit, wherein the third sag value S23 and the fourth sag value S24 satisfy Equations 11 below:

$$|S3| \leq |S4|. \quad \text{[Equation 11]}$$

12. The optical system of claim 9, wherein the first distance d1 satisfies Equation 12 below:

$$h_1 = H - t_1 * \tan(\theta_h - \alpha) \quad \text{[Equation 12]}$$

$$0.7 * h_1 < |d1|$$

wherein h1 is a distance spaced apart from the optical axis in the negative or positive direction of the first axis, H is half of the minor axis of the image sensor unit, t1 is a distance from the first surface of the nth lens to the image sensor unit, θh is the chief ray angle in the 0.6 field of the image sensor unit, and α is sin−1(1/(2*F number)).

13. The optical system of claim 1, wherein the first axis is perpendicular to the optical axis in a major axis direction of the image sensor unit; the second axis is perpendicular to the optical axis and the first axis in a minor axis direction of the image sensor unit; and a third axis perpendicular to the optical axis in a diagonal direction of the image sensor unit and a fourth axis perpendicular to the optical axis in a diagonal direction of the image sensor unit are defined in an nth lens, wherein a sag value of a first surface of the nth lens is set by Equation 2 below, $$Z = \frac{cr^2}{1 + \sqrt{(1 + k)c^2r^2}} + \sum_{i=1}^{n} C_j Z_j \quad \text{[Equation 2]}$$

wherein Z is a sag value of an nth lens, c is a curvature value of an nth lens, r is an effective diameter value of an nth lens, k is a conic constant, Cj is a Zernike coefficient at the j order, and Zj is a Zernike basis at the j order;

wherein a plurality of first coordinates (±v1,0) set by Equation 13-1 and Equation 13-2 below are set on the first axis of the first surface of the nth lens, $$v_1' = V - t_1 * \tan(\theta_v - \alpha) \quad \text{[Equation 13-1]}$$

$$0.7 * v_1' < v_1 < 1.3 * v_1' \quad \text{[Equation 13-2]}$$

wherein v1' is a distance spaced apart from the optical axis in the negative or positive direction of the first axis, V is a half of a major axis of the image sensor unit, t1 is the distance from the eleventh surface S11 to the image sensor unit, θv is a chief ray angle in a 0.8 field of the image sensor unit, and α is sin−1(1/(2*F number)), wherein a plurality of second coordinates (0,$\pm h_1$) set by Equation 14-1 and Equation 14-2 below are set on the second axis of the first surface of the nth lens, $$h_1' = H - t_1 * \tan(\theta_h - \alpha) \quad \text{[Equation 14-1]}$$

$$h_1' < v_1'$$

$$0.7 * h_1' < h_1 < 1.3 * h_1' \quad \text{[Equation 14-2]}$$

$$h_1 < v_1$$

wherein h1' is a distance spaced apart from the optical axis in the negative or positive direction of the first axis, H is a half of the minor axis length of the image sensor unit, t1 is the distance from the eleventh surface S11 to the image sensor unit, θh is the chief ray angle in the 0.6 field of the image sensor unit, and α is sin−1(1/(2*F number)), wherein a plurality of third coordinates (x1,y1/−x1,−y1) and the fourth coordinates (−x1,y1/x1,−y1) set respectively by Equation 15-1 and Equation 15-2 below are set on the third axis and the fourth axis of the first surface of the nth lens, $$d_1' = D - t_1 * \tan(\theta_d - \alpha) \quad \text{[Equation 15-1]}$$

$$h_1' < v_1' < d_1'$$

$$|d_1'|^2 = |x_1'|^2 + |y_1'|^2$$

$$0.7 * d_1' < d_1 < 1.3 * d_1' \quad \text{[Equation 15-2]}$$

$$h_1 < v_1 < d_1$$

$$|d_1|^2 = |x_1|^2 + |y_1|^2$$

wherein $d_1'$ is a diagonal distance extending from the optical axis in third and fourth axis directions, D is a half of a diagonal length of the image sensor unit, $t_1$ is the distance from the eleventh surface S11 to the image sensor unit, $\theta_d$ is a chief ray angle in a 1.0 field of the image sensor unit, and α is $\sin^{-1}$(1/(2*F number)), wherein the first surface of the nth lens includes a first effective surface formed by connecting the first coordinate, the second coordinate, the third coordinate, and the fourth coordinate, wherein |second sag value−first sag value| is the difference between the second sag value at the second coordinate of the second axis equidistant from the optical axis and the first sag value at the first coordinate of the first axis, and wherein an average deviation between |second sag value−first sag value| inside the first effective surface is smaller than an average deviation between |second sag value−first sag value| outside the first effective surface.

14. The optical system of claim 13, wherein the |second sag value−first sag value| has a first average deviation and a second average deviation, wherein the first average deviation is the difference between the second sag value from the (0,0) coordinate to the (0,h1) coordinate and the first sag value from the (0,0) coordinate to the (h1,0) coordinate, wherein the second average deviation is the difference between the second sag value from the (0,h1) coordinate to the (0,d1) coordinate and the first sag value from the (h1,0) coordinate to the (d1,0) coordinate, wherein the second average deviation is greater than the first average deviation.

15. The optical system of claim 14, wherein the |second sag value−first sag value| has a third average deviation and a fourth average deviation, wherein the third average deviation is the difference between the second sag value from the (0,0) coordinate to the (0,v1) coordinate and the first sag value from the (0,0) coordinate to the (v1,0) coordinate, wherein the second average deviation is the difference between the second sag value from the (0,v1) coordinate to the (0,d1) coordinate and the first sag value from the (v1,0) coordinate to the (d1,0) coordinate, wherein the fourth average deviation is greater than the third average deviation.

16. The optical system of claim 13, wherein a shape of the second surface opposite to the first surface of the nth lens is symmetrical in the first axis direction and the second axis direction, wherein the sixth lens comprises a twelfth surface S12 on a sensor-side surface of the sixth lens, wherein a sag value of the second surface of the nth lens is set by Equation 2 below, $$Z = \frac{cr^2}{1 + \sqrt{(1+k)c^2r^2}} + \sum_{i=1}^{n} C_j Z_j \quad \text{[Equation 2]}$$

wherein a plurality of fifth coordinates (±$v_2$,0) set by Equation 16-1 and Equation 16-2 below are set on the first axis of the second surface of the nth lens, $$v_2' = V - t_2 * \tan(\theta_v - \alpha) \quad \text{[Equation 16-1]}$$

$$0.7 * v_2' < v_2 < 1.3 * v_2' \quad \text{[Equation 16-2]}$$

wherein v2' is a distance spaced apart from the optical axis in the negative or positive direction of the first axis, V is a half of the major axis of the image sensor unit, t2 is a distance from the twelfth surface S12 to the image sensor unit, θv is the chief ray angle in the 0.8 field of the image sensor unit, and α is sin−1(1/(2*F number)), wherein a plurality of sixth coordinates (0,±$h_2$) set by Equation 17-1 and Equation 17-2 below are set on the second axis of the second surface of the nth lens, $$h_2' = H - t_2 * \tan(\theta_h - \alpha) \quad \text{[Equation 17-1]}$$

$$h_2' < v_2'$$

$$0.7 * h_2' < h_2 < 1.3 * h_2' \quad \text{[Equation 17-2]}$$

$$h_2 < v_2$$

wherein h2' is a distance spaced apart from the optical axis in the negative or positive direction of the first axis, H is a half of the minor axis of the image sensor unit, t2 is the distance from the twelfth surface S12 to the image sensor unit, θh is the chief ray angle in the 0.6 field of the image sensor unit, and α is sin−1(1/(2*F number)), wherein a plurality of seventh coordinates ($x_2$,$y_2$/−$x_2$,−$y_2$) and the eighth coordinates (−$x_2$,$y_2$/$x_2$,−$y_2$) set respectively by Equation 18-1 and Equation 18-2 below are set on the third axis and the fourth axis of the second surface of the nth lens, $$d_2' = D - t_2 * \tan(\theta_d - \alpha), \quad \text{[Equation 18-1]}$$

$$h_2' < v_2' < d_2'$$

$$|d_2'|^2 = |x_2'|^2 + |y_2'|^2$$

$$0.7 * d_2' < d_2 < 1.3 * d_2' \quad \text{[Equation 18-2]}$$

$$h_2 < v_2 < d_2$$

$$|d_2|^2 = |x_2|^2 + |y_2|^2$$

wherein d2 is a diagonal distance extending from the optical axis in the third and fourth axis directions, D is a half of the diagonal length of the image sensor unit, t2 is the distance from the eleventh surface S11 to the image sensor unit, θd is the chief ray angle in the 1.0 field of the image sensor unit, and α is sin−1(1/(2*F number)), wherein the second surface of the nth lens includes a second effective surface formed by connecting the fifth coordinate, the sixth coordinate, the seventh coordinate, and the eighth coordinate, wherein |sixth sag value−fifth sag value| is the difference between the sixth sag value at the sixth coordinate of the second axis equidistant from the optical axis and the fifth sag value at the fifth coordinate of the first axis, and wherein an average deviation between |sixth sag value−fifth sag value| inside the second effective surface is smaller than an average deviation between |sixth sag value−fifth sag value| outside the second effective surface.

17. The optical system of claim 16, wherein an area of the second effective surface is larger than an area of the first effective surface.

18. The optical system of claim 16, wherein the |sixth sag value−fifth sag value| has a fifth average deviation and a sixth average deviation, wherein the fifth average deviation is the difference between the sixth sag value from the (0,0) coordinate to the (0,h2) coordinate and the fifth sag value from the (0,0) coordinate to the (h2,0) coordinate, wherein the sixth average deviation is the difference between the sixth sag value from the (0,h2) coordinate to the (0,d2) coordinate and the fifth sag value from the (h2,0) coordinate to the (d2,0) coordinate, wherein the sixth average deviation is greater than the fifth average deviation.

19. The optical system of claim 16, wherein the |sixth sag value−fifth sag value| has a seventh average deviation and a eighth average deviation, wherein the seventh average deviation is the difference between the sixth sag value from the (0,0) coordinate to the (0,v2) coordinate and the fifth sag value from the (0,0) coordinate to the (v2,0) coordinate, wherein the eighth average deviation is the difference between the sixth sag value from the (0,v2) coordinate to the (0,d2) coordinate and the fifth sag value from the (v2,0) coordinate to the (d2,0) coordinate, wherein the eighth average deviation is greater than the seventh average deviation.

* * * * *